(12) United States Patent
Pattar et al.

(10) Patent No.: US 12,238,101 B2
(45) Date of Patent: Feb. 25, 2025

(54) CUSTOMIZING AUTHENTICATION AND HANDLING PRE AND POST AUTHENTICATION IN IDENTITY CLOUD SERVICE

(71) Applicant: Oracle International Corporation, Redwood Shores, CA (US)

(72) Inventors: Nagaraj Pattar, Gulbarga (IN); Parthipan Kandasamy, Tiruppur (IN); Ashok Kumar Subbaiyan, Tiruppur (IN)

(73) Assignee: Oracle International Corporation, Redwood Shores, CA (US)

( * ) Notice: Subject to any disclaimer, the term of this patent is extended or adjusted under 35 U.S.C. 154(b) by 531 days.

(21) Appl. No.: 17/196,907

(22) Filed: Mar. 9, 2021

(65) Prior Publication Data
US 2022/0294788 A1    Sep. 15, 2022

(51) Int. Cl.
*H04L 9/40* (2022.01)
*G06F 9/445* (2018.01)
*G06F 21/41* (2013.01)
*G06F 21/45* (2013.01)
*G06F 21/64* (2013.01)

(52) U.S. Cl.
CPC .......... *H04L 63/10* (2013.01); *G06F 9/44526* (2013.01); *G06F 21/41* (2013.01); *G06F 21/45* (2013.01); *H04L 63/08* (2013.01); *H04L 63/0815* (2013.01); *G06F 21/64* (2013.01)

(58) Field of Classification Search
CPC .................................................. G06F 9/44526
See application file for complete search history.

(56) References Cited

U.S. PATENT DOCUMENTS

| | | | | | |
|---|---|---|---|---|---|
| 5,918,228 | A | * | 6/1999 | Rich | G06F 21/6218 |
| 5,974,566 | A | * | 10/1999 | Ault | H04L 63/08 |
| | | | | | 719/330 |
| 6,018,570 | A | * | 1/2000 | Matison | H04M 3/42136 |
| | | | | | 379/93.12 |
| 6,098,093 | A | * | 8/2000 | Bayeh | H04L 9/40 |
| | | | | | 709/200 |

(Continued)

OTHER PUBLICATIONS

Bako et al "Linearly Ordered Plugins through Self-Organization," IEEE, pp. 1-7 (Year: 2006).*

(Continued)

*Primary Examiner* — Luu T Pham
*Assistant Examiner* — James J Wilcox
(74) *Attorney, Agent, or Firm* — Kilpatrick Townsend & Stockton LLP

(57) ABSTRACT

Techniques are provided for customizing authentication and for handling pre-authentication and post-authentication plug-ins in an access management system. Users may want to access a protected resource, such as an application, and apply customizations to the protected resource. The customizations can be applied through the use of plug-ins, such as pre-authentication and post-authentication plug-ins. After it is determined that the user has permissions to apply a specified plug-in, analysis is performed to ensure that the plug-in complies with system requirements and that the criteria for implementing the plug-in has been satisfied. A browser session and control of the application can then be forwarded to the user.

19 Claims, 17 Drawing Sheets

(56) References Cited

U.S. PATENT DOCUMENTS

| | | | | |
|---|---|---|---|---|
| 6,272,538 B1* | 8/2001 | Holden | ............... | H04W 12/069 709/227 |
| 6,272,639 B1* | 8/2001 | Holden | ............... | H04L 63/0442 713/185 |
| 6,339,828 B1* | 1/2002 | Grawrock | ............... | H04L 63/104 713/185 |
| 6,341,352 B1* | 1/2002 | Child | ................. | G06Q 20/3821 705/76 |
| 6,377,939 B1* | 4/2002 | Young | ................... | G06Q 30/04 713/1 |
| 6,539,093 B1* | 3/2003 | Asad | ....................... | H04L 9/083 380/279 |
| 6,571,290 B2* | 5/2003 | Selgas | ................ | H04L 63/0428 709/227 |
| 6,659,861 B1* | 12/2003 | Faris | ..................... | H04L 69/28 463/29 |
| 6,668,322 B1* | 12/2003 | Wood | ..................... | G06F 21/41 713/182 |
| 6,754,829 B1* | 6/2004 | Butt | ........................ | G06F 21/33 726/8 |
| 6,907,531 B1* | 6/2005 | Dodd | .................... | G06F 21/577 709/224 |
| 6,918,038 B1* | 7/2005 | Smith | ....................... | H04L 9/40 713/100 |
| 6,978,367 B1* | 12/2005 | Hind | ...................... | H04L 63/20 705/76 |
| 7,032,110 B1* | 4/2006 | Su | .......................... | H04L 63/0823 713/170 |
| 7,181,076 B1* | 2/2007 | Payton | .................. | H04N 19/60 382/240 |
| 7,181,620 B1* | 2/2007 | Hur | ...................... | H04L 63/0869 713/168 |
| 7,236,956 B1* | 6/2007 | Ogg | ....................... | G06Q 50/06 400/403 |
| 7,293,096 B1* | 11/2007 | Foltak | ................. | H04L 63/0892 709/227 |
| 7,322,040 B1* | 1/2008 | Olson | ................... | H04L 63/205 726/8 |
| 7,457,948 B1* | 11/2008 | Bilicksa | ............. | H04L 63/0815 707/999.009 |
| 7,461,369 B2* | 12/2008 | Zhao | ..................... | H04L 41/22 714/E11.195 |
| 7,506,047 B2* | 3/2009 | Wiles, Jr. | ................ | H04L 43/00 709/224 |
| 7,590,687 B2* | 9/2009 | Bales | ................... | H04L 67/55 707/999.1 |
| 7,665,125 B2* | 2/2010 | Heard | ................... | H04W 12/37 713/170 |
| 7,792,948 B2* | 9/2010 | Zhao | .................. | H04L 41/0853 709/224 |
| 7,912,906 B2* | 3/2011 | Thayer | .................... | H04L 63/12 709/219 |
| 7,921,210 B1* | 4/2011 | Synnestvedt | ........... | H04L 47/70 709/224 |
| 7,930,411 B1* | 4/2011 | Hayward | ............ | H04L 63/0815 709/229 |
| 8,261,093 B1* | 9/2012 | Dhesi | ................. | H04L 63/083 726/4 |
| 8,266,327 B2* | 9/2012 | Kumar | ................ | H04L 69/32 709/227 |
| 8,325,625 B2* | 12/2012 | Nair | ........................ | H04L 43/12 370/254 |
| 8,351,327 B1* | 1/2013 | Binns | ................... | H04L 67/148 370/229 |
| 8,374,930 B2* | 2/2013 | Benisti | ................. | G06Q 30/0239 705/34 |
| 8,448,170 B2* | 5/2013 | Wipfel | .................... | H04L 63/14 718/1 |
| 8,453,218 B2* | 5/2013 | Lan | ........................ | H04L 67/02 726/4 |
| 8,467,290 B2* | 6/2013 | Gazier | .................... | H04L 63/08 370/252 |
| 8,498,618 B2* | 7/2013 | Ben Ayed | ............. | H04W 12/06 455/418 |
| 8,516,132 B2* | 8/2013 | Selgas | ................... | H04L 63/083 709/227 |
| 8,516,566 B2* | 8/2013 | Srinivas | ................ | H04L 9/0869 713/168 |
| 8,533,857 B2* | 9/2013 | Tuchman | ................. | G06F 16/955 726/28 |
| 8,590,014 B1* | 11/2013 | Haugsnes | ........... | H04L 63/1433 726/3 |
| 8,601,498 B2* | 12/2013 | Laurich | ................... | G06F 21/85 719/326 |
| 8,601,550 B2* | 12/2013 | Hopen | .................... | H04L 63/10 709/224 |
| 8,615,787 B2* | 12/2013 | Murray | ............... | H04L 63/0853 380/281 |
| 8,655,939 B2* | 2/2014 | Redlich | .................. | G06Q 10/06 709/212 |
| 8,695,074 B2* | 4/2014 | Saraf | .................... | H04L 63/0815 726/8 |
| 8,769,304 B2* | 7/2014 | Kirsch | ............... | G06Q 20/0855 713/183 |
| 8,769,622 B2* | 7/2014 | Chang | ................. | G06F 21/6218 713/168 |
| 8,776,209 B1* | 7/2014 | Kumar | .............. | H04L 63/0815 709/225 |
| 8,782,158 B2* | 7/2014 | Cropper | ................. | H04L 65/403 709/206 |
| 8,805,980 B1* | 8/2014 | Synnestvedt | ....... | H04W 12/062 709/223 |
| 8,819,789 B2* | 8/2014 | Orttung | .................. | H04L 63/08 726/5 |
| 8,831,979 B1* | 9/2014 | Gerson | ................... | H04L 63/08 705/16 |
| 8,850,050 B1* | 9/2014 | Qureshi | .............. | G06F 21/6218 709/227 |
| 8,863,299 B2* | 10/2014 | Sharma | ................. | G06Q 10/10 726/26 |
| 8,869,235 B2* | 10/2014 | Qureshi | ................ | H04L 67/10 713/153 |
| 8,874,770 B2* | 10/2014 | Ruff | ....................... | H04L 1/1621 709/229 |
| 8,875,285 B2* | 10/2014 | Cross | ...................... | G06F 21/51 726/22 |
| 8,881,256 B1* | 11/2014 | Roth | ...................... | H04L 63/08 705/55 |
| 8,955,036 B2* | 2/2015 | Hugard, IV | .......... | H04L 63/104 713/185 |
| 8,966,250 B2* | 2/2015 | Shochet | ............... | G06F 21/6209 713/165 |
| 8,966,374 B1* | 2/2015 | Hardebeck | ............. | G06Q 10/10 715/740 |
| 8,966,578 B1* | 2/2015 | Belov | .................... | G06N 5/022 709/225 |
| 8,966,643 B2* | 2/2015 | Chen | ...................... | H04N 21/8358 726/26 |
| 8,990,699 B2* | 3/2015 | Pugh | ....................... | H04L 67/10 715/767 |
| 9,032,498 B1* | 5/2015 | Ben Ayed | ............... | G06F 21/35 726/9 |
| 9,043,747 B2* | 5/2015 | Eksten | ................ | G06F 9/44521 717/113 |
| 9,043,883 B2* | 5/2015 | Touve | .................. | H04W 12/062 726/5 |
| 9,043,886 B2* | 5/2015 | Srinivasan | .......... | H04L 63/0815 726/9 |
| 9,049,207 B2* | 6/2015 | Hugard, IV | ............ | H04L 63/20 |
| 9,065,819 B1* | 6/2015 | Shanmugam | ........... | G06F 21/41 |
| 9,088,556 B2* | 7/2015 | Truskovsky | ............ | H04L 63/08 |
| 9,105,025 B2* | 8/2015 | Poole | ..................... | G06K 7/10257 |
| 9,122,851 B2* | 9/2015 | Wyn-Harris | ........... | H04L 63/08 |
| 9,124,419 B2* | 9/2015 | Bar-El | .................. | H04L 63/168 |
| 9,141,410 B2* | 9/2015 | Leafe | .................... | G06F 9/5022 |
| 9,191,381 B1* | 11/2015 | Popp | .................... | H04L 63/0823 |
| 9,203,904 B2* | 12/2015 | Maldaner | .............. | H04L 67/1097 |
| 9,231,911 B2* | 1/2016 | Setia | .................... | H04L 63/0227 |

(56) References Cited

U.S. PATENT DOCUMENTS

| | | | | |
|---|---|---|---|---|
| 9,231,955 | B1* | 1/2016 | Mehresh | H04L 63/104 |
| 9,342,661 | B2* | 5/2016 | Cholas | H04L 9/32 |
| 9,374,369 | B2* | 6/2016 | Mahaffey | G06F 21/6245 |
| 9,378,065 | B2* | 6/2016 | Shear | G06F 16/24575 |
| 9,384,339 | B2* | 7/2016 | Griffin | H04L 9/3247 |
| 9,397,983 | B2* | 7/2016 | Moffat | H04L 9/0822 |
| 9,418,221 | B2* | 8/2016 | Turgeman | G06F 3/041 |
| 9,436,762 | B1* | 9/2016 | Lau | G06F 16/954 |
| 9,455,955 | B2* | 9/2016 | Fetik | G06F 21/78 |
| 9,466,054 | B1* | 10/2016 | Bradley | H04L 67/1061 |
| 9,471,767 | B2* | 10/2016 | Akula | G06V 30/373 |
| 9,503,452 | B1* | 11/2016 | Kumar | H04L 63/0838 |
| 9,514,327 | B2* | 12/2016 | Ford | G06Q 50/18 |
| 9,531,714 | B2* | 12/2016 | Innes | H04L 9/3213 |
| 9,536,071 | B2* | 1/2017 | Turgeman | H04L 63/0861 |
| 9,544,307 | B2* | 1/2017 | Engelking | H04L 63/0823 |
| 9,552,470 | B2* | 1/2017 | Turgeman | G06F 3/041 |
| 9,553,860 | B2* | 1/2017 | Meyer | H04L 63/10 |
| 9,558,339 | B2* | 1/2017 | Turgeman | H04W 12/12 |
| 9,560,036 | B2* | 1/2017 | Hinton | H04L 9/3228 |
| 9,569,626 | B1* | 2/2017 | Brisebois | H04W 12/02 |
| 9,569,634 | B1* | 2/2017 | Yanacek | G06F 21/6218 |
| 9,608,810 | B1* | 3/2017 | Ghetti | H04L 9/0822 |
| 9,613,190 | B2* | 4/2017 | Ford | H04L 63/083 |
| 9,690,920 | B2* | 6/2017 | Marcus | H04L 63/0815 |
| 9,699,168 | B2* | 7/2017 | Pieczul | H04L 67/02 |
| 9,703,947 | B2* | 7/2017 | Harrison | G06Q 30/0269 |
| 9,703,953 | B2* | 7/2017 | Turgeman | H04L 63/1408 |
| 9,729,539 | B1* | 8/2017 | Agrawal | H04L 63/0815 |
| 9,736,145 | B1* | 8/2017 | Hayes | H04L 63/0846 |
| 9,747,388 | B2* | 8/2017 | Micucci | G06F 16/9536 |
| 9,747,562 | B1* | 8/2017 | Krappe | G06Q 10/06 |
| 9,756,020 | B2* | 9/2017 | Kaufman | H04L 63/08 |
| 9,760,698 | B2* | 9/2017 | Pisz | B60R 25/20 |
| 9,767,309 | B1* | 9/2017 | Patel | G06F 16/9535 |
| 9,781,122 | B1* | 10/2017 | Wilson | H04L 63/08 |
| 9,838,758 | B2* | 12/2017 | Harrison | H04N 21/23424 |
| 9,847,994 | B1* | 12/2017 | Kelly | H04L 63/067 |
| 9,853,959 | B1* | 12/2017 | Kapczynski | H04L 63/08 |
| 9,882,945 | B2* | 1/2018 | Frankel | G06Q 50/01 |
| 9,887,970 | B2* | 2/2018 | Luff | H04L 9/14 |
| 9,891,907 | B2* | 2/2018 | Searle | H04L 41/082 |
| 9,904,579 | B2* | 2/2018 | Shear | G06F 16/285 |
| 9,916,010 | B2* | 3/2018 | Harris | H04L 67/535 |
| 9,923,888 | B2* | 3/2018 | Goel | H04L 67/02 |
| 9,923,905 | B2* | 3/2018 | Amiri | H04L 67/02 |
| 9,930,475 | B1* | 3/2018 | Eidam | G06Q 20/3821 |
| 9,935,814 | B2* | 4/2018 | Selgas | H04L 63/18 |
| 9,948,612 | B1* | 4/2018 | Jawahar | H04L 63/0272 |
| 9,959,398 | B1* | 5/2018 | Blair | H04L 63/08 |
| 9,961,083 | B1* | 5/2018 | Birk | H04L 41/0809 |
| 9,965,133 | B1* | 5/2018 | Lindsey | G06F 21/53 |
| 9,973,488 | B1* | 5/2018 | Roth | H04L 63/0807 |
| 9,990,426 | B2* | 6/2018 | Micucci | G06F 16/95 |
| 9,996,679 | B2* | 6/2018 | Kline | G06F 21/606 |
| 10,013,668 | B2* | 7/2018 | Straub | H04L 63/0823 |
| 10,015,167 | B1* | 7/2018 | O'Kennedy | H04L 63/062 |
| 10,021,088 | B2* | 7/2018 | Innes | H04L 9/3263 |
| 10,027,657 | B1* | 7/2018 | Vempati | H04L 63/08 |
| 10,027,700 | B2* | 7/2018 | Petry | H04L 63/0876 |
| 10,033,702 | B2* | 7/2018 | Ford | G06F 21/64 |
| 10,057,204 | B2* | 8/2018 | Miller | H04L 51/222 |
| 10,075,384 | B2* | 9/2018 | Shear | H04L 47/83 |
| 10,075,437 | B1* | 9/2018 | Costigan | H04L 63/166 |
| 10,091,311 | B2* | 10/2018 | Levi | H04L 67/52 |
| 10,129,228 | B1* | 11/2018 | Mobarak | H04L 63/083 |
| 10,148,786 | B1* | 12/2018 | Beaty | H04L 63/0823 |
| 10,152,756 | B2* | 12/2018 | Isaacson | H04L 63/0861 |
| 10,156,842 | B2* | 12/2018 | Wu | H04L 41/12 |
| 10,180,809 | B2* | 1/2019 | Fetik | G06F 21/552 |
| 10,187,394 | B2* | 1/2019 | Bar | H04L 63/102 |
| 10,200,351 | B2* | 2/2019 | Gustavson | H04L 63/168 |
| 10,216,921 | B1* | 2/2019 | Janse Van Rensburg | H04L 63/20 |
| 10,218,697 | B2* | 2/2019 | Cockerill | H04L 63/083 |
| 10,237,280 | B2* | 3/2019 | Day, II | H04L 63/102 |
| 10,250,594 | B2* | 4/2019 | Chathoth | H04L 63/0807 |
| 10,255,061 | B2* | 4/2019 | Lander | G06F 8/656 |
| 10,282,559 | B2* | 5/2019 | Barday | G06F 21/606 |
| 10,284,543 | B2* | 5/2019 | Petrovichev | H04L 63/0823 |
| 10,310,824 | B2* | 6/2019 | Eksten | G06F 8/70 |
| 10,331,471 | B1* | 6/2019 | Viktorov | G06F 21/45 |
| 10,333,706 | B2* | 6/2019 | Smith | H04L 63/0492 |
| 10,341,317 | B2* | 7/2019 | Sahu | H04L 63/102 |
| 10,341,354 | B2* | 7/2019 | Murugesan | G06F 3/0482 |
| 10,348,858 | B2* | 7/2019 | Theebaprakasam | G06F 21/6218 |
| 10,356,088 | B1* | 7/2019 | Peddada | H04L 9/3213 |
| 10,356,112 | B2* | 7/2019 | Wan | H04L 63/1466 |
| 10,360,402 | B2* | 7/2019 | Farkash | H04L 9/0643 |
| 10,395,018 | B2* | 8/2019 | Turgeman | G06F 3/017 |
| 10,404,729 | B2* | 9/2019 | Turgeman | G06F 21/31 |
| 10,425,386 | B2* | 9/2019 | Wardell | H04L 63/0281 |
| 10,425,392 | B2* | 9/2019 | Tal | H04W 12/50 |
| 10,438,017 | B2* | 10/2019 | Barday | H04L 67/52 |
| 10,439,825 | B1* | 10/2019 | Meyer | H04L 9/30 |
| 10,439,970 | B2* | 10/2019 | Charignon | H04L 67/306 |
| 10,440,053 | B2* | 10/2019 | Wyatt | H04L 63/1425 |
| 10,445,395 | B2* | 10/2019 | Carru | H04L 67/53 |
| 10,445,769 | B2* | 10/2019 | Mirisola | G06F 7/24 |
| 10,454,915 | B2* | 10/2019 | Mohamad Abdul | H04L 9/3271 |
| 10,454,973 | B2* | 10/2019 | Barday | H04L 63/20 |
| 10,460,319 | B2* | 10/2019 | Wong | G06Q 20/36 |
| 10,462,171 | B2* | 10/2019 | Weingarten | H04L 63/102 |
| 10,467,432 | B2* | 11/2019 | Barday | G06F 21/552 |
| 10,476,900 | B2* | 11/2019 | Muttik | G06F 21/629 |
| 10,484,382 | B2* | 11/2019 | Wilson | H04L 63/0281 |
| 10,497,037 | B2* | 12/2019 | Isaacson | G06F 16/951 |
| 10,509,920 | B2* | 12/2019 | Barday | G06F 16/113 |
| 10,511,589 | B2* | 12/2019 | Gangawane | H04L 63/10 |
| 10,528,551 | B2* | 1/2020 | Li | H04L 9/0637 |
| 10,542,031 | B2* | 1/2020 | Petry | G06F 21/53 |
| 10,554,624 | B2* | 2/2020 | Ott | H04L 63/083 |
| 10,559,193 | B2* | 2/2020 | Naidoo | G08B 13/19695 |
| 10,565,161 | B2* | 2/2020 | Barday | G06F 21/6245 |
| 10,574,692 | B2* | 2/2020 | Drake | H04L 63/0853 |
| 10,581,820 | B2* | 3/2020 | Keshava | H04L 9/0894 |
| 10,582,001 | B2* | 3/2020 | Straub | H04W 12/37 |
| 10,585,682 | B2* | 3/2020 | Jain | G06F 9/451 |
| 10,599,486 | B1* | 3/2020 | Borkar | G06F 21/629 |
| 10,599,497 | B2* | 3/2020 | Batinich | G06F 9/44526 |
| 10,616,224 | B2* | 4/2020 | Subramanian | H04L 67/146 |
| 10,621,377 | B2* | 4/2020 | Le Jouan | G06F 21/6263 |
| 10,623,508 | B2* | 4/2020 | Chauhan | H04L 12/66 |
| 10,631,068 | B2* | 4/2020 | Navin | H04N 21/41407 |
| 10,652,225 | B2* | 5/2020 | Koved | H04W 12/065 |
| 10,659,446 | B2* | 5/2020 | Alexander | H04L 63/0861 |
| 10,681,078 | B2* | 6/2020 | Humphries | G06F 21/554 |
| 10,693,865 | B2* | 6/2020 | Manza | H04L 63/10 |
| 10,693,883 | B2* | 6/2020 | Kathiara | H04L 63/104 |
| 10,708,305 | B2* | 7/2020 | Barday | H04L 63/126 |
| 10,708,382 | B2* | 7/2020 | Chauhan | H04L 67/5681 |
| 10,715,510 | B2* | 7/2020 | Ingale | H04L 63/08 |
| 10,726,472 | B2* | 7/2020 | Isaacson | H04L 63/0428 |
| 10,728,239 | B2* | 7/2020 | Maylor | H04L 51/046 |
| 10,742,634 | B1* | 8/2020 | Shahbazi | H04W 12/77 |
| 10,757,104 | B1* | 8/2020 | Goel | H04L 63/08 |
| 10,764,752 | B1* | 9/2020 | Avetisov | H04W 12/08 |
| 10,796,016 | B2* | 10/2020 | Legler | H04L 63/0876 |
| 10,798,133 | B2* | 10/2020 | Barday | G06F 16/9038 |
| 10,824,702 | B1* | 11/2020 | Shahidzadeh | G06F 21/31 |
| 10,831,789 | B2* | 11/2020 | Srinivasan | H04L 63/0815 |
| 10,832,310 | B2* | 11/2020 | Isaacson | G06Q 20/401 |
| 10,834,590 | B2* | 11/2020 | Turgeman | G06F 21/316 |
| 10,838,780 | B2* | 11/2020 | Roy | G06F 9/541 |
| 10,841,316 | B2* | 11/2020 | Innes | H04L 63/0823 |
| 10,846,390 | B2* | 11/2020 | Subramanian | G06F 16/86 |
| 10,846,432 | B2* | 11/2020 | Pedersen | G06F 21/45 |
| 10,848,523 | B2* | 11/2020 | Brannon | G06F 16/9038 |
| 10,862,978 | B2* | 12/2020 | Borkar | H04L 67/52 |
| 10,862,998 | B2* | 12/2020 | Fleck | G06F 16/16 |
| 10,867,209 | B2* | 12/2020 | Coven | H04N 21/23418 |
| 10,873,606 | B2* | 12/2020 | Brannon | G06N 20/00 |

(56) References Cited

U.S. PATENT DOCUMENTS

| | | | | |
|---|---|---|---|---|
| 10,880,340 B2* | 12/2020 | Harrison | | H04N 21/278 |
| 10,893,034 B2 | 1/2021 | Bethke, II | | G06Q 20/387 |
| 10,911,491 B2* | 2/2021 | Kraemer | | H04L 63/0272 |
| 10,911,926 B2* | 2/2021 | Pellegrini | | H04W 4/021 |
| 10,917,389 B2* | 2/2021 | Chor | | H04L 63/029 |
| 10,917,431 B2* | 2/2021 | Turgeman | | G06F 21/31 |
| 10,924,377 B2* | 2/2021 | Chauhan | | H04L 63/08 |
| 10,924,466 B2* | 2/2021 | Biyani | | G06F 21/64 |
| 10,931,452 B2* | 2/2021 | Ayyadevara | | H04L 9/3226 |
| 10,931,656 B2* | 2/2021 | Carru | | H04L 63/0428 |
| 10,938,792 B2* | 3/2021 | Bikumala | | H04L 63/0823 |
| 10,939,295 B1* | 3/2021 | Avetisov | | H04L 9/3247 |
| 10,950,330 B2* | 3/2021 | Dempers | | G06F 16/27 |
| 10,951,606 B1* | 3/2021 | Shahidzadeh | | H04L 63/107 |
| 10,958,640 B2* | 3/2021 | Divoux | | H04L 63/0815 |
| 10,977,354 B1* | 4/2021 | Depaolo | | G06F 21/34 |
| 10,986,124 B2* | 4/2021 | Thomas | | G06F 21/45 |
| 11,003,421 B2* | 5/2021 | Bodin | | G06Q 10/101 |
| 11,004,139 B2* | 5/2021 | Isaacson | | G06Q 30/0625 |
| 11,005,839 B1* | 5/2021 | Shahidzadeh | | H04W 12/06 |
| 11,005,891 B2* | 5/2021 | Chauhan | | H04L 63/20 |
| 11,012,444 B2* | 5/2021 | Bansal | | H04L 63/102 |
| 11,017,372 B2* | 5/2021 | Zou | | H04L 63/0281 |
| 11,019,066 B2* | 5/2021 | Borkar | | G06F 8/61 |
| 11,032,309 B2* | 6/2021 | Petry | | H04L 45/306 |
| 11,038,925 B2* | 6/2021 | Brannon | | H04L 63/0227 |
| 11,055,119 B1* | 7/2021 | Silverstein | | G06N 3/08 |
| 11,062,403 B2* | 7/2021 | Kerr | | H04L 61/4547 |
| 11,063,953 B2* | 7/2021 | Chauhan | | H04L 63/107 |
| 11,064,039 B2* | 7/2021 | Chauhan | | H04L 41/5096 |
| 11,082,229 B2* | 8/2021 | Rule | | H04L 63/0853 |
| 11,087,008 B2* | 8/2021 | Borkar | | G06F 21/62 |
| 11,089,107 B1* | 8/2021 | Chor | | H04L 63/08 |
| 11,093,944 B1* | 8/2021 | Tesser | | H04W 4/80 |
| 11,095,506 B1* | 8/2021 | Erblat | | H04L 67/51 |
| 11,095,688 B2* | 8/2021 | Chauhan | | G06F 21/6245 |
| 11,096,059 B1* | 8/2021 | Shahidzadeh | | G06Q 50/10 |
| 11,102,259 B2* | 8/2021 | Bradley | | H04N 21/44227 |
| 11,106,515 B1* | 8/2021 | Fakhraie | | G06Q 20/4014 |
| 11,115,419 B2* | 9/2021 | Gokhale | | H04L 63/108 |
| 11,120,158 B2* | 9/2021 | Hockey | | G06Q 20/02 |
| 11,120,461 B1* | 9/2021 | Atwood | | G06Q 30/0633 |
| 11,120,702 B2* | 9/2021 | Douglas | | G06F 9/44526 |
| 11,153,285 B2* | 10/2021 | Chauhan | | H04L 63/0281 |
| 11,153,306 B2* | 10/2021 | Chauhan | | H04L 63/20 |
| 11,165,789 B1* | 11/2021 | Smith | | H04W 12/062 |
| 11,170,116 B2* | 11/2021 | Mousseau | | H04L 63/0435 |
| 11,171,939 B1* | 11/2021 | Blank | | H04L 63/18 |
| 11,171,950 B1* | 11/2021 | Zhuravlev | | H04L 67/1097 |
| 11,172,029 B2* | 11/2021 | Chauhan | | H04L 67/02 |
| 11,173,517 B2* | 11/2021 | Ansari | | B05D 3/002 |
| 11,182,379 B2* | 11/2021 | Yang | | G06F 16/2379 |
| 11,184,224 B2* | 11/2021 | Johnson | | H04L 41/0809 |
| 11,210,670 B2* | 12/2021 | Loganathan | | G06Q 20/322 |
| 11,226,727 B2* | 1/2022 | Chauhan | | H04L 63/08 |
| 11,228,583 B2* | 1/2022 | Chauhan | | H04L 63/0236 |
| 11,228,620 B2* | 1/2022 | Brannon | | H04L 63/302 |
| 11,240,275 B1* | 2/2022 | Vashisht | | H04L 63/145 |
| 11,252,149 B1* | 2/2022 | Bang | | G06F 3/167 |
| 11,258,775 B2* | 2/2022 | Lander | | H04L 9/0894 |
| 11,277,416 B2* | 3/2022 | Ray | | H04L 63/123 |
| 11,303,633 B1* | 4/2022 | Williams | | H04L 63/20 |
| 11,303,659 B2* | 4/2022 | Yu | | G06F 9/54 |
| 11,310,281 B2* | 4/2022 | Hubbard | | G06Q 20/409 |
| 11,314,532 B2* | 4/2022 | Borkar | | G06F 8/61 |
| 11,316,829 B2* | 4/2022 | Harvey | | H04L 63/083 |
| 11,328,077 B2* | 5/2022 | Fleck | | G06F 9/543 |
| 11,329,980 B2* | 5/2022 | Callahan | | H04L 63/0823 |
| 11,330,096 B2* | 5/2022 | Horelik | | H04M 15/39 |
| 11,354,443 B2* | 6/2022 | Balzamo, Jr. | | H04L 63/08 |
| 11,356,440 B2* | 6/2022 | Mangalvedkar | | H04W 4/50 |
| 11,381,610 B2* | 7/2022 | Le Strat | | H04L 65/403 |
| 11,386,186 B2* | 7/2022 | Siddiquee | | G06F 16/972 |
| 11,387,986 B1* | 7/2022 | Ghetti | | H04L 63/065 |
| 11,392,927 B2* | 7/2022 | Maus | | G06Q 20/30 |
| 11,429,712 B2* | 8/2022 | Ortiz | | G07G 1/009 |
| 11,438,330 B2* | 9/2022 | Garcia | | H04L 63/0861 |
| 11,444,935 B2* | 9/2022 | Chan | | H04L 63/0428 |
| 11,451,500 B2* | 9/2022 | Xu | | H04L 63/0838 |
| 11,455,641 B1* | 9/2022 | Shahidzadeh | | H04L 63/0892 |
| 11,470,090 B2* | 10/2022 | Han | | H04L 63/08 |
| 11,475,146 B2* | 10/2022 | Chauhan | | H04L 67/02 |
| 11,483,312 B2* | 10/2022 | Han | | H04L 63/0884 |
| 11,503,010 B2* | 11/2022 | Hockey | | H04L 9/3228 |
| 11,503,031 B1* | 11/2022 | Hu | | H04L 67/1097 |
| 11,522,867 B2* | 12/2022 | Han | | H04L 63/105 |
| 11,537,502 B1* | 12/2022 | Rohithakshappa | | G06F 8/74 |
| 11,537,701 B2* | 12/2022 | McFarland, Jr. | | G06F 21/34 |
| 11,550,796 B2* | 1/2023 | Gaur | | H04L 9/0643 |
| 11,550,879 B2* | 1/2023 | Lev-Ami | | H04L 9/32 |
| 11,558,373 B2* | 1/2023 | Chitkara | | H04L 9/3228 |
| 11,570,203 B2* | 1/2023 | Summers | | H04L 63/20 |
| 11,574,312 B2* | 2/2023 | Hammad | | H04L 9/321 |
| 11,588,801 B1* | 2/2023 | Manghnani | | G06F 8/60 |
| 11,604,842 B1* | 3/2023 | O'Donnell | | G06F 16/9558 |
| 11,607,615 B2* | 3/2023 | Toksoz | | H04L 63/0876 |
| 11,611,548 B2* | 3/2023 | Kumar | | H04W 12/06 |
| 11,657,389 B2* | 5/2023 | Eng | | G06Q 20/385 |
| | | | | 705/44 |
| 11,681,568 B1* | 6/2023 | Hinrichs | | H04L 67/10 |
| | | | | 726/1 |
| 11,687,378 B2* | 6/2023 | Bhargava | | H04L 63/0245 |
| | | | | 726/5 |
| 11,734,032 B1* | 8/2023 | Brinkhoff | | G06F 3/0481 |
| | | | | 715/204 |
| 11,743,257 B2* | 8/2023 | Goldstein | | H04L 63/101 |
| | | | | 726/1 |
| 11,757,891 B1* | 9/2023 | Sahay | | H04L 63/08 |
| | | | | 726/4 |
| 11,785,119 B2* | 10/2023 | Rezek | | H04L 67/63 |
| | | | | 709/227 |
| 11,792,226 B2* | 10/2023 | Vaishnavi | | G06F 16/00 |
| | | | | 726/3 |
| 11,829,335 B1* | 11/2023 | Guggulla | | G06F 21/44 |
| 11,869,005 B2* | 1/2024 | Hockey | | G06F 21/62 |
| 11,870,770 B2* | 1/2024 | Lao | | H04L 67/1095 |
| 11,887,112 B2* | 1/2024 | Dikhit | | G06Q 20/3827 |
| 2001/0032878 A1* | 10/2001 | Tsiounis | | G06Q 20/18 |
| | | | | 235/379 |
| 2001/0044787 A1* | 11/2001 | Shwartz | | G06Q 20/12 |
| | | | | 705/78 |
| 2002/0010684 A1* | 1/2002 | Moskowitz | | G06Q 20/40 |
| | | | | 713/176 |
| 2002/0029275 A1* | 3/2002 | Selgas | | H04L 63/083 |
| | | | | 709/227 |
| 2002/0071564 A1* | 6/2002 | Kurn | | H04L 63/08 |
| | | | | 380/281 |
| 2002/0116616 A1* | 8/2002 | Mi | | H04L 63/168 |
| | | | | 713/168 |
| 2002/0129088 A1* | 9/2002 | Zhou | | H04L 67/34 |
| | | | | 709/200 |
| 2002/0143944 A1* | 10/2002 | Traversat | | H04L 67/107 |
| | | | | 709/225 |
| 2002/0144109 A1* | 10/2002 | Benantar | | H04L 9/006 |
| | | | | 713/156 |
| 2002/0165912 A1* | 11/2002 | Wenocur | | H04L 51/00 |
| | | | | 709/203 |
| 2002/0178360 A1* | 11/2002 | Wenocur | | H04L 63/12 |
| | | | | 713/170 |
| 2002/0194483 A1* | 12/2002 | Wenocur | | H04L 63/126 |
| | | | | 713/185 |
| 2002/0194501 A1* | 12/2002 | Wenocur | | H04L 67/55 |
| | | | | 726/4 |
| 2002/0196935 A1* | 12/2002 | Wenocur | | H04L 63/12 |
| | | | | 380/37 |
| 2002/0198888 A1* | 12/2002 | Young | | G06F 9/4881 |
| 2002/0199001 A1* | 12/2002 | Wenocur | | H04L 69/329 |
| | | | | 709/227 |
| 2002/0199096 A1* | 12/2002 | Wenocur | | H04L 51/00 |
| | | | | 713/153 |
| 2003/0041110 A1* | 2/2003 | Wenocur | | H04L 65/80 |
| | | | | 709/206 |

(56) References Cited

U.S. PATENT DOCUMENTS

| | | | |
|---|---|---|---|
| 2003/0065921 A1* | 4/2003 | Chang | H04L 9/006 713/175 |
| 2003/0115267 A1* | 6/2003 | Hinton | G06F 21/41 709/204 |
| 2003/0163733 A1* | 8/2003 | Barriga-Caceres | H04L 67/51 726/5 |
| 2003/0195858 A1* | 10/2003 | Watanabe | G06Q 30/06 705/64 |
| 2003/0195967 A1* | 10/2003 | Selgas | H04L 63/04 709/228 |
| 2003/0196080 A1* | 10/2003 | Karman | H04L 63/045 713/150 |
| 2004/0002902 A1* | 1/2004 | Muehlhaeuser | H04M 3/493 705/26.1 |
| 2004/0054899 A1* | 3/2004 | Balfanz | H04L 67/12 713/168 |
| 2004/0088333 A1* | 5/2004 | Sidman | H04L 63/102 |
| 2004/0098581 A1* | 5/2004 | Balfanz | H04L 9/40 713/155 |
| 2004/0107366 A1* | 6/2004 | Balfanz | H04L 67/12 726/5 |
| 2004/0123144 A1* | 6/2004 | Chan | H04L 63/0815 726/8 |
| 2004/0139327 A1* | 7/2004 | Brown | G06F 21/34 713/176 |
| 2004/0176071 A1* | 9/2004 | Gehrmann | H04W 12/08 455/411 |
| 2004/0221163 A1* | 11/2004 | Jorgensen | H04L 9/3066 713/182 |
| 2004/0225716 A1* | 11/2004 | Shamir | H04L 9/40 709/204 |
| 2004/0242228 A1* | 12/2004 | Lee | H04W 12/04 455/432.1 |
| 2004/0243349 A1* | 12/2004 | Greifeneder | H04L 63/1408 702/183 |
| 2004/0249768 A1* | 12/2004 | Kontio | G06Q 20/3674 705/65 |
| 2004/0249927 A1* | 12/2004 | Pezutti | H04L 41/5006 709/223 |
| 2004/0254848 A1* | 12/2004 | Golan | G06Q 20/12 705/26.1 |
| 2004/0268119 A1* | 12/2004 | Smetters | H04L 9/00 713/171 |
| 2005/0071630 A1* | 3/2005 | Thornton | H04L 9/3226 713/156 |
| 2005/0076216 A1* | 4/2005 | Nyberg | H04L 63/061 713/168 |
| 2005/0100166 A1* | 5/2005 | Smetters | H04L 63/0492 726/4 |
| 2005/0114545 A1* | 5/2005 | Gopalan | H04L 69/329 709/245 |
| 2005/0125669 A1* | 6/2005 | Stewart | H04L 63/061 713/171 |
| 2005/0129240 A1* | 6/2005 | Balfanz | H04L 63/06 380/270 |
| 2005/0135624 A1* | 6/2005 | Tsai | H04L 63/0853 380/270 |
| 2005/0163078 A1* | 7/2005 | Oba | H04W 12/062 370/331 |
| 2005/0166041 A1* | 7/2005 | Brown | H04L 63/0823 713/150 |
| 2005/0172018 A1* | 8/2005 | Devine | H04L 67/02 707/E17.107 |
| 2005/0177723 A1* | 8/2005 | Huang | H04L 9/3247 713/168 |
| 2005/0184145 A1* | 8/2005 | Law | G06Q 20/4012 235/380 |
| 2005/0193118 A1* | 9/2005 | Le | H04L 63/08 709/227 |
| 2005/0204168 A1* | 9/2005 | Johnston | H04W 12/062 713/182 |
| 2005/0235044 A1* | 10/2005 | Tazuma | G06F 16/9574 709/217 |
| 2006/0021017 A1* | 1/2006 | Hinton | H04L 63/0815 726/10 |
| 2006/0031494 A1* | 2/2006 | Marcus | H04L 67/02 709/225 |
| 2006/0031510 A1* | 2/2006 | Beck | H04L 67/63 709/226 |
| 2006/0041759 A1* | 2/2006 | Kaliski | H04L 63/083 713/184 |
| 2006/0104234 A1* | 5/2006 | Zhang | H04W 12/069 709/225 |
| 2006/0136595 A1* | 6/2006 | Satyavolu | G06Q 40/02 709/229 |
| 2006/0136990 A1* | 6/2006 | Hinton | H04L 63/0815 726/2 |
| 2006/0146803 A1* | 7/2006 | Bae | H04L 63/0869 370/352 |
| 2006/0155985 A1* | 7/2006 | Canard | H04L 63/0823 713/156 |
| 2006/0165083 A1* | 7/2006 | Lee | H04L 65/765 370/392 |
| 2006/0176852 A1* | 8/2006 | Wu | H04W 12/062 370/331 |
| 2006/0179307 A1* | 8/2006 | Stieglitz | H04W 12/062 713/168 |
| 2006/0185004 A1* | 8/2006 | Song | H04L 63/0815 726/8 |
| 2006/0187858 A1* | 8/2006 | Kenichi | H04L 63/0272 370/254 |
| 2006/0224686 A1* | 10/2006 | Kitada | G06Q 10/10 709/209 |
| 2006/0239235 A1* | 10/2006 | Oswal | H04L 67/14 370/466 |
| 2006/0248036 A1* | 11/2006 | Stanev | G06F 11/1482 |
| 2006/0248119 A1* | 11/2006 | Stanev | G06F 9/461 |
| 2006/0248198 A1* | 11/2006 | Galchev | G06F 11/1438 709/227 |
| 2006/0248199 A1* | 11/2006 | Stanev | H04L 67/145 709/227 |
| 2006/0248200 A1* | 11/2006 | Stanev | H04L 67/14 709/227 |
| 2006/0248350 A1* | 11/2006 | Stanev | H04L 67/14 713/189 |
| 2006/0277596 A1* | 12/2006 | Calvert | H04L 63/0218 726/3 |
| 2006/0294366 A1* | 12/2006 | Nadalin | H04L 9/3271 713/156 |
| 2007/0005801 A1* | 1/2007 | Kumar | H04L 63/08 709/238 |
| 2007/0022292 A1* | 1/2007 | Thayer | H04L 63/0823 713/176 |
| 2007/0038862 A1* | 2/2007 | Noble | G06F 21/6209 713/156 |
| 2007/0049335 A1* | 3/2007 | Haitani | G06F 3/0481 455/566 |
| 2007/0055781 A1* | 3/2007 | Fleischer | H04L 67/133 709/227 |
| 2007/0061869 A1* | 3/2007 | DeHaas | G06F 21/6209 726/2 |
| 2007/0064673 A1* | 3/2007 | Bhandaru | H04W 40/246 370/351 |
| 2007/0082656 A1* | 4/2007 | Stieglitz | H04L 63/08 713/168 |
| 2007/0101145 A1* | 5/2007 | Sachdeva | H04L 63/12 713/176 |
| 2007/0106897 A1* | 5/2007 | Kulakowski | H04L 9/083 713/168 |
| 2007/0174467 A1* | 7/2007 | Ballou, Jr. | H04L 63/0838 709/227 |
| 2007/0185814 A1* | 8/2007 | Boccon-Gibod | H04L 9/3242 705/51 |
| 2007/0198674 A1* | 8/2007 | Li | H04L 67/142 709/217 |
| 2007/0204078 A1* | 8/2007 | Boccon-Gibod | G06F 21/64 710/54 |

(56) References Cited

U.S. PATENT DOCUMENTS

| | | | |
|---|---|---|---|
| 2007/0204155 A1* | 8/2007 | Dutta | H04W 36/0016 713/168 |
| 2007/0208936 A1* | 9/2007 | Ramos Robles | H04L 63/0815 713/168 |
| 2007/0213033 A1* | 9/2007 | Alper | H04W 12/062 455/411 |
| 2007/0214454 A1* | 9/2007 | Edwards | G06F 16/957 717/176 |
| 2007/0234408 A1* | 10/2007 | Burch | G06F 21/31 726/6 |
| 2007/0261108 A1* | 11/2007 | Lee | H04N 21/6582 348/E7.06 |
| 2007/0282757 A1* | 12/2007 | Pandya | G06F 21/31 705/76 |
| 2007/0294752 A1* | 12/2007 | Kinser | G06F 21/33 726/8 |
| 2007/0297430 A1* | 12/2007 | Nykanen | H04W 12/069 370/408 |
| 2008/0002653 A1* | 1/2008 | Hung | H04W 12/062 713/168 |
| 2008/0092215 A1* | 4/2008 | Soukup | H04L 63/0815 726/5 |
| 2008/0109553 A1* | 5/2008 | Fowler | G06Q 30/02 709/229 |
| 2008/0132235 A1* | 6/2008 | Hancock | H04W 12/068 455/436 |
| 2008/0134306 A1* | 6/2008 | Krishnan | H04W 12/068 726/5 |
| 2008/0212771 A1* | 9/2008 | Hauser | G07F 7/1008 726/6 |
| 2008/0222299 A1* | 9/2008 | Boodaei | H04L 63/1466 709/229 |
| 2008/0270803 A1* | 10/2008 | Zizzi | G06F 21/34 713/186 |
| 2008/0271120 A1* | 10/2008 | Parkes | H04L 63/101 726/3 |
| 2008/0271121 A1* | 10/2008 | Hinton | H04L 63/0815 726/4 |
| 2008/0282327 A1* | 11/2008 | Winget | H04L 63/10 726/4 |
| 2008/0307506 A1* | 12/2008 | Saldhana | H04L 63/20 726/4 |
| 2008/0310366 A1* | 12/2008 | Oba | H04W 12/062 726/8 |
| 2009/0007248 A1* | 1/2009 | Kovaleski | G06F 21/41 726/8 |
| 2009/0028101 A1* | 1/2009 | Kakumaru | H04W 12/062 370/329 |
| 2009/0037514 A1* | 2/2009 | Lankford | H04L 67/1001 709/201 |
| 2009/0037544 A1* | 2/2009 | Wang | H04L 51/04 709/206 |
| 2009/0055642 A1* | 2/2009 | Myers | H04L 9/3263 713/155 |
| 2009/0064088 A1* | 3/2009 | Barcia | G06F 11/3636 717/102 |
| 2009/0064102 A1* | 3/2009 | Barcia | G06F 11/3636 717/113 |
| 2009/0119364 A1* | 5/2009 | Guillon | H04L 67/04 713/184 |
| 2009/0119754 A1* | 5/2009 | Schubert | H04W 12/062 726/4 |
| 2009/0147957 A1* | 6/2009 | Murray | H04L 63/0853 380/259 |
| 2009/0150989 A1* | 6/2009 | Hoey | G06F 21/33 726/10 |
| 2009/0186601 A1* | 7/2009 | Hahn | H04W 12/065 455/411 |
| 2009/0222905 A1* | 9/2009 | Choi | G11B 20/00463 726/11 |
| 2009/0235069 A1* | 9/2009 | Sonnega | H04L 63/0823 713/176 |
| 2009/0240936 A1* | 9/2009 | Lambiase | H04L 9/3263 713/156 |
| 2009/0259838 A1* | 10/2009 | Lin | H04L 9/3215 713/150 |
| 2009/0276667 A1* | 11/2009 | Dopson | G06F 9/5027 709/227 |
| 2009/0307496 A1* | 12/2009 | Hahn | H04L 63/0428 380/272 |
| 2009/0319776 A1* | 12/2009 | Burch | H04L 63/08 713/168 |
| 2009/0328187 A1* | 12/2009 | Meisel | H04L 63/0227 726/13 |
| 2010/0005168 A1* | 1/2010 | Williams | G06F 16/44 709/224 |
| 2010/0030862 A1* | 2/2010 | Chen | H04L 67/02 709/224 |
| 2010/0088698 A1* | 4/2010 | Krishnamurthy | H04L 63/10 718/1 |
| 2010/0091733 A1* | 4/2010 | Hahn | H04W 12/062 370/331 |
| 2010/0131654 A1* | 5/2010 | Malakapalli | H04L 67/08 709/227 |
| 2010/0174900 A1* | 7/2010 | Lin | H04L 63/1483 726/3 |
| 2010/0198712 A1* | 8/2010 | Benisti | G06Q 10/107 713/176 |
| 2010/0198730 A1* | 8/2010 | Ahmed | G06F 21/30 380/278 |
| 2010/0250497 A1* | 9/2010 | Redlich | G06Q 10/06 707/661 |
| 2010/0257451 A1* | 10/2010 | Halevi | H04L 67/02 709/248 |
| 2010/0257582 A1* | 10/2010 | Castellanos Zamora | H04L 65/1045 726/4 |
| 2010/0263032 A1* | 10/2010 | Bhuyan | H04L 63/061 726/12 |
| 2010/0299525 A1* | 11/2010 | Shah | H04L 63/0823 713/171 |
| 2010/0313014 A1* | 12/2010 | Medvinsky | G06F 21/33 726/30 |
| 2011/0035294 A1* | 2/2011 | Mizrah | G06F 21/33 705/26.42 |
| 2011/0055573 A1* | 3/2011 | Low | H04L 67/535 713/172 |
| 2011/0066849 A1* | 3/2011 | Niccolini | H04L 63/0823 713/156 |
| 2011/0107099 A1* | 5/2011 | Pan | H04L 63/0807 713/168 |
| 2011/0126207 A1* | 5/2011 | Wipfel | G06F 9/45533 718/104 |
| 2011/0162052 A1* | 6/2011 | Hayward | G06F 21/577 726/5 |
| 2011/0185411 A1* | 7/2011 | Selgas | H04L 63/0464 726/7 |
| 2011/0208657 A1* | 8/2011 | Rao | H04W 12/068 705/41 |
| 2011/0209210 A1* | 8/2011 | Miller | G06F 21/41 726/8 |
| 2011/0214176 A1* | 9/2011 | Burch | G06F 9/45533 718/1 |
| 2011/0215921 A1* | 9/2011 | Ben Ayed | H04W 12/06 340/539.11 |
| 2011/0238988 A1* | 9/2011 | Tanaka | H04L 9/32 713/168 |
| 2011/0239270 A1* | 9/2011 | Sovio | H04W 4/60 726/1 |
| 2011/0251992 A1* | 10/2011 | Bethlehem | H04L 67/141 707/610 |
| 2011/0265172 A1* | 10/2011 | Sharma | H04L 63/0815 726/8 |
| 2011/0295988 A1* | 12/2011 | Le Jouan | G06F 21/31 709/223 |
| 2011/0296440 A1* | 12/2011 | Laurich | H04L 67/1097 719/326 |

(56) References Cited

U.S. PATENT DOCUMENTS

| | | | |
|---|---|---|---|
| 2011/0314532 A1* | 12/2011 | Austin | H04L 63/0892 726/8 |
| 2012/0005731 A1* | 1/2012 | Lei | H04W 12/062 726/6 |
| 2012/0011576 A1* | 1/2012 | Guan | H04L 63/0892 726/7 |
| 2012/0011578 A1* | 1/2012 | Hinton | H04L 63/0815 726/8 |
| 2012/0017088 A1* | 1/2012 | Liu | H04W 12/062 713/171 |
| 2012/0042358 A1* | 2/2012 | Kondur | G09B 7/02 726/3 |
| 2012/0054625 A1* | 3/2012 | Pugh | G06F 21/105 715/736 |
| 2012/0089659 A1* | 4/2012 | Halevi | G06Q 10/101 709/201 |
| 2012/0096271 A1* | 4/2012 | Ramarathinam | H04L 63/168 709/227 |
| 2012/0124369 A1* | 5/2012 | Amenedo | H04L 63/062 713/156 |
| 2012/0131647 A1* | 5/2012 | Lan | H04L 67/02 726/4 |
| 2012/0143752 A1* | 6/2012 | Wong | G06Q 20/4012 705/41 |
| 2012/0151568 A1* | 6/2012 | Pieczul | H04L 63/0815 726/8 |
| 2012/0185911 A1* | 7/2012 | Polite | H04L 63/102 726/1 |
| 2012/0204231 A1* | 8/2012 | Holtmanns | H04W 12/0431 726/3 |
| 2012/0226611 A1* | 9/2012 | Radia | G06Q 20/385 705/44 |
| 2012/0233668 A1* | 9/2012 | Leafe | G06F 9/44526 726/4 |
| 2012/0260321 A1* | 10/2012 | Wendt | H04L 67/02 726/5 |
| 2012/0260329 A1* | 10/2012 | Suffling | H04L 63/104 726/5 |
| 2012/0266258 A1* | 10/2012 | Tuchman | H04L 63/083 726/28 |
| 2012/0284632 A1* | 11/2012 | Baird | G06F 9/452 715/749 |
| 2012/0291090 A1* | 11/2012 | Srinivasan | G06F 21/604 726/4 |
| 2012/0300937 A1* | 11/2012 | Burbridge | H04L 9/3234 380/278 |
| 2012/0324242 A1* | 12/2012 | Kirsch | G06F 21/6245 713/189 |
| 2013/0007840 A1* | 1/2013 | Sabin | H04L 67/10 726/3 |
| 2013/0007845 A1* | 1/2013 | Chang | H04L 63/104 726/4 |
| 2013/0067225 A1* | 3/2013 | Shochet | H04L 9/0662 713/165 |
| 2013/0080503 A1* | 3/2013 | Dean | G06F 11/3656 709/203 |
| 2013/0080570 A1* | 3/2013 | Anderson, Jr. | H04L 43/50 709/217 |
| 2013/0080832 A1* | 3/2013 | Dean | G16Z 99/00 714/E11.178 |
| 2013/0086657 A1* | 4/2013 | Srinivasan | H04L 9/3234 726/6 |
| 2013/0091582 A1* | 4/2013 | Chen | H04N 21/8358 726/26 |
| 2013/0133048 A1* | 5/2013 | Wyn-Harris | H04L 63/102 726/5 |
| 2013/0136253 A1* | 5/2013 | Liberman Ben-Ami | H04M 3/5191 379/265.09 |
| 2013/0143513 A1* | 6/2013 | Ginter | H04W 12/02 455/404.1 |
| 2013/0190968 A1* | 7/2013 | Nitzberg | B60L 3/0069 701/31.9 |
| 2013/0219456 A1* | 8/2013 | Sharma | H04L 9/0894 726/1 |
| 2013/0238903 A1* | 9/2013 | Mizunuma | G06F 21/31 713/176 |
| 2013/0239089 A1* | 9/2013 | Eksten | G06F 8/20 717/120 |
| 2013/0239185 A1* | 9/2013 | Orttung | H04L 63/08 726/5 |
| 2013/0246225 A1* | 9/2013 | Biltz | G06Q 50/01 705/27.1 |
| 2013/0263211 A1* | 10/2013 | Neuman | H04L 63/083 726/1 |
| 2013/0275574 A1* | 10/2013 | Hugard, IV | H04L 63/10 709/224 |
| 2013/0276053 A1* | 10/2013 | Hugard, IV | H04L 63/104 726/1 |
| 2013/0276146 A1* | 10/2013 | Gilani | H04L 63/10 726/29 |
| 2013/0291070 A1* | 10/2013 | Triantafillou | H04L 63/08 726/4 |
| 2013/0305041 A1* | 11/2013 | Bar-El | H04L 63/0823 713/156 |
| 2013/0305392 A1* | 11/2013 | Bar-El | H04L 9/3226 726/29 |
| 2013/0318347 A1* | 11/2013 | Moffat | H04L 63/0435 713/168 |
| 2013/0326075 A1* | 12/2013 | Thywessen | H04L 65/1083 709/227 |
| 2013/0326595 A1* | 12/2013 | Myers | G07C 9/00571 726/4 |
| 2014/0007222 A1* | 1/2014 | Qureshi | H04L 67/10 726/16 |
| 2014/0013394 A1* | 1/2014 | Dhesi | H04L 63/08 726/3 |
| 2014/0020083 A1* | 1/2014 | Fetik | G06F 21/78 726/11 |
| 2014/0040987 A1* | 2/2014 | Haugsnes | H04L 63/08 726/3 |
| 2014/0068702 A1* | 3/2014 | Hyndman | H04L 63/0815 726/1 |
| 2014/0095637 A1* | 4/2014 | Cropper | H04L 65/60 709/204 |
| 2014/0096190 A1* | 4/2014 | Subramanya | G06F 21/335 726/3 |
| 2014/0108542 A1* | 4/2014 | Cheng | H04L 67/306 709/204 |
| 2014/0136837 A1* | 5/2014 | Baylina | H04W 12/069 726/4 |
| 2014/0162598 A1* | 6/2014 | Villa-Real | G07F 7/0886 455/411 |
| 2014/0181013 A1* | 6/2014 | Micucci | H04L 63/08 707/610 |
| 2014/0189483 A1* | 7/2014 | Awan | H04L 63/08 715/212 |
| 2014/0189808 A1* | 7/2014 | Mahaffey | G06F 21/6245 726/4 |
| 2014/0189818 A1* | 7/2014 | Meyer | H04L 51/08 726/4 |
| 2014/0195626 A1* | 7/2014 | Ruff | H04W 12/086 709/206 |
| 2014/0208408 A1* | 7/2014 | Bilgen | H04L 63/0815 726/8 |
| 2014/0223175 A1* | 8/2014 | Bhatnagar | H04L 63/18 713/159 |
| 2014/0230076 A1* | 8/2014 | Micucci | H04L 63/08 726/28 |
| 2014/0244998 A1* | 8/2014 | Amenedo | H04L 63/126 713/156 |
| 2014/0245015 A1* | 8/2014 | Velamoor | H04L 63/108 713/171 |
| 2014/0279546 A1* | 9/2014 | Poole | H04B 5/72 705/44 |
| 2014/0280498 A1* | 9/2014 | Frankel | H04L 65/764 709/203 |

(56) References Cited

U.S. PATENT DOCUMENTS

| | | | |
|---|---|---|---|
| 2014/0280952 A1* | 9/2014 | Shear | H04L 63/10 709/226 |
| 2014/0282586 A1* | 9/2014 | Shear | G06F 9/5072 718/104 |
| 2014/0282978 A1* | 9/2014 | Lerner | H04L 63/083 726/7 |
| 2014/0298010 A1* | 10/2014 | Ryan | G06F 21/45 713/158 |
| 2014/0298442 A1* | 10/2014 | Qureshi | H04L 67/10 726/8 |
| 2014/0304836 A1* | 10/2014 | Velamoor | G06F 21/6209 726/28 |
| 2014/0359482 A1* | 12/2014 | Sinn | G06F 16/176 715/753 |
| 2014/0380411 A1* | 12/2014 | Brown | H04L 63/20 726/1 |
| 2015/0007264 A1* | 1/2015 | Maldaner | G06F 21/6218 726/3 |
| 2015/0067089 A1* | 3/2015 | Rajan | H04L 67/02 709/213 |
| 2015/0073807 A1* | 3/2015 | Kumar | G10L 15/30 704/273 |
| 2015/0081472 A1* | 3/2015 | Levin | G06Q 30/0623 705/26.7 |
| 2015/0082373 A1* | 3/2015 | Kottahachchi | G06F 21/30 726/1 |
| 2015/0082396 A1* | 3/2015 | Theebaprakasam | H04L 63/102 726/5 |
| 2015/0088754 A1* | 3/2015 | Kirsch | H04L 63/061 713/171 |
| 2015/0089619 A1* | 3/2015 | Manza | H04L 63/0815 726/8 |
| 2015/0089620 A1* | 3/2015 | Manza | H04L 63/10 726/8 |
| 2015/0128105 A1* | 5/2015 | Sethi | G06F 8/36 717/121 |
| 2015/0135300 A1* | 5/2015 | Ford | G06Q 50/18 726/11 |
| 2015/0161410 A1* | 6/2015 | Andersen | G06F 16/2291 713/165 |
| 2015/0163206 A1* | 6/2015 | McCarthy | G06F 21/6227 726/4 |
| 2015/0178769 A1* | 6/2015 | Mirisola | G06Q 30/0246 705/14.45 |
| 2015/0180844 A1* | 6/2015 | Dimitroff | H04L 63/08 726/5 |
| 2015/0180846 A1* | 6/2015 | Nguyen | G06F 21/41 726/7 |
| 2015/0188956 A1* | 7/2015 | Chauhan | G06Q 30/0281 709/204 |
| 2015/0193744 A1* | 7/2015 | Adleman | H04L 9/3247 705/69 |
| 2015/0205944 A1* | 7/2015 | Turgeman | G06F 3/041 726/7 |
| 2015/0205955 A1* | 7/2015 | Turgeman | H04L 63/10 726/7 |
| 2015/0205957 A1* | 7/2015 | Turgeman | G06F 21/554 726/23 |
| 2015/0205958 A1* | 7/2015 | Turgeman | H04L 63/0861 726/23 |
| 2015/0213246 A1* | 7/2015 | Turgeman | H04L 63/08 726/23 |
| 2015/0213251 A1* | 7/2015 | Turgeman | H04W 12/06 726/7 |
| 2015/0213568 A1* | 7/2015 | Follis | G06Q 50/18 705/311 |
| 2015/0237527 A1* | 8/2015 | Knutson | H04W 12/08 726/4 |
| 2015/0254450 A1* | 9/2015 | Ravi | H04L 63/126 726/8 |
| 2015/0256337 A1* | 9/2015 | Nguyen | H04L 67/141 713/171 |
| 2015/0288666 A1* | 10/2015 | Rao | G16H 40/20 713/171 |
| 2015/0304359 A1* | 10/2015 | Balasaygun | H04L 65/1104 709/228 |
| 2015/0310188 A1* | 10/2015 | Ford | H04L 63/101 726/28 |
| 2015/0326559 A1* | 11/2015 | Kuang | G06F 21/34 726/5 |
| 2015/0381621 A1* | 12/2015 | Innes | H04W 12/069 726/7 |
| 2016/0034305 A1* | 2/2016 | Shear | G06F 16/285 707/722 |
| 2016/0043973 A1* | 2/2016 | Drouin | H04L 51/063 709/206 |
| 2016/0050193 A1* | 2/2016 | Kanov | H04W 12/069 726/7 |
| 2016/0065571 A1* | 3/2016 | Hoyos | H04L 63/0428 713/168 |
| 2016/0080346 A1* | 3/2016 | Kuchta | G06Q 50/01 705/44 |
| 2016/0080374 A1* | 3/2016 | Kondoh | H04L 63/102 726/4 |
| 2016/0092246 A1* | 3/2016 | Lagerblad | G06F 9/44526 719/331 |
| 2016/0094546 A1* | 3/2016 | Innes | H04L 63/0876 713/156 |
| 2016/0109954 A1* | 4/2016 | Harris | G06V 20/20 345/156 |
| 2016/0112394 A1* | 4/2016 | Sahu | H04L 63/102 726/7 |
| 2016/0127358 A1* | 5/2016 | Engelking | H04W 12/088 713/156 |
| 2016/0171354 A1* | 6/2016 | Glasgow | G06Q 30/0207 358/1.14 |
| 2016/0173475 A1* | 6/2016 | Srinivasan | H04L 63/10 726/6 |
| 2016/0191554 A1* | 6/2016 | Kaminsky | H04L 63/1425 726/23 |
| 2016/0210006 A1* | 7/2016 | Bányai | H04L 67/10 |
| 2016/0226665 A1* | 8/2016 | Wuidart | H04W 12/069 |
| 2016/0269370 A1* | 9/2016 | White | H04L 63/0442 |
| 2016/0269411 A1* | 9/2016 | Malachi | H04L 63/0421 |
| 2016/0285871 A1* | 9/2016 | Chathoth | H04L 63/0807 |
| 2016/0291940 A1* | 10/2016 | Searle | H04L 67/303 |
| 2016/0291959 A1* | 10/2016 | Searle | H04L 41/082 |
| 2016/0294605 A1* | 10/2016 | Searle | H04L 41/069 |
| 2016/0294614 A1* | 10/2016 | Searle | H04L 67/34 |
| 2016/0294831 A1* | 10/2016 | Borunda | H04W 12/63 |
| 2016/0294894 A1* | 10/2016 | Miller | G06F 16/24578 |
| 2016/0307194 A1* | 10/2016 | Bhatnagar | H04L 63/0838 |
| 2016/0315910 A1* | 10/2016 | Kaufman | H04L 61/4511 |
| 2016/0344561 A1* | 11/2016 | Grajek | H04L 63/0884 |
| 2016/0344724 A1* | 11/2016 | Shoshan | H04L 63/0428 |
| 2016/0351080 A1* | 12/2016 | Bhatnagar | G09C 5/00 |
| 2017/0006020 A1* | 1/2017 | Falodiya | G06F 8/61 |
| 2017/0019386 A1* | 1/2017 | Ylonen | H04L 9/0891 |
| 2017/0024679 A1* | 1/2017 | Lee | H04N 7/15 |
| 2017/0024781 A1* | 1/2017 | Lee | G06Q 30/0281 |
| 2017/0026322 A1* | 1/2017 | Lee | H04L 65/104 |
| 2017/0026613 A1* | 1/2017 | Lee | G06Q 30/0282 |
| 2017/0032114 A1* | 2/2017 | Turgeman | H04W 12/06 |
| 2017/0034144 A1* | 2/2017 | Kisters | G06Q 20/40 |
| 2017/0039282 A1* | 2/2017 | Krishnaprasad | G06F 16/248 |
| 2017/0041296 A1* | 2/2017 | Ford | G06F 21/64 |
| 2017/0041304 A1* | 2/2017 | Tal | H04L 41/0886 |
| 2017/0048174 A1* | 2/2017 | Charignon | H04L 51/212 |
| 2017/0048209 A1* | 2/2017 | Lohe | G06Q 20/3829 |
| 2017/0048215 A1* | 2/2017 | Straub | H04L 63/0823 |
| 2017/0048234 A1* | 2/2017 | Lohe | H04L 63/0807 |
| 2017/0048235 A1* | 2/2017 | Lohe | G06Q 50/01 |
| 2017/0048319 A1* | 2/2017 | Straub | G06F 16/9574 |
| 2017/0054717 A1* | 2/2017 | Matsuda | H04L 63/0876 |
| 2017/0063551 A1* | 3/2017 | Quinn | H04L 9/0643 |
| 2017/0063842 A1* | 3/2017 | Ahn | H04L 63/123 |
| 2017/0085545 A1* | 3/2017 | Lohe | G06Q 20/10 |

(56) References Cited

U.S. PATENT DOCUMENTS

| | | | |
|---|---|---|---|
| 2017/0085555 A1* | 3/2017 | Bisikalo | G06Q 20/10 |
| 2017/0085587 A1* | 3/2017 | Turgeman | G06F 3/0489 |
| 2017/0099280 A1* | 4/2017 | Goel | H04L 67/146 |
| 2017/0141921 A1* | 5/2017 | Berger | H04L 63/123 |
| 2017/0147809 A1* | 5/2017 | Boss | G06F 21/31 |
| 2017/0149795 A1* | 5/2017 | Day | H04W 4/02 |
| 2017/0155686 A1* | 6/2017 | Yanacek | G06F 21/6218 |
| 2017/0180378 A1* | 6/2017 | Tyler | H04L 63/1433 |
| 2017/0180413 A1* | 6/2017 | Petry | H04L 45/306 |
| 2017/0187536 A1* | 6/2017 | Meriac | H04L 63/166 |
| 2017/0195332 A1* | 7/2017 | Wu | H04L 63/0876 |
| 2017/0206034 A1* | 7/2017 | Fetik | G06F 3/0604 |
| 2017/0214684 A1* | 7/2017 | Gupta | H04W 12/062 |
| 2017/0223026 A1* | 8/2017 | Amiri | H04L 63/20 |
| 2017/0223057 A1* | 8/2017 | Amiri | H04L 67/306 |
| 2017/0264653 A1* | 9/2017 | Bányai | G06Q 10/10 |
| 2017/0277773 A1* | 9/2017 | Iasi | H04W 4/08 |
| 2017/0277774 A1* | 9/2017 | Eigner | G06Q 30/0204 |
| 2017/0289168 A1* | 10/2017 | Bar | H04L 63/1408 |
| 2017/0300910 A1* | 10/2017 | Bethke | G06Q 30/0222 |
| 2017/0310686 A1* | 10/2017 | Ray | H04L 63/08 |
| 2017/0317997 A1* | 11/2017 | Smith | H04L 9/14 |
| 2017/0323087 A1* | 11/2017 | Kline | H04L 63/0876 |
| 2017/0331791 A1* | 11/2017 | Wardell | H04W 12/062 |
| 2017/0331802 A1* | 11/2017 | Keshava | H04L 9/0894 |
| 2017/0331812 A1* | 11/2017 | Lander | H04L 63/0815 |
| 2017/0331813 A1* | 11/2017 | Lander | H04L 63/0815 |
| 2017/0331829 A1* | 11/2017 | Lander | G06F 21/6218 |
| 2017/0331832 A1* | 11/2017 | Lander | H04L 63/102 |
| 2017/0346851 A1* | 11/2017 | Drake | H04L 9/0838 |
| 2017/0359306 A1* | 12/2017 | Thomas | H04L 63/145 |
| 2017/0359370 A1* | 12/2017 | Humphries | G06F 21/6218 |
| 2017/0372046 A1* | 12/2017 | Thomee | H04L 63/0442 |
| 2018/0007059 A1* | 1/2018 | Innes | G06F 21/6218 |
| 2018/0025442 A1* | 1/2018 | Isaacson | H04L 51/48 705/26.62 |
| 2018/0039494 A1* | 2/2018 | Lander | H04L 45/02 |
| 2018/0039501 A1* | 2/2018 | Jain | H04L 43/045 |
| 2018/0039737 A1* | 2/2018 | Dempers | G06F 21/35 |
| 2018/0041491 A1* | 2/2018 | Gupta | G06F 9/547 |
| 2018/0041515 A1* | 2/2018 | Gupta | H04L 63/0815 |
| 2018/0041598 A1* | 2/2018 | Vats | H04L 63/104 |
| 2018/0047014 A1* | 2/2018 | Maus | H04L 63/0853 |
| 2018/0063143 A1* | 3/2018 | Wilson | H04L 67/60 |
| 2018/0069702 A1* | 3/2018 | Ayyadevara | H04W 12/069 |
| 2018/0075231 A1* | 3/2018 | Subramanian | H04L 63/0807 |
| 2018/0077138 A1* | 3/2018 | Bansal | G06Q 20/325 |
| 2018/0077139 A1* | 3/2018 | Schmidt | H04W 12/065 |
| 2018/0077144 A1* | 3/2018 | Gangawane | H04L 63/102 |
| 2018/0081983 A1* | 3/2018 | Carru | H04L 67/5682 |
| 2018/0083826 A1* | 3/2018 | Wilson | H04L 63/0815 |
| 2018/0083915 A1* | 3/2018 | Medam | G06F 16/2246 |
| 2018/0083944 A1* | 3/2018 | Vats | G06F 16/9027 |
| 2018/0083967 A1* | 3/2018 | Subramanian | H04L 63/10 |
| 2018/0083977 A1* | 3/2018 | Murugesan | G06F 3/0482 |
| 2018/0091930 A1* | 3/2018 | Jefferies | G07C 9/00571 |
| 2018/0091974 A1* | 3/2018 | Dickens | G06Q 50/12 |
| 2018/0096552 A1* | 4/2018 | Davis | G07C 13/00 |
| 2018/0097829 A1* | 4/2018 | Muttik | H04L 63/101 |
| 2018/0109549 A1* | 4/2018 | Balasubramanian | H04L 63/1416 |
| 2018/0137303 A1* | 5/2018 | Farkash | G06F 21/6263 |
| 2018/0160309 A1* | 6/2018 | Turgeman | H04L 63/0861 |
| 2018/0167378 A1* | 6/2018 | Kostyukov | H04L 63/0815 |
| 2018/0183805 A1* | 6/2018 | Gonzalez Corona | G06Q 20/401 |
| 2018/0198878 A1* | 7/2018 | Keldenich | H04L 67/563 |
| 2018/0205715 A1* | 7/2018 | Ingale | H04L 67/55 |
| 2018/0232817 A1* | 8/2018 | Isaacson | G06F 3/048 |
| 2018/0233236 A1* | 8/2018 | Dawkins | G16Z 99/00 |
| 2018/0247312 A1* | 8/2018 | Loganathan | G06Q 20/4014 |
| 2018/0262388 A1* | 9/2018 | Johnson | H04L 63/0823 |
| 2018/0278419 A1* | 9/2018 | Higgins | H04L 63/0428 |
| 2018/0278612 A1* | 9/2018 | Pattar | H04L 63/061 |
| 2018/0285466 A1* | 10/2018 | Kovalev | G06F 16/955 |
| 2018/0293371 A1* | 10/2018 | Kisters | G06F 21/34 |
| 2018/0308566 A1* | 10/2018 | Dempers | G06F 16/27 |
| 2018/0316777 A1* | 11/2018 | Batinich | H04L 67/10 |
| 2018/0329693 A1* | 11/2018 | Eksten | G06F 8/65 |
| 2018/0337907 A1* | 11/2018 | Bhansali | H04L 9/3231 |
| 2018/0337914 A1* | 11/2018 | Mohamad Abdul | H04L 9/3213 |
| 2018/0337975 A1* | 11/2018 | Kelly | H04L 63/067 |
| 2018/0359233 A1* | 12/2018 | Alexander | H04W 12/062 |
| 2018/0359234 A1* | 12/2018 | Kobayashi | G06F 21/31 |
| 2018/0359244 A1* | 12/2018 | Cockerill | H04L 63/12 |
| 2019/0005508 A1* | 1/2019 | Saarinen | H04L 67/535 |
| 2019/0007381 A1* | 1/2019 | Isaacson | G06Q 20/12 |
| 2019/0014468 A1* | 1/2019 | Votaw | G06Q 20/1085 |
| 2019/0028468 A1* | 1/2019 | Garcia | G06V 10/95 |
| 2019/0028517 A1* | 1/2019 | Zheng | H04L 65/1046 |
| 2019/0036906 A1* | 1/2019 | Biyani | H04L 63/102 |
| 2019/0044942 A1* | 2/2019 | Gordon | H03M 13/3972 |
| 2019/0052659 A1* | 2/2019 | Weingarten | H04L 63/102 |
| 2019/0068382 A1* | 2/2019 | Theodore | H04W 12/06 |
| 2019/0075130 A1* | 3/2019 | Petry | H04L 63/0209 |
| 2019/0087902 A1* | 3/2019 | Dawkins | G06Q 40/08 |
| 2019/0089757 A1* | 3/2019 | Sorensen | G06F 21/62 |
| 2019/0089809 A1* | 3/2019 | Theebaprakasam | G06F 11/3006 |
| 2019/0095516 A1* | 3/2019 | Srinivasan | H04L 63/102 |
| 2019/0096013 A1* | 3/2019 | Balzamo, Jr. | H04L 63/08 |
| 2019/0098055 A1* | 3/2019 | Pitre | H04L 63/20 |
| 2019/0098056 A1* | 3/2019 | Pitre | G06F 21/6218 |
| 2019/0102162 A1* | 4/2019 | Pitre | H04L 63/104 |
| 2019/0104196 A1* | 4/2019 | Li | H04L 9/0637 |
| 2019/0108419 A1* | 4/2019 | Coven | G06F 8/60 |
| 2019/0121989 A1* | 4/2019 | Mousseau | H04W 4/70 |
| 2019/0124112 A1* | 4/2019 | Thomas | H04L 63/20 |
| 2019/0141021 A1* | 5/2019 | Isaacson | G06Q 30/0625 |
| 2019/0147515 A1* | 5/2019 | Hurley | G06Q 20/3821 705/44 |
| 2019/0149514 A1* | 5/2019 | Jawahar | H04L 63/10 726/7 |
| 2019/0207912 A1* | 7/2019 | Nielson | H04L 9/0877 |
| 2019/0222424 A1* | 7/2019 | Lindemann | H04L 9/0861 |
| 2019/0230090 A1* | 7/2019 | Kathiara | H04L 9/3247 |
| 2019/0238519 A1* | 8/2019 | Bikumala | H04L 63/0823 |
| 2019/0238598 A1* | 8/2019 | Mohamad Abdul | H04L 63/0815 |
| 2019/0245848 A1* | 8/2019 | Divoux | H04L 63/0815 |
| 2019/0246160 A1* | 8/2019 | Williams | H04N 21/63345 |
| 2019/0266576 A1* | 8/2019 | McCauley | G06Q 20/065 |
| 2019/0268165 A1* | 8/2019 | Monica | H04L 63/10 |
| 2019/0280876 A1* | 9/2019 | Eidenschink | H04L 63/123 |
| 2019/0281030 A1* | 9/2019 | Isaacson | H04L 63/0838 |
| 2019/0286812 A1* | 9/2019 | Lounsberry | H04L 9/0891 |
| 2019/0289007 A1* | 9/2019 | Zhang | H04L 63/08 |
| 2019/0306010 A1* | 10/2019 | Medam | G06F 9/546 |
| 2019/0306138 A1* | 10/2019 | Carru | H04L 63/10 |
| 2019/0312857 A1* | 10/2019 | Lander | G06F 9/5072 |
| 2019/0312882 A1* | 10/2019 | D'Agostino | H04W 12/64 |
| 2019/0312883 A1* | 10/2019 | McCarter | H04L 9/088 |
| 2019/0318122 A1* | 10/2019 | Hockey | G06Q 20/02 |
| 2019/0318816 A1* | 10/2019 | Witchey | G16H 10/60 |
| 2019/0327135 A1* | 10/2019 | Johnson | H04L 67/34 |
| 2019/0332754 A1* | 10/2019 | Andersen | G06K 7/10297 |
| 2019/0340376 A1* | 11/2019 | Fleck | H04L 67/5683 |
| 2019/0342329 A1* | 11/2019 | Turgeman | G06F 3/0488 |
| 2019/0384632 A1* | 12/2019 | Parikh | G06F 21/554 |
| 2019/0394204 A1* | 12/2019 | Bansal | H04L 63/0815 |
| 2020/0007530 A1* | 1/2020 | Mohamad Abdul | H04W 12/084 |
| 2020/0007556 A1* | 1/2020 | Brebner | G06F 16/958 |
| 2020/0007615 A1* | 1/2020 | Brebner | G06F 9/542 |
| 2020/0012511 A1* | 1/2020 | Ganesh | G06F 9/44526 |
| 2020/0036528 A1* | 1/2020 | Ortiz | H04W 12/10 |
| 2020/0036707 A1* | 1/2020 | Callahan | H04L 67/53 |
| 2020/0042971 A1* | 2/2020 | Eby | G06Q 20/401 |
| 2020/0045016 A1* | 2/2020 | Chor | H04L 63/0442 |
| 2020/0065300 A1* | 2/2020 | Yang | G06F 16/2365 |
| 2020/0065519 A1* | 2/2020 | Barday | H04L 63/102 |
| 2020/0067903 A1* | 2/2020 | Yegorin | H04L 67/562 |
| 2020/0084132 A1* | 3/2020 | Chauhan | H04L 43/14 |

(56) References Cited

U.S. PATENT DOCUMENTS

| | | | |
|---|---|---|---|
| 2020/0084284 A1* | 3/2020 | Chauhan | H04L 67/51 |
| 2020/0089898 A1* | 3/2020 | Borkar | G06F 21/44 |
| 2020/0092382 A1* | 3/2020 | Borkar | H04L 67/142 |
| 2020/0097337 A1* | 3/2020 | Borkar | G06F 9/541 |
| 2020/0099738 A1* | 3/2020 | Borkar | H04L 67/63 |
| 2020/0106760 A1* | 4/2020 | Chauhan | G06F 21/6218 |
| 2020/0112436 A1* | 4/2020 | Kanukollu | H04L 9/3073 |
| 2020/0112589 A1* | 4/2020 | Chauhan | G06F 21/6245 |
| 2020/0117489 A1* | 4/2020 | Borkar | G06F 8/61 |
| 2020/0120088 A1* | 4/2020 | Jain | G06F 21/32 |
| 2020/0137110 A1* | 4/2020 | Tyler | H04L 63/1483 |
| 2020/0145385 A1* | 5/2020 | Chauhan | H04L 63/0281 |
| 2020/0145425 A1* | 5/2020 | Chauhan | H04L 63/107 |
| 2020/0145515 A1* | 5/2020 | Fleck | H04L 63/1441 |
| 2020/0150838 A1* | 5/2020 | Chauhan | H04L 65/1063 |
| 2020/0150980 A1* | 5/2020 | Huang | G06F 3/0483 |
| 2020/0151348 A1* | 5/2020 | Chauhan | H04L 67/53 |
| 2020/0151707 A1* | 5/2020 | Mohamed | G06Q 20/409 |
| 2020/0153818 A1* | 5/2020 | Chauhan | H04L 63/20 |
| 2020/0153821 A1* | 5/2020 | Cao | H04L 63/0861 |
| 2020/0153862 A1* | 5/2020 | Chauhan | H04L 63/083 |
| 2020/0153911 A1* | 5/2020 | Chauhan | H04L 65/403 |
| 2020/0153920 A1* | 5/2020 | Chauhan | H04L 67/55 |
| 2020/0153931 A1* | 5/2020 | Chauhan | H04L 65/75 |
| 2020/0160458 A1* | 5/2020 | Bodin | H04L 67/53 |
| 2020/0162359 A1* | 5/2020 | Borkar | H04L 43/50 |
| 2020/0162454 A1* | 5/2020 | Jain | H04L 63/0853 |
| 2020/0162471 A1* | 5/2020 | Borkar | H04L 63/102 |
| 2020/0167341 A1* | 5/2020 | Carver | H04L 9/3073 |
| 2020/0177589 A1* | 6/2020 | Mangalvedkar | H04W 4/50 |
| 2020/0183761 A1* | 6/2020 | Roy | H04L 63/145 |
| 2020/0184558 A1* | 6/2020 | Crumb | H04L 9/30 |
| 2020/0193426 A1* | 6/2020 | Kromer | G06F 17/40 |
| 2020/0213336 A1* | 7/2020 | Yu | H04L 63/1425 |
| 2020/0219094 A1* | 7/2020 | Dikhit | G06Q 20/4014 |
| 2020/0228345 A1* | 7/2020 | Ponnuru | H04L 63/126 |
| 2020/0228561 A1* | 7/2020 | Petry | H04L 63/1433 |
| 2020/0236152 A1* | 7/2020 | Bradley | H04N 21/44227 |
| 2020/0242600 A1* | 7/2020 | Stack | H04W 12/062 |
| 2020/0244797 A1* | 7/2020 | Horelik | H04L 63/0407 |
| 2020/0250664 A1* | 8/2020 | Kumar | G06F 21/41 |
| 2020/0257700 A1* | 8/2020 | Xu | G06F 8/65 |
| 2020/0265062 A1* | 8/2020 | Srinivasan | G06F 16/1844 |
| 2020/0274717 A1* | 8/2020 | Finke | H04L 63/08 |
| 2020/0274900 A1* | 8/2020 | Vaishnavi | H04L 63/20 |
| 2020/0280550 A1* | 9/2020 | Lindemann | H04L 9/3247 |
| 2020/0280855 A1* | 9/2020 | Avetisov | H04L 63/0884 |
| 2020/0285464 A1* | 9/2020 | Brebner | G06F 11/362 |
| 2020/0287894 A1* | 9/2020 | Leon | H04L 9/3213 |
| 2020/0311790 A1* | 10/2020 | Keren | G06Q 20/4016 |
| 2020/0314623 A1* | 10/2020 | Pellegrini | H04W 4/90 |
| 2020/0322342 A1* | 10/2020 | Gokhale | H04L 63/108 |
| 2020/0374324 A1* | 11/2020 | Le Strat | H04L 12/1822 |
| 2020/0389552 A1* | 12/2020 | Trim | H04W 12/61 |
| 2020/0402049 A1* | 12/2020 | Pi Farias | G06Q 20/208 |
| 2020/0402052 A1* | 12/2020 | Sloane | H04L 63/105 |
| 2021/0012334 A1* | 1/2021 | Mutha | H04L 63/0421 |
| 2021/0014266 A1* | 1/2021 | Keret | H04L 63/1433 |
| 2021/0019436 A1* | 1/2021 | Beck | G06F 21/602 |
| 2021/0021642 A1* | 1/2021 | Olson | G06F 16/275 |
| 2021/0036850 A1* | 2/2021 | Sunkavally | H04L 9/0891 |
| 2021/0044976 A1* | 2/2021 | Avetisov | G06F 21/64 |
| 2021/0056547 A1* | 2/2021 | Monica | H04L 9/0897 |
| 2021/0069596 A1* | 3/2021 | Toksoz | H04N 21/4781 |
| 2021/0081252 A1* | 3/2021 | Bhargava | G06F 9/5072 |
| 2021/0081536 A1* | 3/2021 | Zhang | H04L 9/3252 |
| 2021/0081947 A1* | 3/2021 | Hockey | H04L 63/0838 |
| 2021/0084031 A1* | 3/2021 | Lao | H04L 63/0838 |
| 2021/0090183 A1* | 3/2021 | Kerr | H04L 61/4552 |
| 2021/0091951 A1* | 3/2021 | Wilson | H04L 67/133 |
| 2021/0110392 A1* | 4/2021 | Lacoss-Arnold | H04L 63/18 |
| 2021/0119785 A1* | 4/2021 | Ben-Reuven | H04L 9/3239 |
| 2021/0141913 A1* | 5/2021 | Mosconi | G06F 21/629 |
| 2021/0149855 A1* | 5/2021 | Lim | G06F 16/284 |
| 2021/0160231 A1* | 5/2021 | Kumar | H04L 63/0815 |
| 2021/0166573 A1* | 6/2021 | Douglas | G09B 7/06 |
| 2021/0173916 A1* | 6/2021 | Ortiz | G06V 10/764 |
| 2021/0182895 A1* | 6/2021 | Sears | G06F 21/64 |
| 2021/0194704 A1* | 6/2021 | Chan | H04L 9/3265 |
| 2021/0194715 A1* | 6/2021 | Ansari | H04L 65/102 |
| 2021/0203648 A1* | 7/2021 | Eng | H04L 63/08 |
| 2021/0216668 A1* | 7/2021 | Godowski | H04L 67/535 |
| 2021/0224357 A1* | 7/2021 | Lev-Ami | H04L 51/066 |
| 2021/0226933 A1* | 7/2021 | Puzeris | H04L 63/0442 |
| 2021/0226951 A1* | 7/2021 | Goldstein | H04L 63/20 |
| 2021/0226987 A1* | 7/2021 | Summers | H04L 63/102 |
| 2021/0232306 A1* | 7/2021 | Hughes | H04L 67/75 |
| 2021/0234868 A1* | 7/2021 | Kurian | H04L 9/3213 |
| 2021/0243027 A1* | 8/2021 | Gupta | H04L 9/3226 |
| 2021/0243038 A1* | 8/2021 | Wilson | G01S 19/14 |
| 2021/0273961 A1* | 9/2021 | Humphrey | H04L 63/1425 |
| 2021/0279734 A1* | 9/2021 | Khatwani | G06F 21/36 |
| 2021/0281573 A1* | 9/2021 | Mars | H04L 63/0861 |
| 2021/0306334 A1* | 9/2021 | Han | H04L 63/0884 |
| 2021/0306344 A1* | 9/2021 | Han | H04L 63/08 |
| 2021/0306346 A1* | 9/2021 | Han | H04L 63/08 |
| 2021/0318894 A1* | 10/2021 | Swaminathan | G06F 9/44526 |
| 2021/0367784 A1* | 11/2021 | Gao | H04L 9/3236 |
| 2021/0390551 A1* | 12/2021 | Rodriguez | G06Q 20/202 |
| 2021/0398124 A1* | 12/2021 | Bhasin | G06Q 20/4016 |
| 2022/0006774 A1* | 1/2022 | Eland | H04L 9/0891 |
| 2022/0012795 A1* | 1/2022 | Vannoni | G06Q 30/0633 |
| 2022/0021639 A1* | 1/2022 | Eland | H04L 61/4511 |
| 2022/0043902 A1* | 2/2022 | Olson | H04L 9/30 |
| 2022/0067138 A1* | 3/2022 | Paert | H04L 63/0815 |
| 2022/0086132 A1* | 3/2022 | Tesson | H04L 63/0815 |
| 2022/0101326 A1* | 3/2022 | Kim | H04L 63/0464 |
| 2022/0116345 A1* | 4/2022 | Xu | H04L 67/141 |
| 2022/0131845 A1* | 4/2022 | Gaddam | H04L 9/14 |
| 2022/0172251 A1* | 6/2022 | Peters-Kim | G06Q 30/0251 |
| 2022/0174061 A1* | 6/2022 | Chitkara | H04L 63/108 |
| 2022/0180461 A1* | 6/2022 | Bertin | G06F 21/645 |
| 2022/0191186 A1* | 6/2022 | Chandramohan | H04L 63/0876 |
| 2022/0191199 A1* | 6/2022 | Sambi | H04W 8/087 |
| 2022/0198394 A1* | 6/2022 | Chandra | H04L 63/0807 |
| 2022/0239639 A1* | 7/2022 | Jasleen | G06F 21/36 |
| 2022/0260989 A1* | 8/2022 | Lepird | B60W 50/0205 |
| 2022/0272084 A1* | 8/2022 | Hyatt | H04W 12/40 |
| 2022/0294788 A1* | 9/2022 | Pattar | H04L 63/0815 |
| 2023/0013371 A1* | 1/2023 | Liu | G06F 9/44526 |
| 2023/0035278 A1* | 2/2023 | Saadeh | H04M 3/527 |
| 2023/0052150 A1* | 2/2023 | Shin | H04W 12/04 |
| 2023/0199032 A1* | 6/2023 | Michaelis | H04L 65/1059 |
| 2023/0367833 A1* | 11/2023 | Kol | G06F 16/9566 |

OTHER PUBLICATIONS

Revar et al "Securing User Authentication using Single Sign-On in Cloud Computing," Institute of Technology, NIRMA University, Ahmedabad, IEEE, pp. 1-4 (Year: 2011).*

Amigopod "Access Code Logins: Unified Visitor Management," Revision 1.0, pp. 1-17 (Year: 2010).*

Hamilton et al."Database Multi-Factor Authentication via Pluggable Authentication Modules," The 12th International Conference for Internet Technology and Secured Transactions (ICITST-2017), IEEE, pp. 367-368 (Year: 2017).*

Hamilton et al."Database Multi-Factor Authentication via Pluggable Authentication Modules," The 12th International Conference for Internet Technology and Secured Transactions (ICITST-2017), pp. 367-368 (Year: 2017).*

Zhao et al."Constructing Authentication Web in Cloud Computing," 2013 International Conference on Cloud and Service Computing, IEEE Computer Society, pp. 106-111 (Year: 2013).*

Shaikh et al "Security Threats in Cloud Computing," IEEE, pp. 214-219 (Year: 2011).*

Ghaffari et al "Security Considerations and Requirements for Cloud Computing," IEEE, pp. 105-110 (Year: 2016).*

Kaur et al "Cloud Computing Security Issues and its Solution: A Review," IEEE, pp. 1198-1200 (Year: 2015).*

Almorsy et al."Collaboration-Based Cloud Computing Security Management Framework," IEEE Computer Society, pp. 364-371 (Year: 2011).*

(56) References Cited

OTHER PUBLICATIONS

"Multifactor authentication (MFA)", IBM, IBM Cloud Docs / App ID, Available Online at: https://cloud.ibm.com/docs/appid?topic=appid-cd-mfa, Sep. 22, 2020, 15 pages.

* cited by examiner

CUSTOMIZING AUTHENTICATION AND HANDLING PRE AND POST AUTHENTICATION IN IDENTITY CLOUD SERVICE

BACKGROUND

Cloud-based computing platforms offer significant advantages over traditional on-premises computing platforms. For instance, cloud-based computing platforms provide scalable and flexible computing resources for users and can be deployed across geographic regions that are widely spaced apart (e.g., in different countries). Cloud-based computing platforms can provide one or more categories of services, including Software as a Service (SaaS), Platform as a Service (PaaS), or Infrastructure as a Service (IaaS).

In a cloud environment, resources can be secured and protected by an identity service provider. An identity service provider can be responsible for handling, for example, authentication, authorization, single sign-on (SSO), user management, application management and audit. An identity service provider can offer flexibility and standard solutions.

In an identity system, an authentication flow, for authenticating a user, is performed in a closed-control manner. Once an identity system starts an authentication flow, the control leaves a business application until required artifacts or tokens are generated. However, these identity solutions do not provide any flexibility. Further, such identity solutions do not provide plug-in customized code as part of the login control flow so as to influence a login decision or cleanup during logout.

Further, some systems may provide pre-authentication and post-authentication control, however, such systems use back end Application Programming Interface (API) calls. Back end API calls do not provide complete control for performing login orchestration. For example, if the system would like to create a session on the user browser as part of login process or if the system would like to clear something during logout process then, it may not be possible using back end API calls. Also, the user is not given the ability to completely control a session.

BRIEF SUMMARY

The present disclosure relates to cloud computing systems, and more particularly, to techniques for customizing authentication and handling pre-authentication and post-authentication processes in an identity cloud service. Various embodiments are described herein, including methods, systems, non-transitory computer-readable storage media storing programs, code, or instructions executable by one or more processors, and the like.

Example embodiments can be configured for authentication and authorization by an identity cloud service of an identity and access management (IAM) system. An identity and access management can also be referred to as an Access Management System (AMS). The IAM can also be generally referred to as an identity system or cloud identity system.

A cloud service can include a plurality of different types of services that are provided to companies and customers over the internet. Under an IaaS cloud service model, one or more types of resources are hosted by a cloud service provider and made available to a client (e.g., an enterprise customer). Such resources can include computing resources (e.g., compute instances), networking resources (e.g., a virtual private network), storage resources (e.g., cloud-based databases), and other hardware or software resources. Resources may be provisioned for use in a tenancy associated with a particular client. Within the tenancy, the client may have secure and isolated access to the provisioned resources, and the cloud platform may provide the client with software tools for organizing, administering, or otherwise managing the provisioned resources. For instance, an enterprise client may be provided with tools for defining the scope of access privileges to resources by different groups of employees of the enterprise client.

In a distributed computing environment, such as an environment that includes a computing platform operating under an IaaS cloud service model, various entities may request access permission to protected resources. A protected resource can include a business application such as an application used to manage employees or to conduct a payment. An application can be accessed through a website or URL. A protected resource can also include a machine. The level of access can vary among entities. For instance, as indicated above, different users within a tenancy may have access privileges that depend on their user role (e.g., human resources, administrators, sales, etc.). Thus, access control can be based upon user identity. In addition to human users, entities that require access to resources may include compute instances (e.g., virtual or bare metal machines).

When a user wants to access a resource that is protected by an access management system, the access management system receives information indicating that a particular user is requesting access to a particular protected resource. The system can then execute or invoke a process flow comprising a set of operations for authenticating the particular user. If authentication of the user is successful, then a session can be created for the user. After the session is created, the user can be redirected to the protected resource (or application) via the created session and the user is given the ability to control the application.

A user may want to be able to plug-in their own code or create their own modules for a protected resource, such as an application. For example, a user may want to modify the authentication process for an application. A user can also be known as a client, customer, enterprise customer, or tenant. Plug-ins can be triggered so as to influence an authentication decision while establishing login or for cleanup during logout from an application.

A plug-in can also be referred to as a plugin, add-in, addin, add-on, or addon. A plug-in can include computer implemented instructions to add specified rules or features to processes performed by the access management system. The example embodiments are described with respect to plug-ins for an access management system in a cloud environment. However, plug-ins can be created and applied for systems other than access management system, such as on-premise enterprise systems. Plug-ins can allow users to create and apply customizations to the authentication process. A plug-in can be triggered or activated in response to specified conditions being met.

Therefore, plug-ins can be configured to trigger at various points during the process in which a protected resource is requested and accessed. For example, a plug-in may be configured to trigger after the access management system receives an indication that a user is requesting access to a particular protected resource (e.g., pre-login). A plug-in can also be configured to trigger before a session has been established for a user (e.g., pre-login) or after a session has been established for user (e.g., post-login), but before the user has logged out.

Example embodiments can provide plug-ins that can be triggered pre-login, post-login, pre-logout, or post-logout. A plug-in that is triggered "pre-login" can be triggered before creating a single sign-on session. Pre-login can occur after an access management system receives an indication that a user is requesting access to a particular protected resource, or at a point in time before a session is established. A plug-in that is triggered "post-login" can be triggered after creating a single sign-on (SSO) session. A plug-in that is triggered "pre-logout" can be triggered before clearing a single sign-on session. A plug-in that is triggered "post-logout" can be triggered after clearing a single sign-on session. Logout can also be referred to as logoff or log-off. Pre-login can also be referred to as pre-authentication or pre-login authentication. Post-login can also be referred to as post-authentication or post-login authentication.

The plug-ins can be triggered in response to an event. For example, a pre-login trigger can be triggered in response to a log-on event. A post-logon plugin can occur after an authentication phase of logging in finishes, but before the user session is actually established. A post-logout plugin can occur when a session disconnects.

These are examples of plug-ins that can be provided by a user, however, plug-ins in addition to those identified can be provided for the login process and logout process or while determining whether a user is an authorized user of the application.

Example embodiments provide users with the flexibility of customizing the authentication process for applications. Although users are granted permission to generate and implement their own plug-ins, measures are in place to prevent the user from controlling the overall code of the cloud identity system. Further, measures are also in place to prevent the plug-ins generated by the user from putting service provider computing systems (e.g., IAM) at risk, such as by preventing the plug-ins from consuming too much computing power and/or memory, etc. Measures are also placed to decrease the risk on the service provider computing system.

As discussed above, some systems may provide pre-authentication and post-authentication control, however, such systems use back end Application Programming Interface (API) calls. Back end API calls do not provide complete control for performing login orchestration. Further, some implementations require an ID associated with the system since any changes or configurations are configured based on the system, and therefore, the user is limited in configuration options.

Example embodiments address these deficiencies by providing a solution where the control is forwarded to the application to handle and participate in, for example, pre-login, post-login, post-login, and post-logout ceremonies.

Further, an example embodiment can provide the user with complete control over a user session and the browser. Since configurations are loosely coupled, the configurations are not tied to the system. For example, a user is given the ability to change user interface structures. The user can be given complete control over the user session in the browser so as to control an authentication process and apply their own configurations. Measures are put in place to ensure that the system operates correctly.

A system in accordance with some example embodiments benefits the cloud architecture where customers want to inject and trigger their piece of code in the identity system to make pre-authentication and post-authentication decisions. An example embodiment ensures that a user's customized processing and decisions are handled before the session is created or access is given.

Benefits provided by example embodiments can include the following. Example embodiments helps customers to inject their pre-login, post-login, pre-logout, and post-logout configurations. Further, example embodiments can assist users in writing their implementation and deploy the implementation on their chosen platform. Example embodiments can allow customer applications to take part in single sign-on (SSO) session creation. In example embodiments, a POST/GET call with a required input can be called to the configured endpoint. Further, the deployed service can process the incoming request and return the result as a post redirect back to the identity system. Also, an identity management system of an example embodiment can process results sent by a pre-authenticated module or a post-authenticated module which are included in the decision making. Further, example embodiments can return a risk score for adaptive authentication. The risk score can be used to compute policy decisions, such as determining whether access to the system should be avoided.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The present disclosure relates to cloud computing systems, and more particularly, to techniques for customizing authentication and for handling pre-authentication and post-authentication plug-ins in an identity cloud service of an access management system.

A user, such as a customer of an enterprise system, may want to write their own code or modules for handling customization during the login process for an application. Users may want to modify the predefined login process or add additional steps to the login process. For example, the user may want to create their own session instead of using an existing session with an application. Further, a user may want to create their own notifying events about pre-login, post-login, pre-logout and post-logout, or add additional authentication measures.

Example embodiments allow users to inject their own pre-authentication and post-authentication configurations. A user can write their own implementation and deploy the implementation on their chosen platform. Example embodiments ensure that the user's customized processing and decisions are addressed before the session is created or before access is given.

I. Cloud Computing Environment

Figure 1:
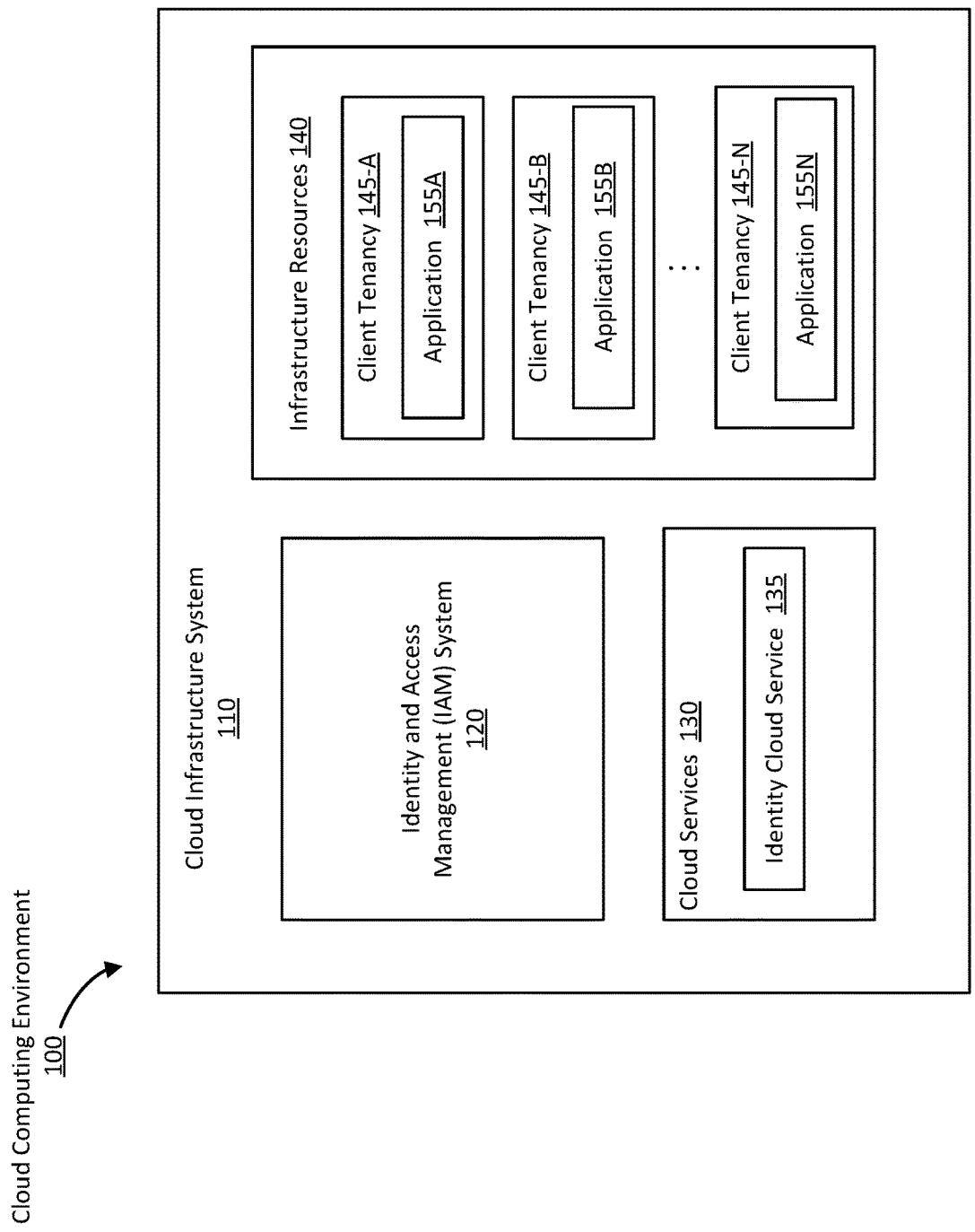
FIG. 1 illustrates a simplified block diagram of an example cloud computing environment, in accordance with one or more embodiments.

FIG. 1 illustrates a simplified block diagram of an example cloud computing environment 100, in accordance with one or more embodiments.

The environment 100 includes a cloud infrastructure system 110 operated by a cloud service provider. The cloud infrastructure system 110 may include infrastructure resources 140 (e.g., hardware and/or software components configurable to provide cloud services 130 to clients of the cloud infrastructure system 110. As illustrated, the infrastructure resources can be partitioned into different client tenancies 145A-145N. Each client tenancy 145A-145N is a logical container that can contain logical resources to which the corresponding client (e.g., customer or user) has secure and private access. For example a logical resource could be a database, a load balancer, or a testing platform for testing software code.

As illustrated in FIG. 1, the cloud infrastructure system 110 may include an Identity Access Management (IAM) system 120. The Identity Access Management (IAM) system can also be known as an Access Management System (AMS), identity system, or cloud identity system.

The IAM system 120 may be configured to manage access to the infrastructure resources 140 by user principals and/or resource principals. For example, the functionality provided by the IAM system 120 may include an identity cloud service 135 (another example of cloud services 130). The cloud based identity service (e.g., identity cloud service 135) can be configured to maintain stored information about users associated with the tenancies 145A-145N, such as usernames, passwords or other credential information, user information, and the like. IAM system 120 can be implemented in hardware and/or software and may include, for example, one or more access management servers configured to process requests from client devices for access to resources within the client tenancies 145A-145N.

The IAM system 120 is configured to protect access to protected resources, such as applications. Each of the client tenancies 145A-145N can include one or more applications 155A-155N. Applications 155A-155N can correspond to business applications that are used by the client, such as human resource applications, payment applications, etc. Each of the tenants client tenancies 145A-145N can include a plurality of different applications based on their business needs. Further, each of the applications can be configured to include different authentication processes and can be configured to provide different information during the authentication process.

II. System Architecture

Figure 2:
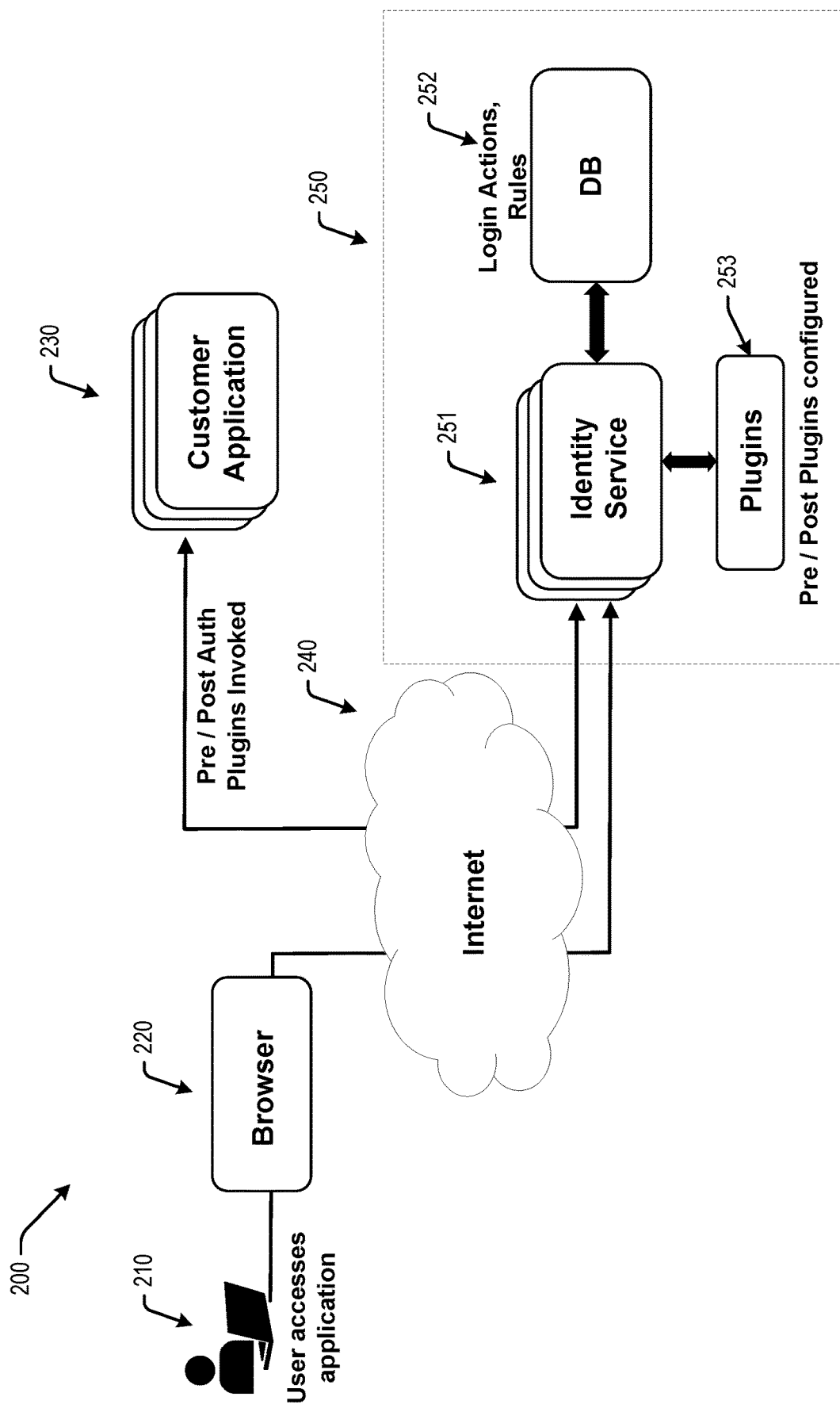
FIG. 2 illustrates a system architecture of a cloud identity system, in accordance with some example embodiments

FIG. 2 illustrates a system architecture of a system 200, in accordance with some example embodiments. The system architecture 200 includes a user 210, a browser 220, one or more customer applications 230, the internet 240, an identity service 251, a database 252, and plug-ins 253. Identity service 251, database 252, and plug-ins 253 can make up an access management system 250 or the domain of an access management system.

A user 210, such as a customer of the access management system, may want to configure plug-ins. The user 210 can use a browser 220 on their computing device (e.g., laptop, desktop, mobile device) to request to configure and apply pre-authentication and/or post-authentication plug-ins. The user 210 can access customer applications 230 through the internet 240. The applications can include any applications that exist in the access management system and are accessible and configurable by the user. The applications that can be configured by the user can vary based on the administrator rights and permissions given to the user.

The access management system 250 can include one or more identity services 251, one or more databases 252, and plug-ins 253. Identity service 251 is an example of cloud service. Database 252 can be configured to store login actions and rules for the access management system 250. Plug-ins 253 can include pre-authentication and post-authentication plug-ins that are configured to be implemented in customer applications 230.

The system 200 exposes configurations so that the customer can configure pre-authentication and post-authentication plugins, which allow customers to create customized code.

III. Plug-Ins

An example embodiment provides for authorized use of plug-ins. A plug-in can also be referred to as a plugin, add-in, addin, add-on, addon or a plug-in extension. A plug-in can include computer implemented instructions to add specified rules or features to processes performed by the access management system. A plug-in can also be known as a trigger. A plug-in can be composed to trigger at a particular time during, for example, an authentication process. The example embodiments are described with respect to plug-ins for an access management system, in a cloud environment. However, plug-ins can be created and applied for systems other than access management system, such as on-premise enterprise systems.

Plug-ins can be used to, for example, provide notifications regarding events, to provide audit information, to provide third-party applications with information, for creating a footprint in a browser, for modifying an application session cookie, or for calculating and returning application-based business logic risk-scores.

With respect to notification regarding events, a user may want to be notified whenever a login occurs, or the user may want to be notified regarding what happened during login. Alternatively, the user may want to be notified regarding what is occurring during pre-login or post-login.

An audit can include creating an audit trail. The conditions for a plug-in are audited to determine whether the conditions for the plug-in are being met. As another example, a user may want to make an audit for a particular user accessing an application on a tenant's account.

Providing third-party applications with information may be used when a user wants to bring in a third-party authentication or another form of authentication, in addition to that which is already provided. The user may want to inform the third-party application regarding the status of the authentication.

Creating a footprint in a browser may occur when a user wants to create a footprint in the browser for a specific application, even before creating a session. Further, a user may want to calculate a score based on their environment. That is, a user may want to calculate and return application-based business logic risk-scores.

As another example, a user may want to add another level of authentication (e.g., multi-factor authentication (MFA). The user may want to add an additional authentication requirement, such as generating a token or requesting biometric information.

These are merely examples and plug-ins can be used to accomplish other tasks than those identified above.

A. Plug-In Configuration

Plug-ins can be configured to trigger at various points in time. A plug-in that is triggered "pre-login" can be triggered before creating a single sign-on session. Pre-login can occur after an access management system receives an indication that a user is requesting access to a particular protected resource, or at a point in time before a session is established. A plug-in that is triggered "post-login" can be triggered after created a single sign-on (SSO) session. A plug-in that is triggered "pre-logout" can be triggered before clearing a single sign-on session. A plug-in that is triggered "post-logout" can be triggered after clearing a single sign-on session.

In order to configure a plug-in, the user has to be an authorized user of the system. Users may have to go through multi-factor authentication (MFA) to get a token or console, so only valid users are able to configure the plugins. In order to obtain the token indicating that the user is an authorized user, the user may perform a sign on session. A user can include an administrator of a tenant in the multitenant cloud environment. A tenant can include, for example, a company or a branch within a company. Further, depending on the type of plug-in generated, the level of authorization needed can vary. That is, the type of plug-in generated can vary depending on the authorized role of the administrator.

The access management system can provide the user with attributes and values the user can change. The user will upload their public key and forward their public key to the access management system. After the user configures the plug-in, they will forward the plug-in along with their private key to the access management system. The access management system will verify the signature of the response using the public key provided by the user. Therefore, no other third parties can interfere since they do not have the private key of the user.

Plug-ins can be configured using an identity system admin console or with a token with an identity domain administrator role. When the user logs into the access management system, the user can access an administrator control which identifies permissions needed in order to generate the one or more plug-ins. If the administrator does not have the needed permissions for a particular plug-in, then the user will not be allowed to configure the particular plug-in.

A plug-in will be configured to include an application URL. The URL will correspond to the application for which the plug-in is configured. The plug-in code will also include information regarding the state of the application for implementing the plug-in, such as whether the application should be in a pre-login state, a post-login state, a pre-logout state or a post-logout state. The plug-in configuration can also include information such as whether it is mandatory or optional.

The plug-in configuration can also include information regarding security, such as any required username or password. The configuration can also include details of a service endpoint, or what kinds of signatures are needed. The level of sensitivity configured by the user can vary based on the administrator role. The plug-in will also include account information of the user. Based on the information in the plug-in, the access management system can determine whether or not user is authorized to implement the plug-in and whether the criteria for the plug-ins have been met.

The plug-in will also include the public key of the user. The access management system will verify signatures in responses using a public key to ensure that no third party factor has interfered in the response. The access management system will verify that the user is to correct user by using the public key. The plug-in can sign their responses using their private key.

Since the call for the plug-in is going out of the access management system, validation measures (e.g., private key, public key) are implemented ensure that there are no security issues. Plug-ins can also be configured to ensure that the plug-ins comply with system requirements. The plug-in is configured to ensure that security measures are maintained. For example, a plug-in is configured with a nonce so as to prevent an external request replay attack.

A replay attack can include when a third party obtains the request or transmission and fraudulently or maliciously duplicates the request one or more times. A replay attack can also occur if there is a bug in the code of the plug-in and the code sends a request multiple times to the access management system. Through the use of a nonce, a second request will be rejected, as the earlier request would have an evicted nonce. Only one response will be accepted from a plug-in in a single session. The access management system would not reply to a request if it has previously replied to a request with the identified nonce. A nonce is generated for every request so that a request cannot be duplicated. A nonce can include randomly generated numbers and/or letters that would be unique to the specific instance of the plug-in.

An example embodiment can also prevent forged requests. The identity system sets the nonce in a cookie, so that even if someone captures the nonce, they cannot succeed without the cookie containing the nonce. The cookies are set in the browser. The browser will have the corresponding data and the corresponding data has the nonce. The cookies in a browser are set for the particular domain corresponding to the plug-in. An improper user cannot forge the system because each request coming from a plug-in calls a particular domain. The nonce will be compared in the backend as well as in the cookie.

An example embodiment also ensures data integrity with respect to request data and data integrity with respect to response data. The access management system will sign the data output. The corresponding tenant's private key and the plug-in has to verify the response using the public key of the access management system.

All requests and response data can be sent in a JASON web token (JWT format), which is signed by the private key of the sender. Upon receiving the data, a recipient can be required to verify the signature using a public key of sender. With respect to request data, the identity system can sign the request data using its private key when sending to application. Upon receiving, the application can access a data store (e.g. admin/v1/SignedCertJwk) to get the public key for verification.

With respect to data integrity, after processing request data, the application builds its own data and can send the data to the identity system. The data will be signed by its private key, and the counter part of this key (i.e., public key) can already be uploaded to identity system at the time of configuring the plug-in. The identity system can verify the data sent by application using the public key of the user. The tenant will sign the response with their own private key and access management system will verify the signature using the public key uploaded for the plug-in.

Further, the access management can send a response to the plug-in using the tenant's private key. The plug-in can verify the response from the access management system using the public key of the access management system. The plug-in can request the public key of the access management system (e.g., tenant's public key for the access management system).

B. Mandatory Plug-Ins

Plug-ins that are configured to be triggered during pre-login or pre-authentication can include criteria that are identified by user as being mandatory or optional. If criteria for a plug-in is designated as mandatory, then the plug-in cannot be initiated unless all of the criteria has been met. If criteria for a plug-in is designated as optional, then all of the criteria does not need to be met before the plug-in is initiated.

A mandatory plug-in is a plug-in which has one or more factors or criteria that is required in order for the plug-in to be implemented in the current session. If factors of the plug-in are not met, the session will not be created. For example, if a plug-in is a multi-factor authentication plug-in, then the user must provide the information needed in order to implement the plug-in. However, if the plug-in is, for example, an audit plug-in, no additional information may be needed from the user since the plug-in can perform the task without requiring any additional information. Plug-ins that require additional information can be placed in the list for the pre-authentication process whereas plug-ins that do not require additional information from the user can be placed in a list of post-authentication process plug-ins.

If one or more factors or criteria for a mandatory plug-in are not satisfied, then the plug-in will not be implemented in the current session. For example, if the plug-in is for another layer of authentication, such as requesting biometric information, then the authentication process will not resume without requesting biometric information. Therefore factors for pre-login plug-ins have to be satisfied in order for the session control to be transferred to the user.

Pre-login plug-ins can, as a default, be configured to be mandatory. That is the pre-login plug-in criteria must be satisfied before the plug-in is allowed to access application since access to the application could be controlled. If the mandatory criteria is not satisfied then the one or more plug-ins including the mandatory criteria will be denied. A decision can be returned to a user denying the user access to the protected resource for that plug-in.

Post-login plug-ins may not need to be designated as mandatory as the user will not usually be prevented from logging out of an application. That is, logging out of an application will usually not be prohibited due to an error with a plug-in. Therefore, even if a post-login plug-ins fails, the user will not be prohibited from leaving an application. However, the user can be notified regarding any issues with a plug-in.

C. Optional Plug-Ins

An optional plug-in is a plug-in which has one or more factors or criteria that is not required in order for the plug-in to be implemented in a current session. If one or more factors or criteria for an optional plug-in are not satisfied, the plug-in can still be implemented in a current session with an application. Therefore, if any of the plug-ins which are optional fail, that is one or more factors or criteria for the plug-ins fail, the session can still proceed.

Plug-ins that are triggered to occur post-login can be identified as optional plug-ins. Plug-ins that are triggered to occur post-login are identified as optional because post-login plug-ins can be grouped together as a group, and therefore processed as a group. Whereas plug-ins that occur pre-login are processed individually. Therefore, if any factors are not met for post-login plug-ins a session can still be created.

Plug-in factors that can be considered optional can include application specific audit-logging plugins, application login reporting plugins, and application session tracker plugins.

IV. Plug-In Stages

A user may want to generate plug-ins to be used to during the authentication process. The authentication process can generally refer to the stages that occur before, during and after authentication of a user with an application. An example embodiment ensures that the user's customized processing and decisions are addressed before the session is created or before access is given. Therefore, before the session is created or before access is given, it is determined whether any pre-authentication or post-authentication plug-in can be applied.

Even though a session has been created after authentication, the session is created in the background and the user is not given control of the application until after the plug-ins have been evaluated. The application will not be redirected to the user to control until the plug-ins have been evaluated.

Plug-ins can be generated for various points in the process of requesting access to a particular protected resource. For example, a plug-in may be configured to trigger after the access management system receives an indication that a user is requesting access to a particular protected resource (e.g., pre-login). A plug-in can also be configured to trigger before a session has been established for a user (e.g., pre-login) or after a session has been established for user (e.g., post-login), but before the user has logged out. Therefore, a user is provided with a plurality of different possibilities for customizing plug-ins.

Figure 3:
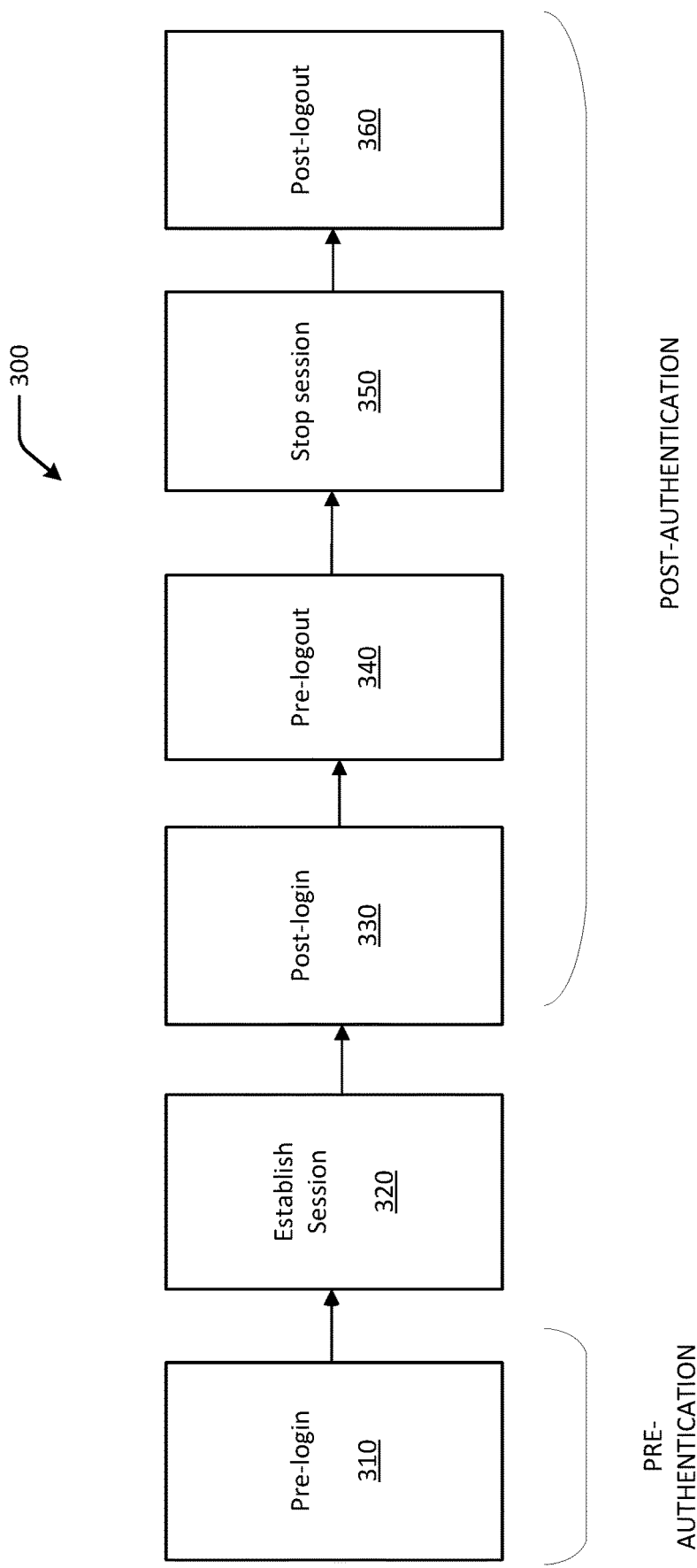
FIG. 3 illustrates a sequence diagram for a method of applying customized plug-ins, in accordance with some example embodiments.

FIG. 3 illustrates a sequence diagram 300 of the stages during which plug-ins can be applied, in accordance with some example embodiments.

Stage 310 discloses a pre-login or pre-authentication stage. At this point, the user has not yet established a login session. That is, the user has not yet logged into an application. One or more plug-ins can be generated for implementation pre-login. The plurality of plug-ins can be stored in an ordered list. If there is more than one plug-in than the plug-ins are evaluated sequentially.

Stage 320 discloses a stage during which a session has been established.

Stage 330 illustrates a post-login stage which is also a post-authentication stage. At this point in time the user has established a login session and has been authenticated.

Stage 340 illustrates a pre-logout stage which is also a post-authentication stage. This is a stage after the user has logged in, but before the user has logged out of the application.

Stage 350 illustrates a stop session stage. At this point, the user has indicated that they would like to end their session with the application.

Stage 360 illustrates a post-logout stage, which is also a post-authentication stage. At this stage, the user has logged out of the application.

FIG. 3 illustrates example stages for which plug-ins can be configured. However, additional pre-authentication and post-authentication stages can be included other than those shown in FIG. 3.

V. Methods for Handling Customized Plug-Ins

Figure 4:
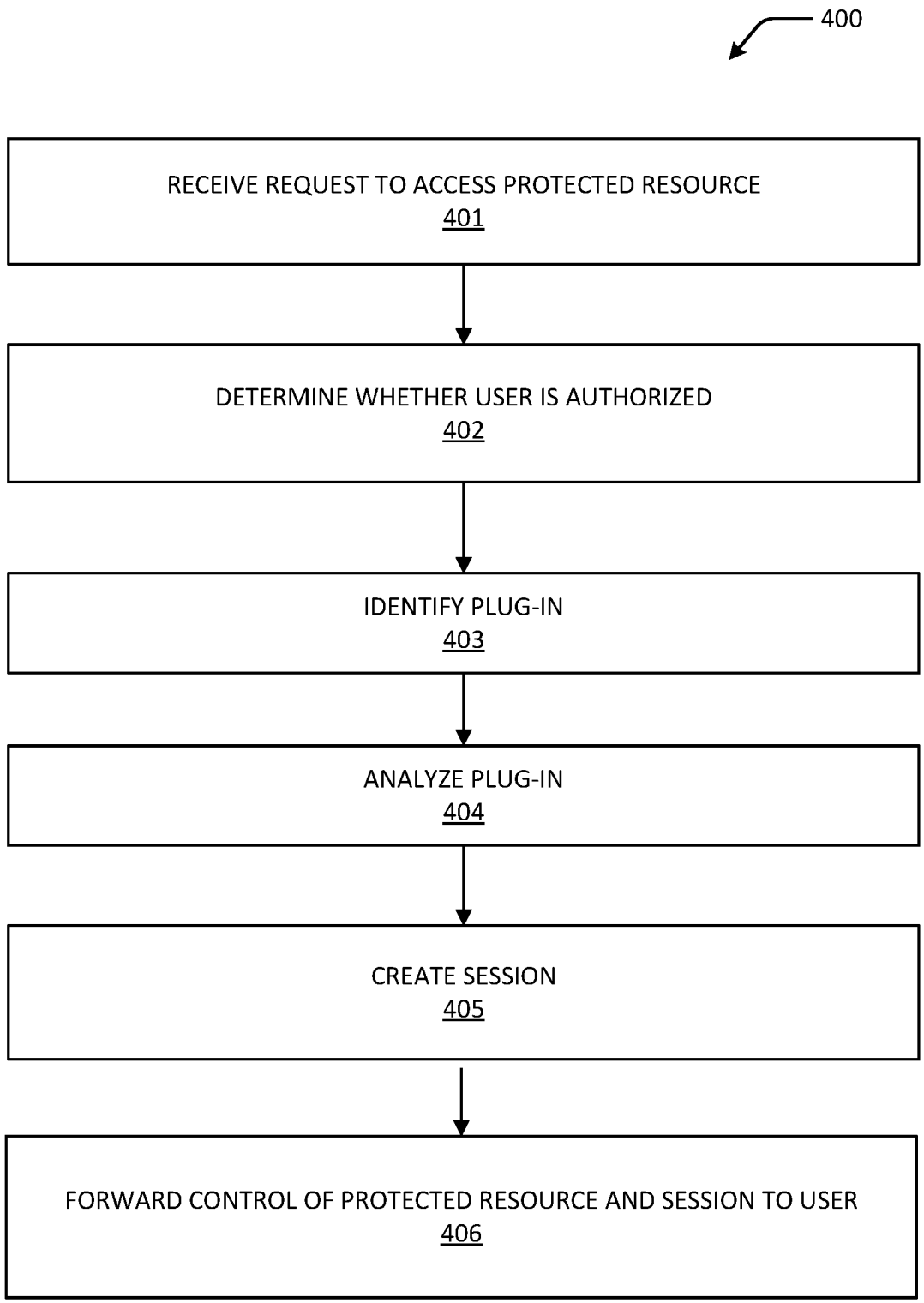
FIG. 4 illustrates a method of customizing plug-ins, in accordance with some example embodiments.

FIG. 4 illustrates a method 400 of customizing plug-ins, in with some example embodiments.

At step 401, the access management system may receive a request to access a protected resource. The request can be received from a user (e.g., tenant) of the cloud computing environment to access a protected resource managed by the access management system, such as a business application. A user may submit a request indicating that they would like to implement a customized a plug-in. A user can customize plug-ins that will trigger pre-authentication or post-authentication.

At step 402, the access management system can determine whether the user is authorized to access the protected resource. Since the resource is a protected resource, it must be determined whether the user is an authorized user before the user is allowed to customize or modify any aspect of the business application. If the user is not authorized to access the resource, then the user will not be allowed to configure plug-ins for the resource. An authorization process can be performed with the user to ensure that the user is an authorized user. Further, the authorization process can ensure that a particular plug-in is configured within the permissions for a particular user.

The access management system can determine whether the user is authorized to access the resource by performing an identity service authentication process, such as single sign-on (SSO). If the identity service authentication process fails, then the user will not be authorized to implement any customized plug-ins. The identity service authentication process can include a challenge and response authentication. If the user fails to respond correctly to any of the challenges, then no calls will be made for any configured plug-ins.

At step 403, in response to determining that the user is authorized to access the protected resource, the access management system can identify one or more plug-ins for controlling an authentication session for the protected resource.

At step 404, the one or more plug-ins generated by the user are analyzed to determine that criteria for the one or more plug-ins are satisfied. This step can occur after creating a single sign-on session, but before redirecting to the actual application. The access management system can give a call back to plug-ins. Step 404 is explained is greater detail with respect to FIG. 5.

At step 405, in response to determining that the criteria for the one or more plug-ins are satisfied, a session can be created for the user. A session includes a period a time during which a user is given access to the application.

At step 406, the user is provided with direct access and control of the application.

Figure 5:
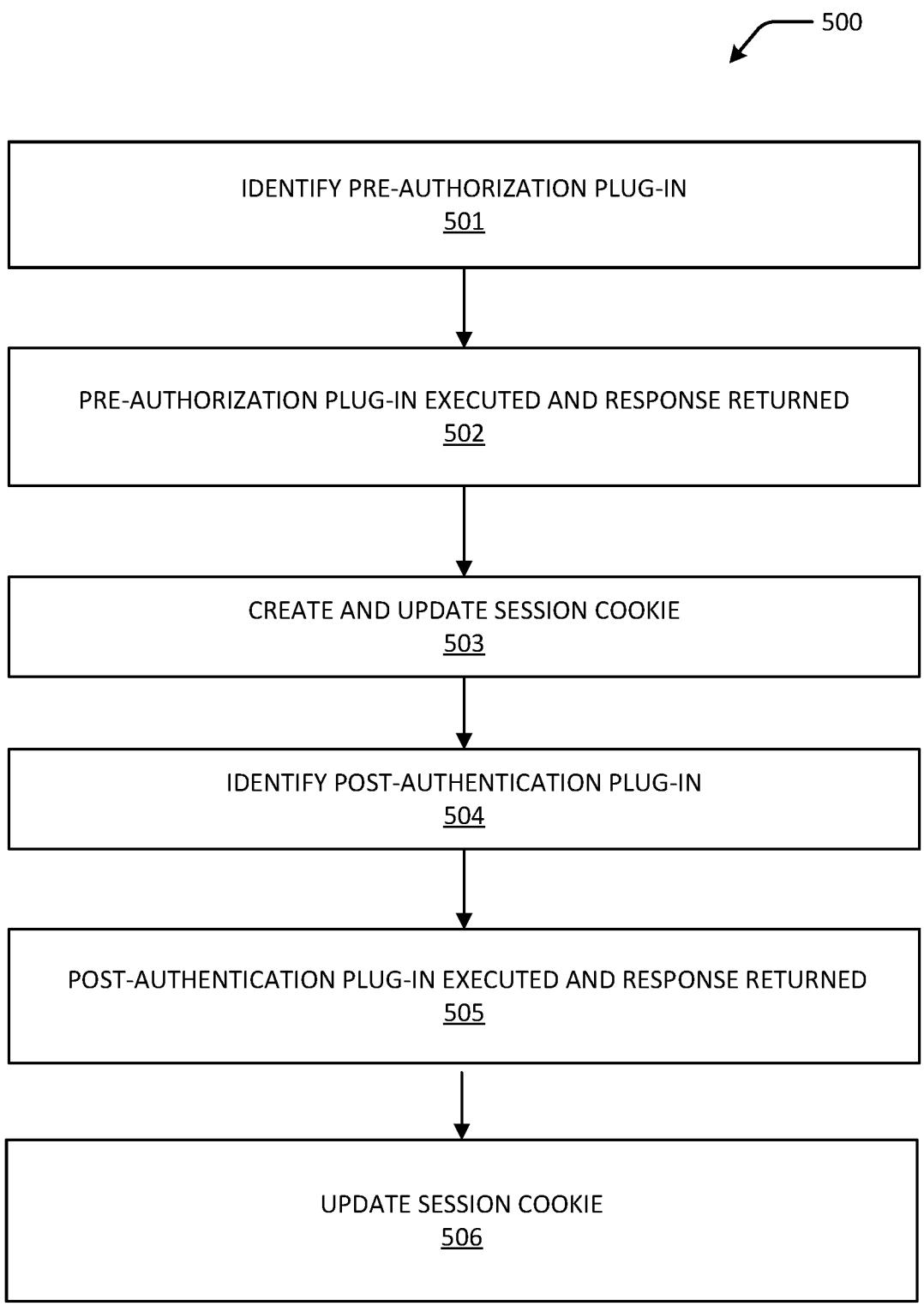
FIG. 5 illustrates a method of analyzing a plugin, in accordance with some example embodiments.

FIG. 5 illustrates a method 500 of analyzing a plugin, in accordance with some example embodiments. FIG. 5 can correspond to step 404 of FIG. 4.

All of the plug-ins that the user would like to implement for a session will be generated before a session is established. An example embodiment analyzes the plug-ins to determine whether or not the plug-in can be implemented for session.

At step 501, it is determined whether there are any pre-authorization plug-ins. Pre-authorization plug-ins are plug-in to be implemented before a session is established. The plug-ins can be obtained from an ordered list. The ordered list can include one or more plug-ins that are configured for a particular application. The ordered list can be stored on a data store that is accessible by the access management system. The ordered list can include pre-authentication and post authentication plug-ins that are configured by the user.

Pre-authentication plug-ins will be processed before any post-authentication plugins in the ordered list. The first plugin in the ordered list or the plug-in in the ordered list having the highest priority can be identified as a highest ordered plug-in. A second plug-in in the ordered list having a second highest priority can be identified as a second highest ordered plug-in, and so forth for any remaining plug-ins.

At step 502, the pre-authorization plug-in is executed and a response is returned. Processing of the pre-authorization plug-in can be performed. Processing can include determining whether the criteria for implementing the plug-in have been met. For example, if there are mandatory criteria for implementing the plug in, then it is determined whether the mandatory criteria have been met. Processing can also include determining whether security measures are in place. For example, that the plug-in includes a nonce and public/or private key information.

At step 503, a cookie can be created for a browser session with the application. The cookie can be updated based on the results of processing the pre-authorization plug-in. A cookie is a file which is used to keep track of events occurring during a session. The user can refer to the cookie to determine the results of processing the plug-in for implementation.

At step 504, the access management system can determine whether there are any post-authorization plug-ins. The access management system can identify any post-authorization plug-ins from the ordered list. The post-authorization plug-ins can occur after the pre-authorization plug-ins on the ordered list.

At step 505, post-authorization plug-ins are executed and a response is returned. The post-authorization plug-in can be processed. Processing of post-authentication plug-ins would occur after all of the pre-authentication plug-ins have been processed. Processing can include determining whether the criteria for implementing the plug-in have been met.

At step 506, the cookie for the session is updated based on the results of processing the post-authorization plug-in. The cookie is updated to include information regarding the processing of the post-authentication plug in.

VI. Sequence Diagram

Figure 6:
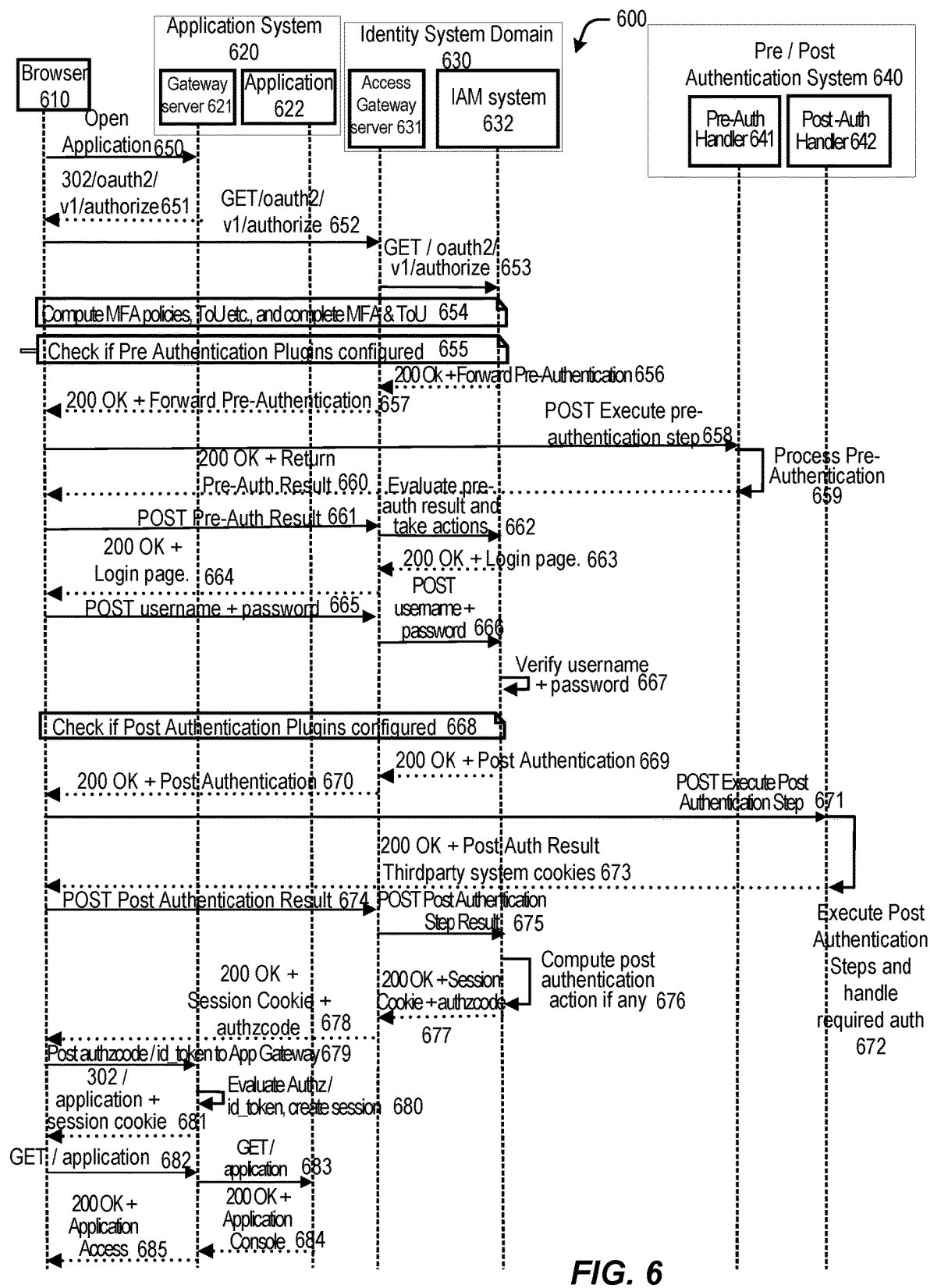
FIG. 6 illustrates a sequence diagram of a method for customizing a plug-in, in accordance with some example embodiments.

FIG. 6 illustrates a sequence diagram of a method 600 for customizing a plug-in, in accordance with some example embodiments.

As shown in FIG. 6, the sequence includes a browser 610, an application system 620, an identity system domain 630, and pre-authentication and post-authentication plug-in system 640. The application domain 620 can include an application gateway server 621 and one or more customer applications 622. The identity system domain 630 can include an access gateway server 631 and an identity and access management system 632.

Pre-authentication plug-in and post-authentication plug-in system 640 is configured to provide the plug-ins. The plug-ins can also be called plug-in extensions as they extend operations currently provided by the access management system. Pre-authentication plug-in and post-authentication plug-in system 640 can include a pre-authentication handler 641 and a post-authentication handler 642. The pre-authentication handler 641 can be configured to process pre-authentication or pre-login plug-ins hosted by the customer. The post-authentication handler 642 can be configured to process post-authentication or post login, pre-logout and post logout plug-ins hosted by the customer. The pre-authentication plug-in and postauthentication plug-in system 540 can be part of a customer hosted plug-in system in the cloud environment.

As illustrated in the sequence diagram shown in FIG. 6, when the cloud identity system detects configured pre-authentication or post-authentication plugins, it sends a request back to the configured URL with proper request data. The third party plugin can take action on the received input and provide a necessary result so that cloud identity system can take appropriate decisions while allowing access to the system.

A plug-in can be invoked by the access management system using a URL corresponding to that plug-in. The URL for a plug-in is configured and identified when the plug-in is registered with the access management system. Registration and generation of the plug-in can be done via a console, such as a web interface provided by a cloud services provider for making configuration changes to a customer's account. The registering of a plug-in can be performed by, for example, a user (e.g., administrator) that is designated for the customer (e.g., designated for a customer tenancy). Only an administrator with the appropriate credentials for logging onto the console can make changes to an application. Access management system can control the console that is provided to the administrator.

In the example embodiment shown in FG. 6, the steps occur in the front end or front channel and there are no backend or back channel communications.

At step 650, the user can open an application on the browser 610. The user can select an application, such as a human resources application or a payment application of the tenant, that is protected by the access management system. For example, the user can select a webpage for an application or enter a URL on a browser.

At step 651, the gateway server 621 can determine that the application that the user wants to access is a protected resource and therefore the user cannot access the application without a session cookie. The can gateway server 621 can then send a URL redirection code (e.g., 302) to request authorization to access an application. The request can performed using a method for accessing websites or applications, such as OAuth.

At step 652, the browser sends a GET request to the access gateway server 631 to request authorization. The redirect from step 651 goes back to the browser 610 and the browser 610 sends it to the access gateway server 631. The access gateway server 631 can determine whether the application, for which access is requested, is a protected resource.

At step 653, the access gateway server 631 forwards the GET request to the identity and access management system 632. After the access gateway server 631 determines that the application is a protected application, the call is redirected to the identity and access management system 632. The call is redirected to the identity and access management system 632 since the access gateway server 631 can identify that it does not have a cookie for the session.

At step 654, the authorization ceremony is started. Primary authorization or primary authentication is performed such as requiring a user name and password. Primary authorization can include implementing multifactor authentication (MFA) policies, Terms of Use (ToU) policies, etc. The primary authentication value using the password and any multi-factor authentication is performed so as to initiate the process of allowing the user to access the application.

If there are no plug-ins, then the process can proceed to cookie creation. However, if there are plug-ins, then the method proceeds to step 655.

Authorization is shown as occurring at step 654 after the GET authorization is sent by the access gateway server 631 to the identity and access management system 632. That is, this is performed before the login and password page is presented to the user. However, the authorization process can instead occur after the user name and password have been verified (step 667), that is after the user has entered their login and password.

At step 655, a check is performed to determine whether pre-authentication plug-ins have been configured. The plug-ins can be obtained from one or more databases of the tenant that act as microservices to the access management system.

Figure 11A:
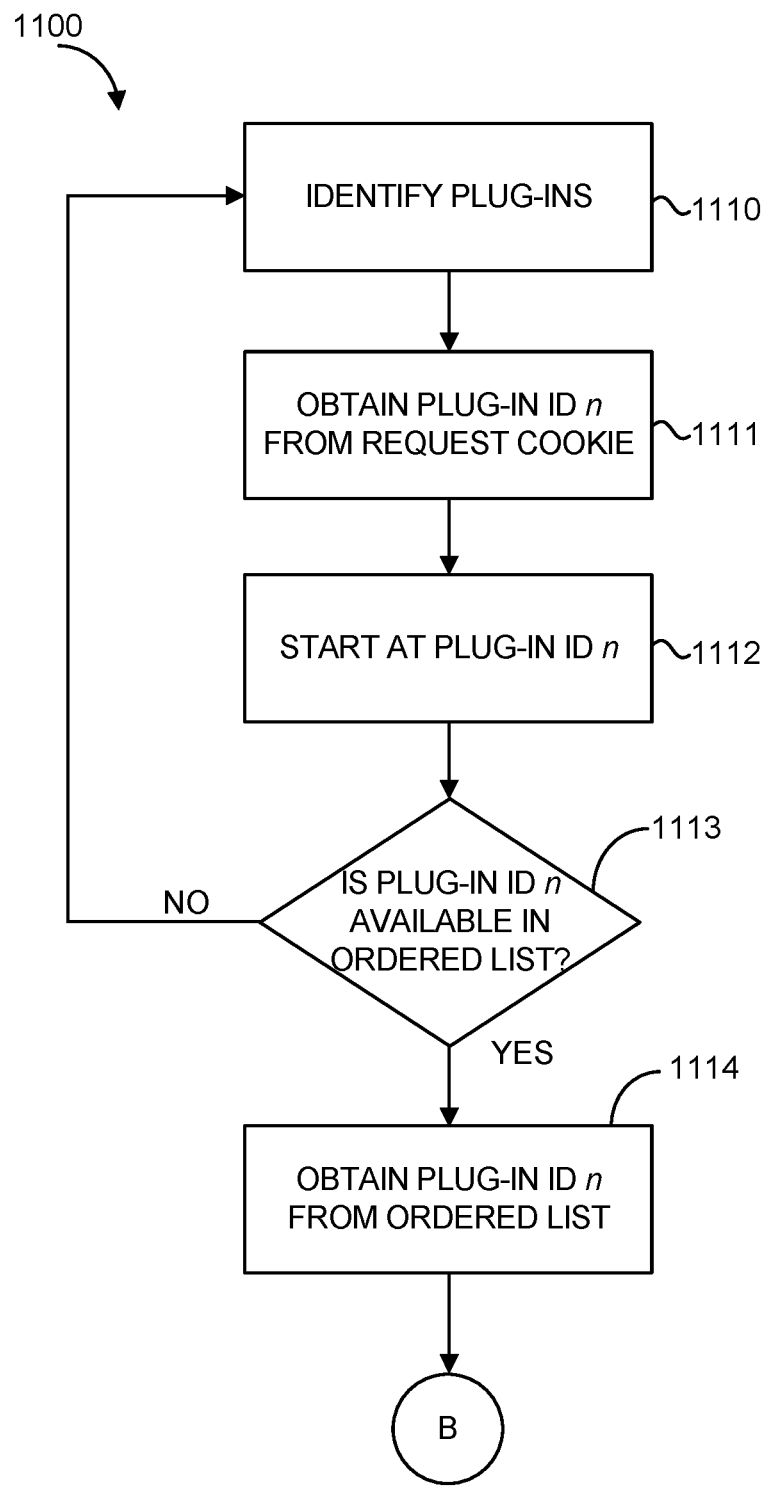
FIGS. 11A and 11B illustrate a flow diagram of a method for handling pre-login plug-ins, in accordance with some example embodiments.
Figure 11B:
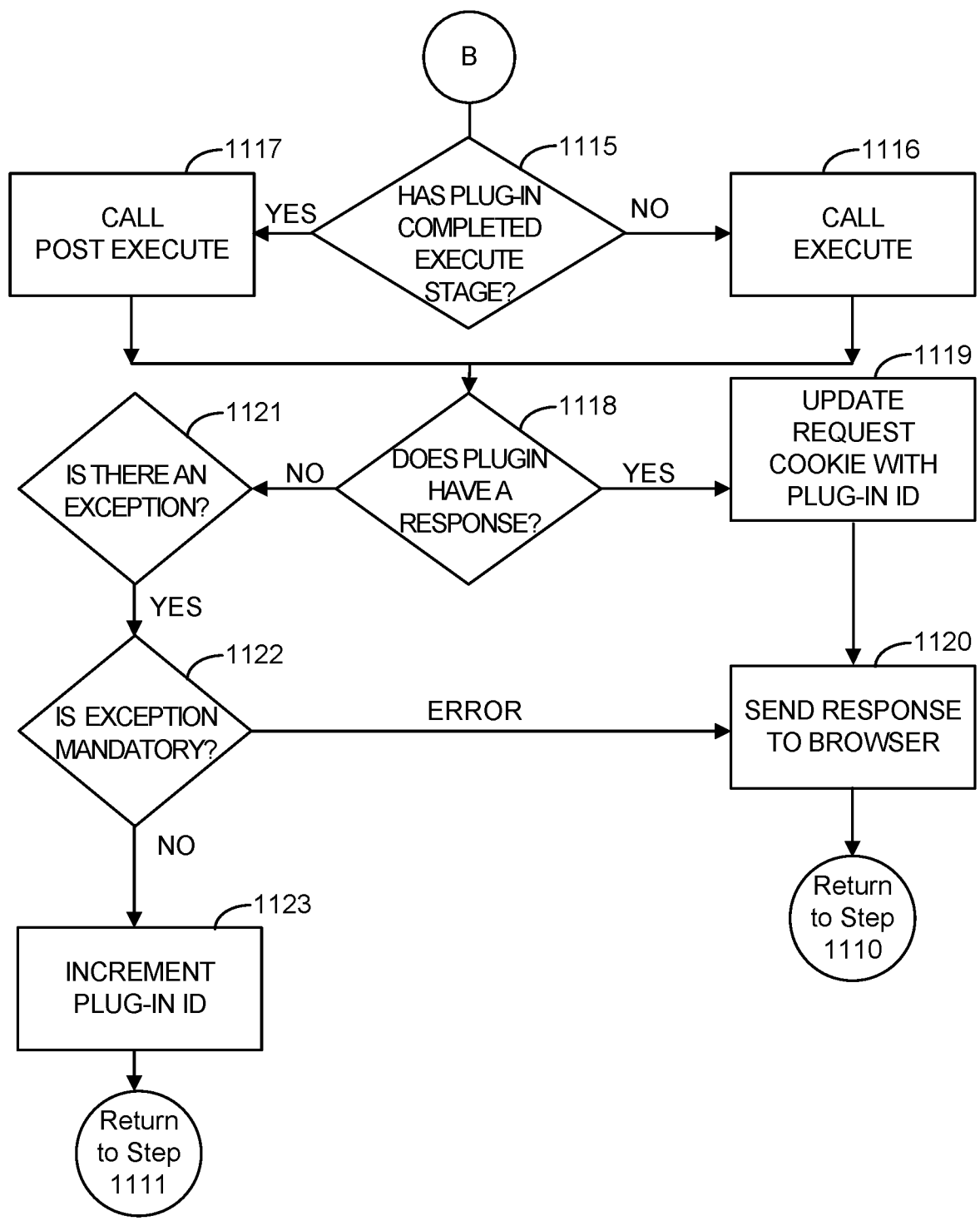

Steps 655 and 668 are explained in greater detail with respect to FIGS. 11A and 11B.

At step 656, the identity and access management system 632 with forward the pre-authentication plug-in to the access gateway server 631. The access management system 632 will send an OK and forward pre-authentication to the access gateway server 631 of the identity system domain 630.

At step 657, the access gateway server 631 will forward the pre-authentication plug-in to the browser 610. The access gateway server 631 will forward an OK and pre-authentication information to the browser 610.

At step 658, the browser 610 will forward the pre-authentication plug-in to the pre-authentication handler 641 for execution. The browser 610 will send a POST execute pre-authentication call to the pre-authentication handler 641.

At step 659, the pre-authentication handler 641 will process the pre-authentication. The pre-authentication and post authentication system 540 can be part of a customer hosted plug-in system in their tenancy.

At step 660, the pre-authentication handler 641 will return a pre-authentication result to the browser 610. For example, if the plug-in is a mandatory plug in, it will determine whether the criteria for the plug-in has been met.

At step 661, the browser 610 forward the pre-authentication result to the access gateway server 631. That is, the browser 610 will send a POST pre-authentication result to the access gateway server 631.

At step 662, the access management system 632 will receive the pre-authentication result information and take any actions associated with the result. For example, if the plug-in includes factors that are mandatory and the factors were not met, then the flow will not proceed. However, if the plug-in evaluation does not result in errors, then it can proceed to step 663.

At step 663, the identity and access management system 632 will send the login page to the access gateway server 631.

At step 664, the access gateway server 631 will forward the login page to the browser 610.

At step 665, after the browser 610 has received a user name and password via the login page, the browser will forward the user name and password to the access gateway server 631. The browser can send a POST call forwarding the username and password to the access gateway server 631.

At step 666, the access gateway server 631 will forward the user name and password to the identity and access management system 632. The user name and password can be forwarded via a POST call to the identity and access management system 632.

At step 667, the identity and access management system 632 will verify the username and password. After the user name and password is verified, a session can be established for the user and a session cookie is generated.

At step 668, a check is performed to determine whether any post-authentication plug-ins have been configured.

At step 669, the identity and access management system 632 will forward the post-authentication plug in to the access gateway server 631.

At step 670, the access gateway server 631 will forward the post-authentication plug-in to the browser 610.

At step 671, the browser 610 will forward the post-authentication plug-in to the post-authentication handler in order to execute or invoke the post-authentication plugin.

At step 672, the post-authentication handler 642 will execute or invoke the post-authentication plug-in.

At step 673, the post-authentication handler 642 will forward the post-authentication plug-in processing results along with a session cookie for the user's browser session.

At step 674, the browser 610 will forward the post-authentication plug-in results to the access gateway server 631.

At step 675, the access gateway will forward the post-authentication plug-in result to the identity and access management system 632.

At step 676, the identity and authentication component will compute post-authentication actions, if any. Post authentication actions can be defined using a post authentication plugin sequence. If there are plugins present, then the plug-ins include post-authentication actions to be completed.

At step 677, the session cookie is sent to the to the access gateway server 631. The identity and access management system 632 will forward a session cookie and an authorization code to the access gateway server 631. An authorization code can include an opaque token containing information used by system to grant an access token (e.g., used for access token exchange). An authorization code can include an OpenID Connect (OIDC) authorization code.

At step 678, the access gateway server 631 will forward the session cookie and an authorization code to the browser 610.

At step 679, the browser will forward the authorization code and token ID to the gateway server 621 of the application.

At step 680, the gateway server 621 of the application will evaluate the authorization and ID token and create a session.

At step 681, the gateway server 621 will send the application and session cookie to the browser 610.

At step 682, the browser 610 will send a GET command for the application to the application gateway server 621.

At step 683, the application gateway server 621 will forward the GET command for the application to the application 622

At step 684, the application 622 will send an application console to the gateway server 621.

At step 685, the gateway server 621 will provide application access to the browser 610. The user is given access to the protected resource, such as a business application.

A. Request Format

An example embodiment can allow a user to configure pre-authentication and post-authentication plug-ins. The system can send requests (i.e., POST request) and provide responses (i.e., POST response) throughout the process of handling the pre-authentication and post authentication plugins.

Figure 7:
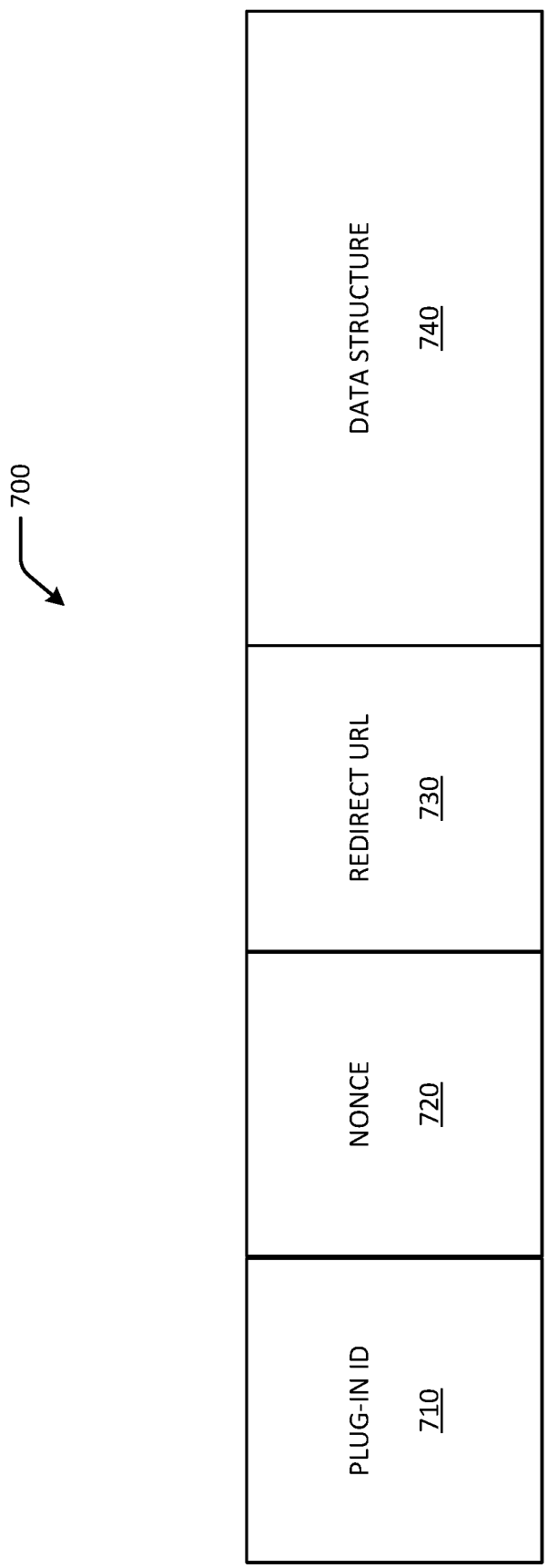
FIG. 7 illustrates a request format of a request used in handling plug-ins, in accordance with some example embodiments.

FIG. 7 illustrates a request format of a request 700 used in handling plug-ins, in accordance with some example embodiments.

As shown in FIG. 7, the request 700 can include a plugin-ID 710, a nonce 720, a redirect URL 730 and a data structure 740.

A plugin-ID 710 can be used to identify a plug-in from other plug-ins. A plug-in ID can be an alphanumeric identifier or a name for the plug-in.

A nonce 720 is included to provide, for example, security measures. A nonce can include randomly generated numbers and/or letters. An external request replay attack can be prevented by having a nonce with each request. A second request will be rejected, as the earlier request would have an evicted nonce. A nonce is generated for every request so that a request cannot be duplicated.

A redirect URL 730 will be a URL of the access management system and is used to redirect to the application page.

Data structure 740 can include data structures to indicate the request. Data can be sent as a JWT token signed by a tenant key. A JWT can contain any information that would be useful or relevant to the client. Further, the format of the JWT can vary based on the desired information for the token.

B. Response Format

Figure 8:
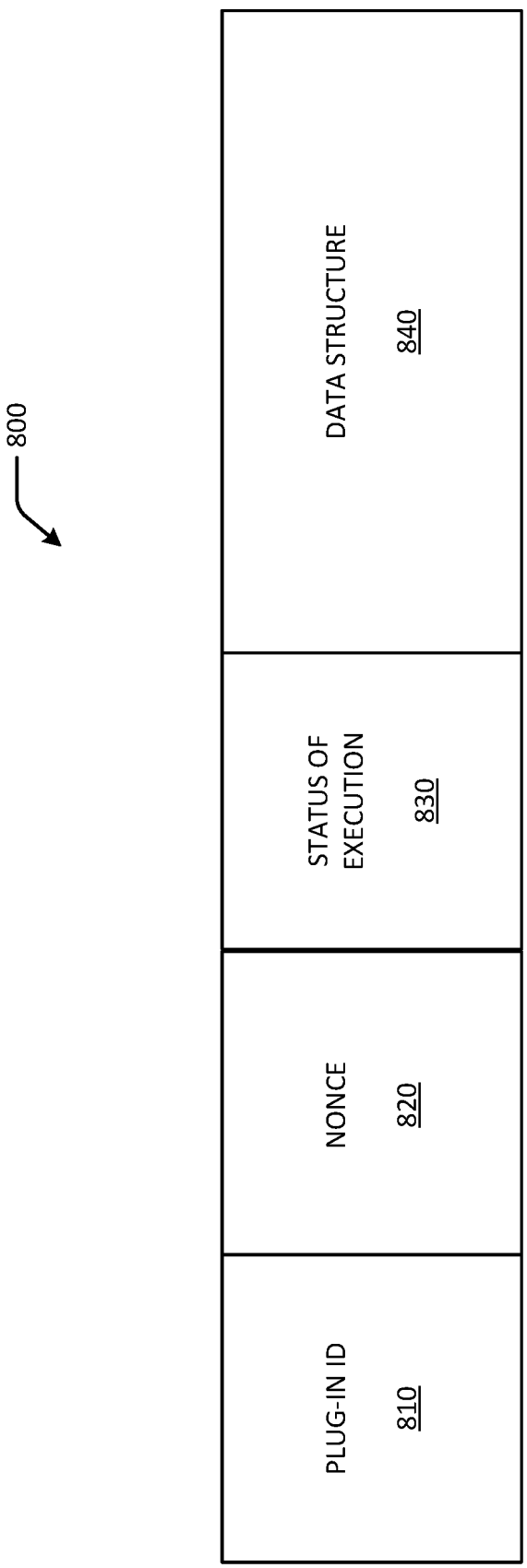
FIG. 8 illustrates a response format of a response used in handling plug-ins, in accordance with some example embodiments.

FIG. 8 illustrates a response format of a response 800 used in handling plug-ins, in accordance with some example embodiments.

As shown in FIG. 8, the response 800 can include a plug-in ID 810, a nonce 820, a status of execution 830, and a data structure 840.

A plugin-ID 810 can be used to identify a plug-in from other plug-ins. A plug-in ID can be an alphanumeric identifier or a name for the plug-in.

A nonce 820 is included to provide, for example, security measures. A nonce can include randomly generated numbers and/or letters. An external request replay attack can be prevented by having a nonce with each request. A second request will be rejected, as the earlier request would have an evicted nonce. A nonce is generated for every request so that a request cannot be duplicated.

A status of execution 830 can indicate the processing status of a plug-in.

A data structure 840 can include data structures to indicate the response. Data can be sent as a JWT token signed by a tenant key.

C. Plug-In System and Method

Figure 9:
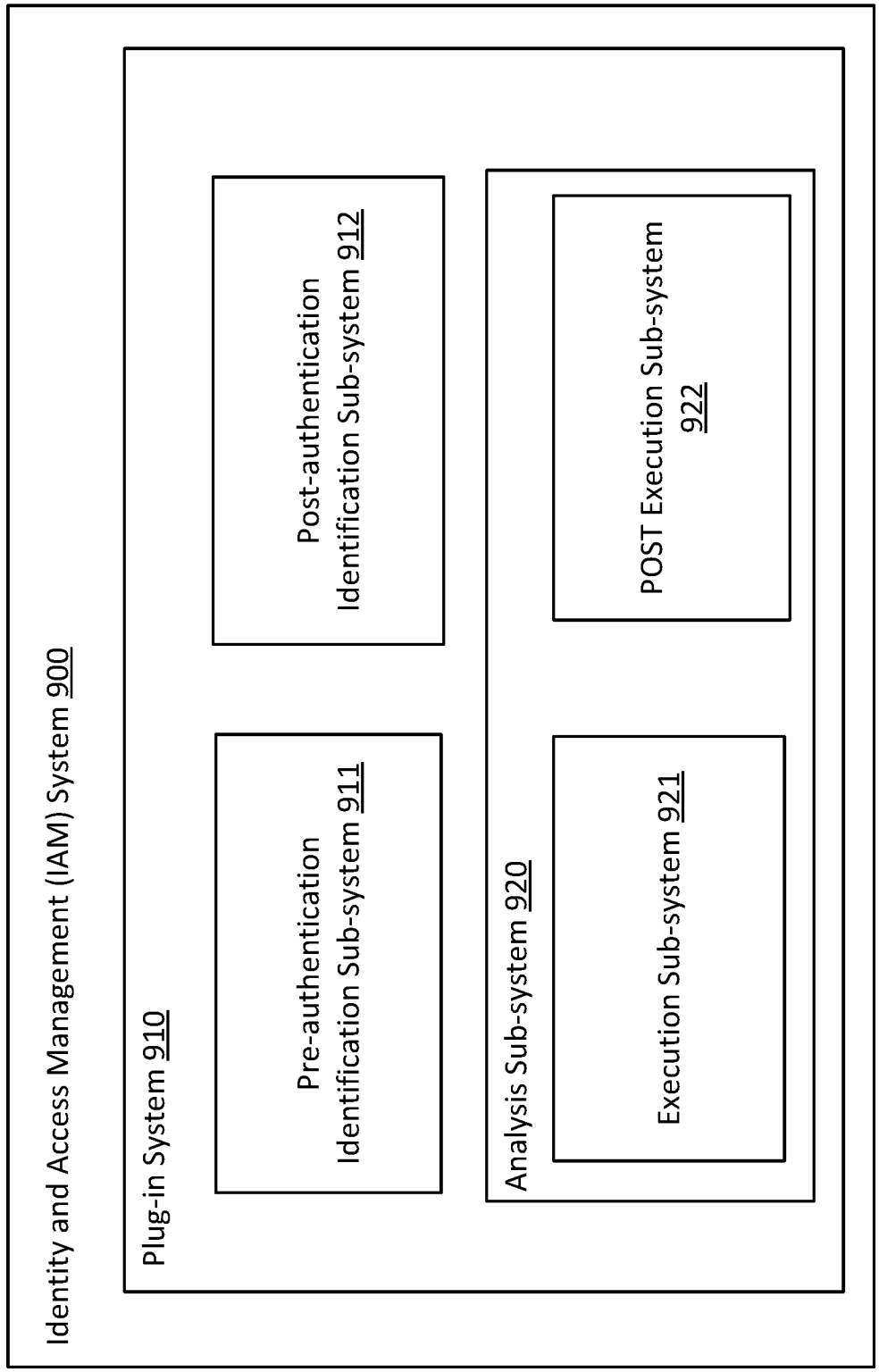
FIG. 9 illustrates a simplified block diagram of an access management system including a plug-in system, in accordance with some example embodiments.

FIG. 9 illustrates a simplified block diagram of an identity and access management system 900 including a plug-in system 910, in accordance with some example embodiments.

The identity and access management system (IAM) 900 can include a plug-in system 910 for identifying and analyzing plug-ins. The plug-in system 910 can include a pre-authentication identification sub-system 911, a post-authentication identification sub-system 912 and an analysis sub-system 920. The analysis sub-system 920 can include execution sub-system 921 and post execution sub-system 922. The plug-in system 910 can include one or more processors and memories for each of the sub-systems.

Figure 10:
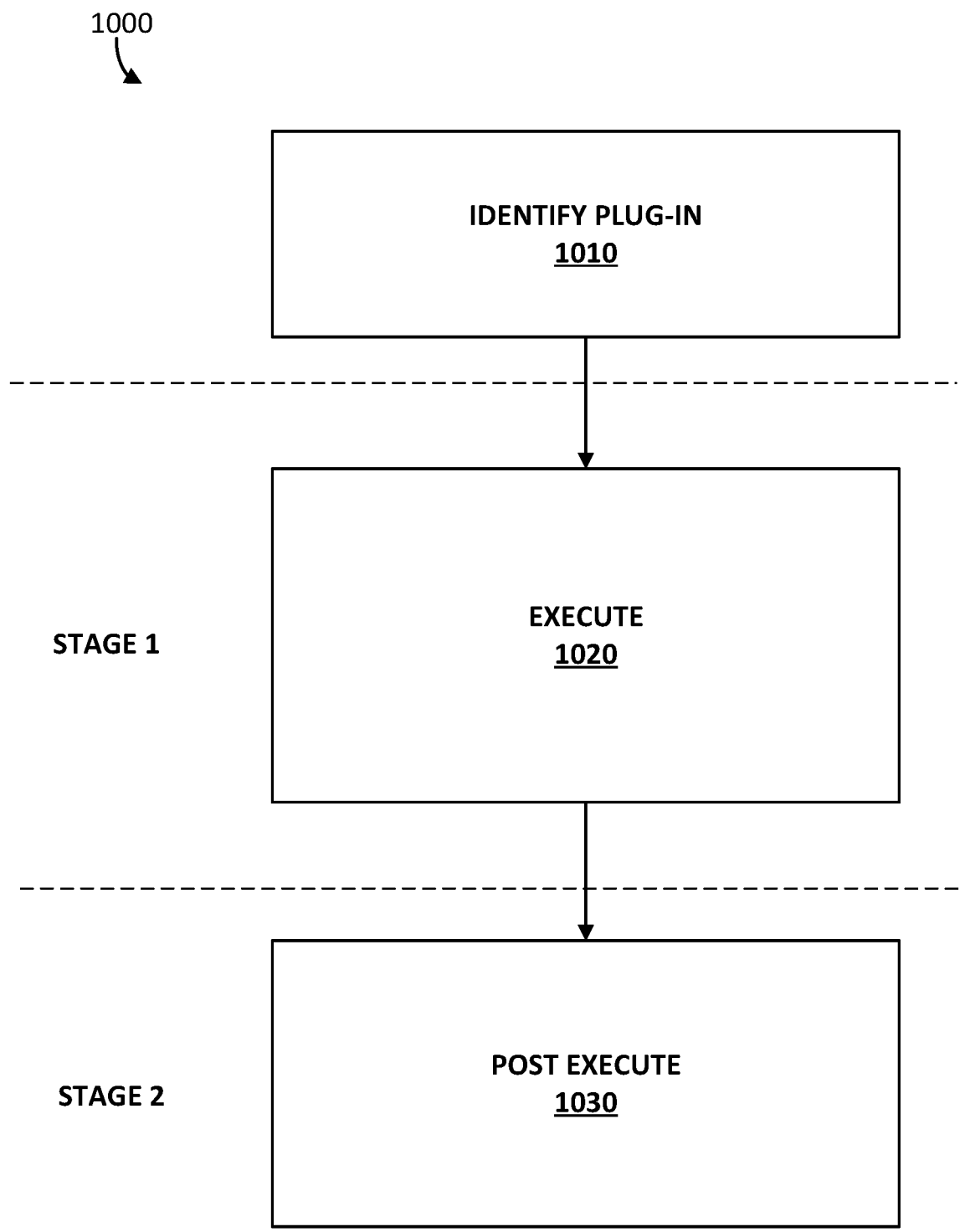
FIG. 10 illustrates a method of applying plug-ins, in accordance with some example embodiments.

FIG. 10 illustrates an overview of method 1000 of applying plug-ins, in accordance with some example embodiments. The steps shown in FIG. 10 are explained in greater detail with respect to FIGS. 11A and 11B.

At step 1010, the plug-ins to be analyzed are identified. This includes identifying pre-authentication and post-authentication plug-ins. For example, any pre-login, post-login, pre-logout and post-logout plug-ins are identified. All of the plug-ins to be implemented for an application are identified prior to initiating the analyzing of the plug-ins. This step can be performed by, for example, the pre-authentication identification sub-system 911 and the post-authentication identification sub-system 912 of FIG. 9.

At step 1020, the execute stage can be performed. This step can be performed by, for example, the execution sub-system 921 of FIG. 9. The execute stage will prepare the data for the plugin or the browser can sign the data using a current private key to generate a nonce and store it in the back end. Various actions can be performed to prepare the plug-in. Further, the request to be sent to the browser can be prepared.

At step 1030, the post execute stage can be performed. This can be performed by, for example, the post execution sub-system 922 of FIG. 9. The POST execute will return a plug-in result and verifies the that the plug-in can operate correctly.

D. Plug-In Processing

FIGS. 11A and 11B illustrates a flow diagram of a method 1100 for handling pre-login plug-ins, in accordance with some example embodiments.

In the example shown in FIGS. 11A and 11B, pre-login plug-ins are analyzed. Similar processing can be performed for post authentication or post-login plugins. However, the processing needed for post authentication plug-ins may include fewer steps since the post-login plug-ins will often be optional and not mandatory. Post-authentication plug-ins maybe be identified as optional since a user is often not prohibited from logging out of an application due to issues with plug-ins.

If a pre-login plug-in that is identified as a mandatory plug-in is not successful, then the process will not continue. For example, if there are three plug-ins in ordered list and the first plug-in that is being evaluated fails, then the process does not evaluate the second and third pre-login plug-ins. The ordered list can include plug-ins for all of the phases including plug-ins to be invoked during pre-authentication and post-authentication.

In an example embodiment, only one plug-in is handled at a time since the browser can often only handle one redirect at a time. Therefore, the plug-ins are handled sequentially. Plug-ins are directed to the user for handling after the session is created, but before the user is redirected to the actual resource Alternative embodiments can include a plug-in list which does not require a specified order or a sequential order. An alternative embodiment can include a plug-in list which does not require that all of the plug-ins in the list be satisfied in order for the one or more plug-ins in the list be implemented. For example, plug-ins can be handled in parallel and asynchronously. However, the example embodiment discussed with respect to FIGS. 11A and 11B are directed to an ordered list of plug-ins which are handled synchronously.

At step 1110, pre-login plug-ins are identified (e.g., primary authentication, MFA, browser response, etc.). A request can be sent for a cookie including plug-in information for plug-ins to be implemented. The request can be sent from the browser to the access management system. As shown in FIG. 11A, three plug-ins are identified. The three plug-ins will be handled sequentially. Therefore, the primary authentication plug-in will be handled, followed by the multifactor authentication plug-in and lastly, the browser response plug-in.

At step 1111, a plug-in ID is obtained for the first plug-in (e.g., primary authentication plug-in). A plug-in ID can also be known as a trigger ID. The plug-in ID is obtained from the request cookie. The plug-in ID is used to identify the plug-in from the remaining plug-ins to be processed and keeps track of which plug-ins have been processed.

An example embodiment uses a stateless protocol. Therefore, instead of maintaining information in a database, the information is maintained in the cookie. Information between the plug-in and the access management system can be exchanged with information being maintained in the cookie. The state information is stored on the cookie and can keep track of the plug-ins that have been processed. The cookie is used by the access management system to determine the results of the processing for each of the pre-login plug-ins.

At step 1112, the analysis starts for the first plug-in (e.g., first plug-in ID="1").

At step 1113, it is determined whether the plug-in ID is available in the ordered list. The plug-ins can be ordered in the ordered list based on priority. The ordered list can be created by the user or can be automatically set by the access management system based on the type of plug-in. For example, the ordered list can be automatically created by the access management system based on the type of plug-in. For example, a type associated with the plug-in can identify its priority level with respect to other plug-ins.

The plug-ins are in an ordered list since the plug-ins are processed sequentially. For example, the criteria for a first plug-in in ordered list should be satisfied before considering a second plug-in on the ordered list, and a second plug-in on the ordered this should be satisfied before considering the third plug-in on the ordered list. If the first plug-in in the ordered list is not satisfied, then the process will not evaluate the second and third plug-ins. Therefore, the plug-ins are analyzed sequentially and in a specified order. The plug-ins are handled synchronously. The order of the plug-ins can be based on the identifier of the plug-in. Further, the order of the plug-ins can be based on the action that the plug-in is to perform.

If, at step 1113, the plug-in ID is not available in ordered list, the method returns to step 1110, and the next plug-in is obtained. That is, for example, the multifactor authentication plug-in will then be handled.

If, at step 1113, the plug-in ID is available in ordered list, at step 1114, the plug-in is obtained from the ordered list. The first plug-in from the ordered list is obtained. Plug-in ID "1" is obtained, which indicates this is the first plug-in in the ordered list.

At step 1115, it is determined whether the plug-in has completed the execute stage, which is the first stage. The plug-in will be processed through an execute stage (e.g., first stage) and a POST execute stage (e.g., second stage). If the plug-in has completed the execute stage it will proceed to the POST execute stage.

If the plug-in has not completed the first stage, at step 1116 a call to execute is placed. This will prepare the data for that plugin or it will sign the data using a current private key to generate a nonce and store it in the back end. Various actions can be performed to prepare the plug-in. The request to be sent to the browser can also be prepared. Step 1116 can correspond to step 1020 of FIG. 10.

If the plug-in has completed the first stage, at step 1117 a call is made to POST execute. The POST execute will return a plug-in result and verifies the that the plug-in can operate correctly. Step 1117 can correspond to step 1030 of FIG. 10.

At step 1118, it is determined whether the plug-in has a response.

If the plug-in has a response, at step 1119, the request cookie is updated with the plug-in ID.

At step 1120, a response is sent to the browser and the method returns to step 1110 to handle the next plug-in.

If at step 1118, the plug-in does not have a response, at step 1121, it is determined whether there is an exception to receiving a response An exception can include a code issue or an internal coding issue. For example, an application may be expecting a specific response, but the data provided is something different than expected and the application cannot handle the response.

If there is an exception, at step 1122, it is determined whether the exception is mandatory.

If the exception is mandatory then an error response is sent to the browser at step 1120. The browser is notified that there was an error in processing the plug-in.

If at step 1121, it is determined that there is no exception, the client application completes its actions and returns back to the service.

If, at step 1122, the exception is not mandatory the the method proceeds to step 1123.

At step 1123, the plug-in ID is incremented so as to process the next sequential plug-in in the ordered list. After updateding the plug-in ID, the process returns to step 1111 where the next plug-in ID (e.g., ID "2") is requested for processing.

The method is described with respect to three plug-ins however, more than three or less than three triggers can be processed. For example, there may be an upper limit of plug-ins to analyze. In an example embodiment, there may be a maximum number (e.g., 4 or 5) of plug-ins that can be customized by the user.

Example embodiments allow a user to make configurations to a protected resource. The configuration is not limited to a single entity, such as the access management system provider.

As indicated above, example embodiments provide many technological improvements. System processes allow for giving the user control of implementing plug-ins. For example, during login, the user can specify the additional or alternative authentication methods (e.g., additional levels of authentication). In addition, during logout, control is given to the user to perform. Therefore, the user can perform logging out of all of the plug-ins and perform any needed cleanup. Thereby ensuring that sessions are cleared property and plug-ins are cleared properly.

VII. Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
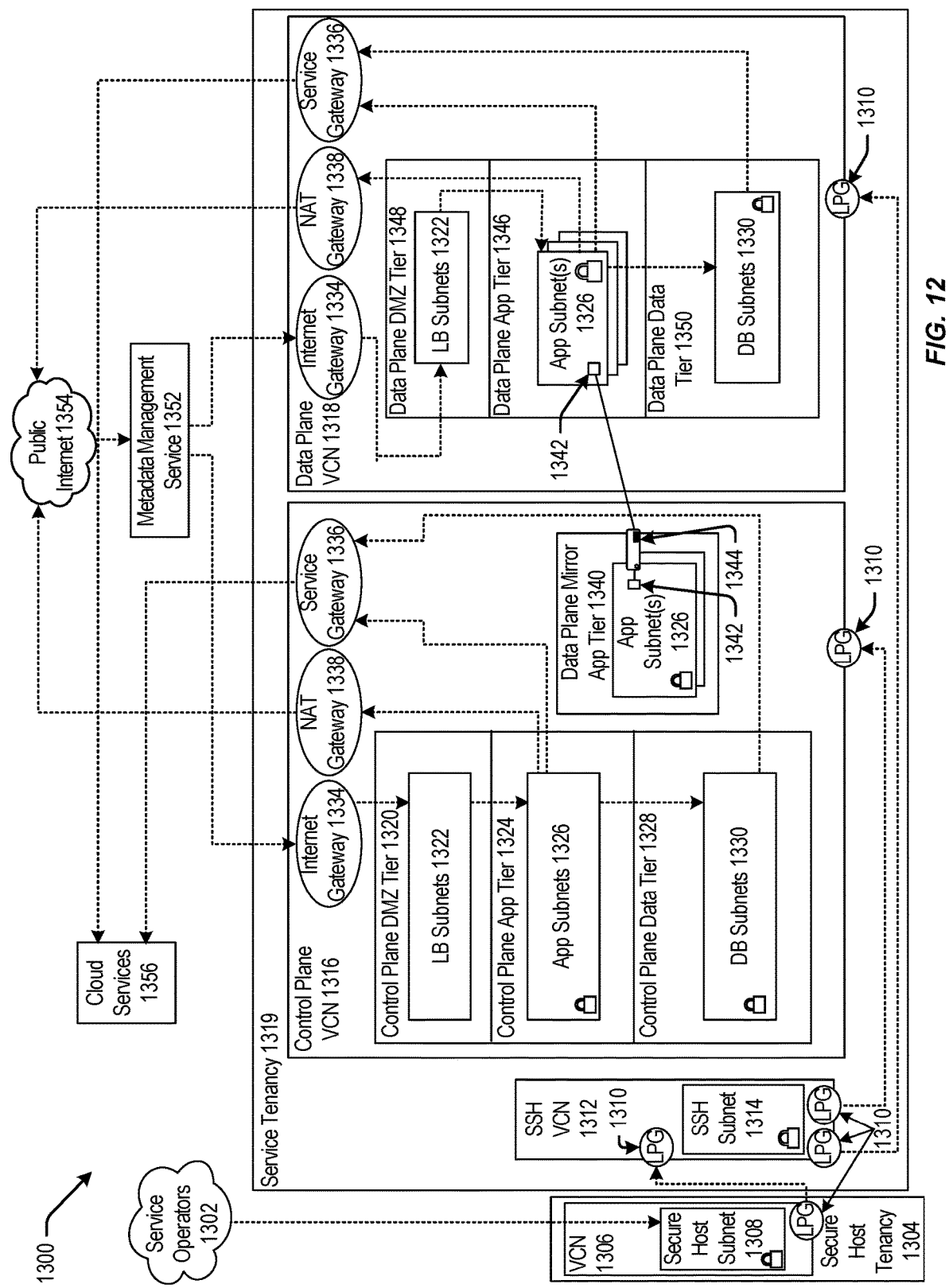
FIG. 12 is a block diagram illustrating one pattern for implementing a cloud infrastructure as a service system, in accordance with some example embodiments.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep security breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plan VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Memory that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of security, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
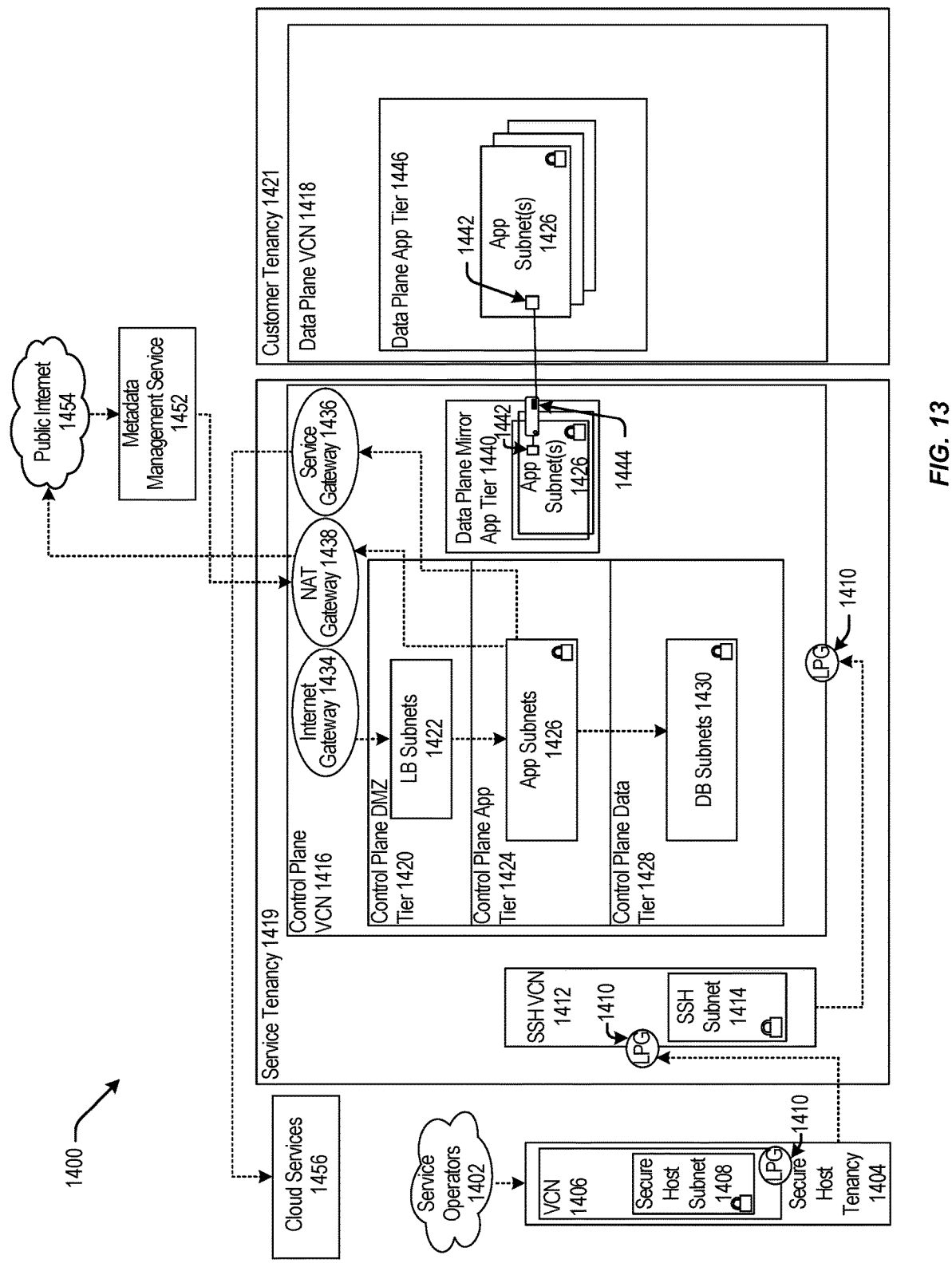
FIG. 13 is a block diagram illustrating another pattern for implementing a cloud infrastructure as a service system, in accordance with some example embodiments.

FIG. 13 is a block diagram 1300 illustrating another example pattern of an IaaS architecture, according to at least one embodiment. Service operators 1302 (e.g. service operators 1202 of FIG. 12) can be communicatively coupled to a secure host tenancy 1304 (e.g. the secure host tenancy 1204 of FIG. 12) that can include a virtual cloud network (VCN) 1306 (e.g. the VCN 1206 of FIG. 12) and a secure host subnet 1308 (e.g. the secure host subnet 1208 of FIG. 12). The VCN 1306 can include a local peering gateway (LPG) 1310 (e.g. the LPG 1210 of FIG. 12) that can be communicatively coupled to a secure shell (SSH) VCN 1312 (e.g. the SSH VCN 1212 of FIG. 12) via an LPG 1210 contained in the SSH VCN 1312. The SSH VCN 1312 can include an SSH subnet 1314 (e.g. the SSH subnet 1214 of FIG. 12), and the SSH VCN 1312 can be communicatively coupled to a control plane VCN 1316 (e.g. the control plane VCN 1216 of FIG. 12) via an LPG 1310 contained in the control plane VCN 1316. The control plane VCN 1316 can be contained in a service tenancy 1319 (e.g. the service tenancy 1219 of FIG. 12), and the data plane VCN 1318 (e.g. the data plane VCN 1218 of FIG. 12) can be contained in a customer tenancy 1321 that may be owned or operated by users, or customers, of the system.

The control plane VCN 1316 can include a control plane DMZ tier 1320 (e.g. the control plane DMZ tier 1220 of FIG. 12) that can include LB subnet(s) 1322 (e.g. LB subnet(s) 1222 of FIG. 12), a control plane app tier 1324 (e.g. the control plane app tier 1224 of FIG. 12) that can include app subnet(s) 1326 (e.g. app subnet(s) 1226 of FIG. 12), a control plane data tier 1328 (e.g. the control plane data tier 1228 of FIG. 12) that can include database (DB) subnet(s) 1330 (e.g. similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g. the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g. the service gateway of FIG. 12) and a network address translation (NAT) gateway 1338 (e.g. the NAT gateway 1238 of FIG. 12). The control plane VCN 1316 can include the service gateway 1336 and the NAT gateway 1338.

The control plane VCN 1316 can include a data plane mirror app tier 1340 (e.g. the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g. the VNIC of 1242) that can execute a compute instance 1344 (e.g. similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g. the data plane app tier 1246 of FIG. 12) via the VNIC 1342 contained in the data plane mirror app tier 1340 and the VNIC 1342 contained in the data plan app tier 1346.

The Internet gateway 1334 contained in the control plane VCN 1316 can be communicatively coupled to a metadata management service 1352 (e.g. the metadata management service 1252 of FIG. 12) that can be communicatively coupled to public Internet 1354 (e.g. public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g. cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2.

Figure 14:
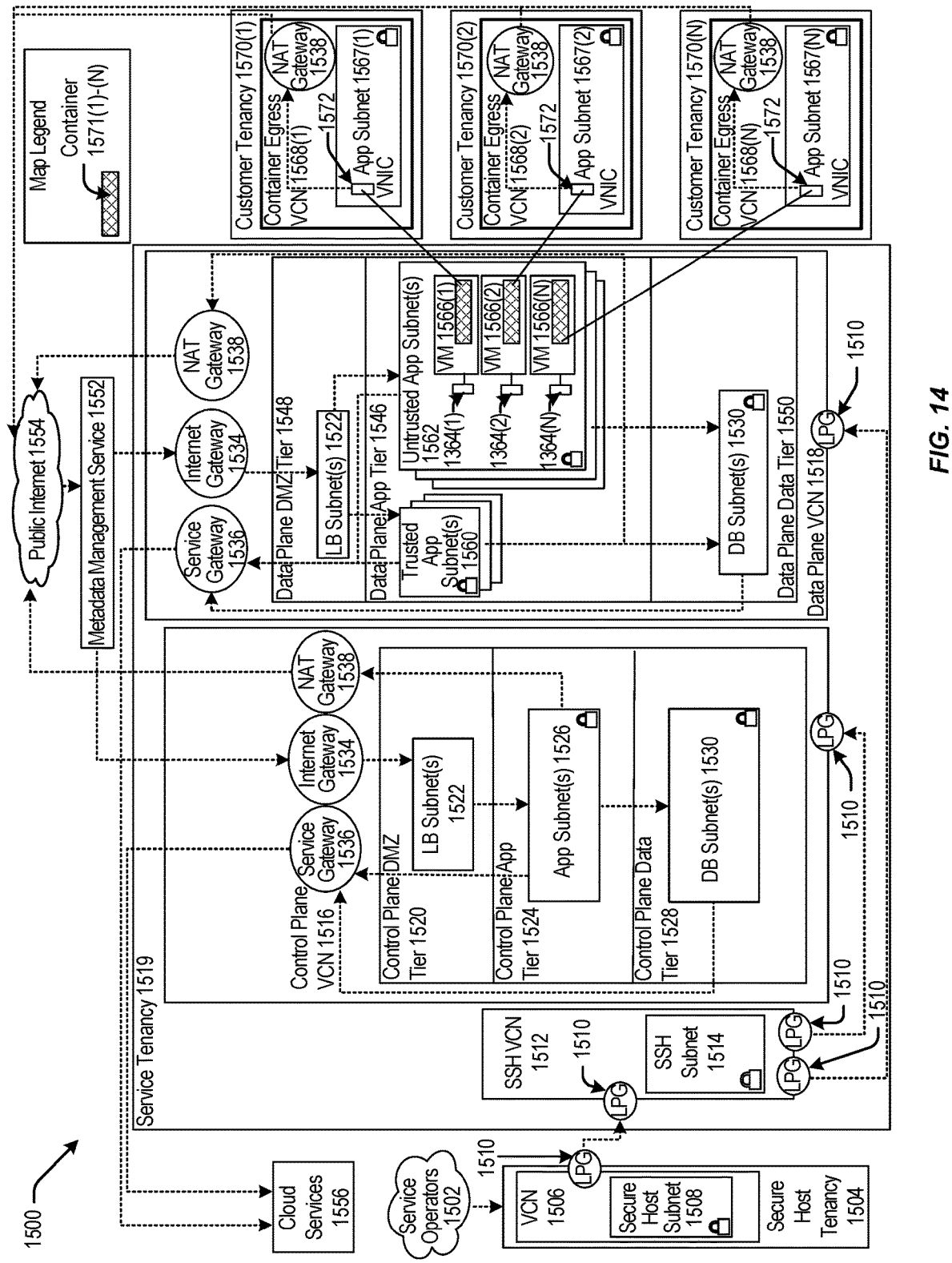
FIG. 14 is a block diagram illustrating another pattern for implementing a cloud infrastructure as a service system, in accordance with some example embodiments.

FIG. 14 is a block diagram 1400 illustrating another example pattern of an IaaS architecture, according to at least one embodiment. Service operators 1402 (e.g. service operators 1202 of FIG. 12) can be communicatively coupled to a secure host tenancy 1404 (e.g. the secure host tenancy 1204 of FIG. 12) that can include a virtual cloud network (VCN) 1406 (e.g. the VCN 1206 of FIG. 12) and a secure host subnet 1408 (e.g. the secure host subnet 1208 of FIG. 12). The VCN 1406 can include an LPG 1410 (e.g. the LPG 1210 of FIG. 12) that can be communicatively coupled to an SSH VCN 1412 (e.g. the SSH VCN 1212 of FIG. 12) via an LPG 1410 contained in the SSH VCN 1412. The SSH VCN 1412 can include an SSH subnet 1414 (e.g. the SSH subnet 1214 of FIG. 12), and the SSH VCN 1412 can be communicatively coupled to a control plane VCN 1416 (e.g. the control plane VCN 1216 of FIG. 12) via an LPG 1410 contained in the control plane VCN 1416 and to a data plane VCN 1418 (e.g. the data plane 1218 of FIG. 12) via an LPG 1410 contained in the data plane VCN 1418. The control plane VCN 1416 and the data plane VCN 1418 can be contained in a service tenancy 1419 (e.g. the service tenancy 1219 of FIG. 12).

The control plane VCN 1416 can include a control plane DMZ tier 1420 (e.g. the control plane DMZ tier 1220 of FIG. 12) that can include load balancer (LB) subnet(s) 1422 (e.g. LB subnet(s) 1222 of FIG. 12), a control plane app tier 1424 (e.g. the control plane app tier 1224 of FIG. 12) that can include app subnet(s) 1426 (e.g. similar to app subnet(s) 1226 of FIG. 12), a control plane data tier 1428 (e.g. the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 12) and a network address translation (NAT) gateway 1438 (e.g. the NAT gateway 1238 of FIG. 12). The control plane VCN 1416 can include the service gateway 1436 and the NAT gateway 1438.

The data plane VCN 1418 can include a data plane app tier 1446 (e.g. the data plane app tier 1246 of FIG. 12), a data plane DMZ tier 1448 (e.g. the data plane DMZ tier 1248 of FIG. 12), and a data plane data tier 1450 (e.g. the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s)

1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g. public Internet 1254 of FIG. 12).

The Internet gateway 1434 contained in the control plane VCN 1416 and contained in the data plane VCN 1418 can be communicatively coupled to a metadata management service 1452 (e.g. the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
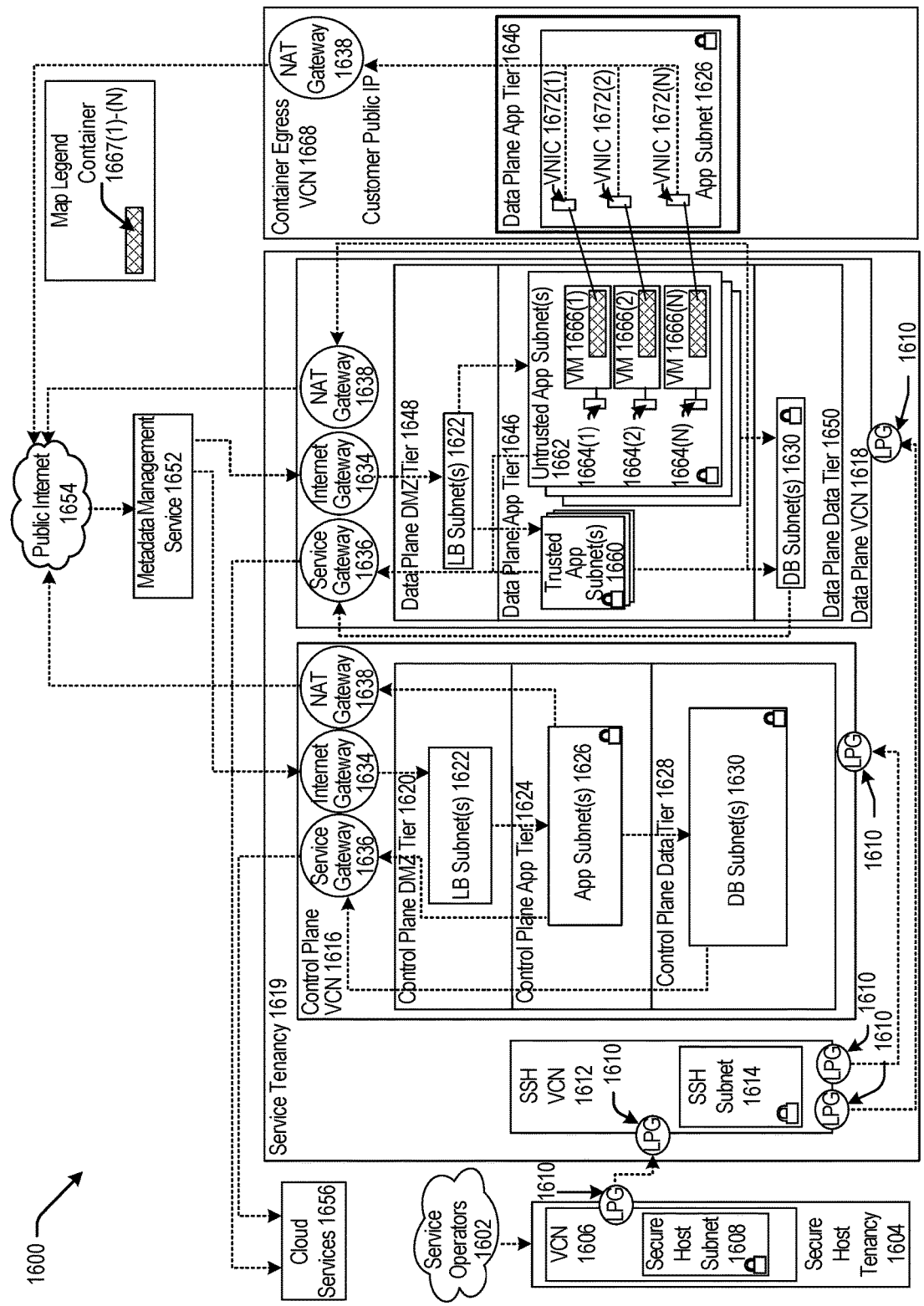
FIG. 15 is a block diagram illustrating another pattern for implementing a cloud infrastructure as a service system, in accordance with some example embodiments.

FIG. 15 is a block diagram 1500 illustrating another example pattern of an IaaS architecture, according to at least one embodiment. Service operators 1502 (e.g. service operators 1202 of FIG. 12) can be communicatively coupled to a secure host tenancy 1504 (e.g. the secure host tenancy 1204 of FIG. 12) that can include a virtual cloud network (VCN) 1506 (e.g. the VCN 1206 of FIG. 12) and a secure host subnet 1508 (e.g. the secure host subnet 1208 of FIG. 12). The VCN 1506 can include an LPG 1510 (e.g. the LPG 1210 of FIG. 12) that can be communicatively coupled to an SSH VCN 1512 (e.g. the SSH VCN 1212 of FIG. 12) via an LPG 1510 contained in the SSH VCN 1512. The SSH VCN 1512 can include an SSH subnet 1514 (e.g. the SSH subnet 1214 of FIG. 12), and the SSH VCN 1512 can be communicatively coupled to a control plane VCN 1516 (e.g. the control plane VCN 1216 of FIG. 12) via an LPG 1510 contained in the control plane VCN 1516 and to a data plane VCN 1518 (e.g. the data plane 1218 of FIG. 12) via an LPG 1510 contained in the data plane VCN 1518. The control plane VCN 1516 and the data plane VCN 1518 can be contained in a service tenancy 1519 (e.g. the service tenancy 1219 of FIG. 12).

The control plane VCN 1516 can include a control plane DMZ tier 1520 (e.g. the control plane DMZ tier 1220 of FIG. 12) that can include LB subnet(s) 1522 (e.g. LB subnet(s) 1222 of FIG. 12), a control plane app tier 1524 (e.g. the control plane app tier 1224 of FIG. 12) that can include app subnet(s) 1526 (e.g. app subnet(s) 1226 of FIG. 12), a control plane data tier 1528 (e.g. the control plane data tier 1228 of FIG. 12) that can include DB subnet(s) 1530 (e.g. DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 12) and a network address translation (NAT) gateway 1538 (e.g. the NAT gateway 1238 of FIG. 12). The control plane VCN 1516 can include the service gateway 1536 and the NAT gateway 1538.

The data plane VCN 1518 can include a data plane app tier 1546 (e.g. the data plane app tier 1246 of FIG. 12), a data plane DMZ tier 1548 (e.g. the data plane DMZ tier 1248 of FIG. 12), and a data plane data tier 1550 (e.g. the data plane data tier 1250 of FIG. 12). The data plane DMZ tier 1548 can include LB subnet(s) 1522 that can be communicatively coupled to trusted app subnet(s) 1560 (e.g. trusted app subnet(s) 1460 of FIG. 14) and untrusted app subnet(s) 1562 (e.g. untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g. public Internet 1254 of FIG. 12).

The Internet gateway 1534 contained in the control plane VCN 1516 and contained in the data plane VCN 1518 can be communicatively coupled to a metadata management service 1552 (e.g. the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
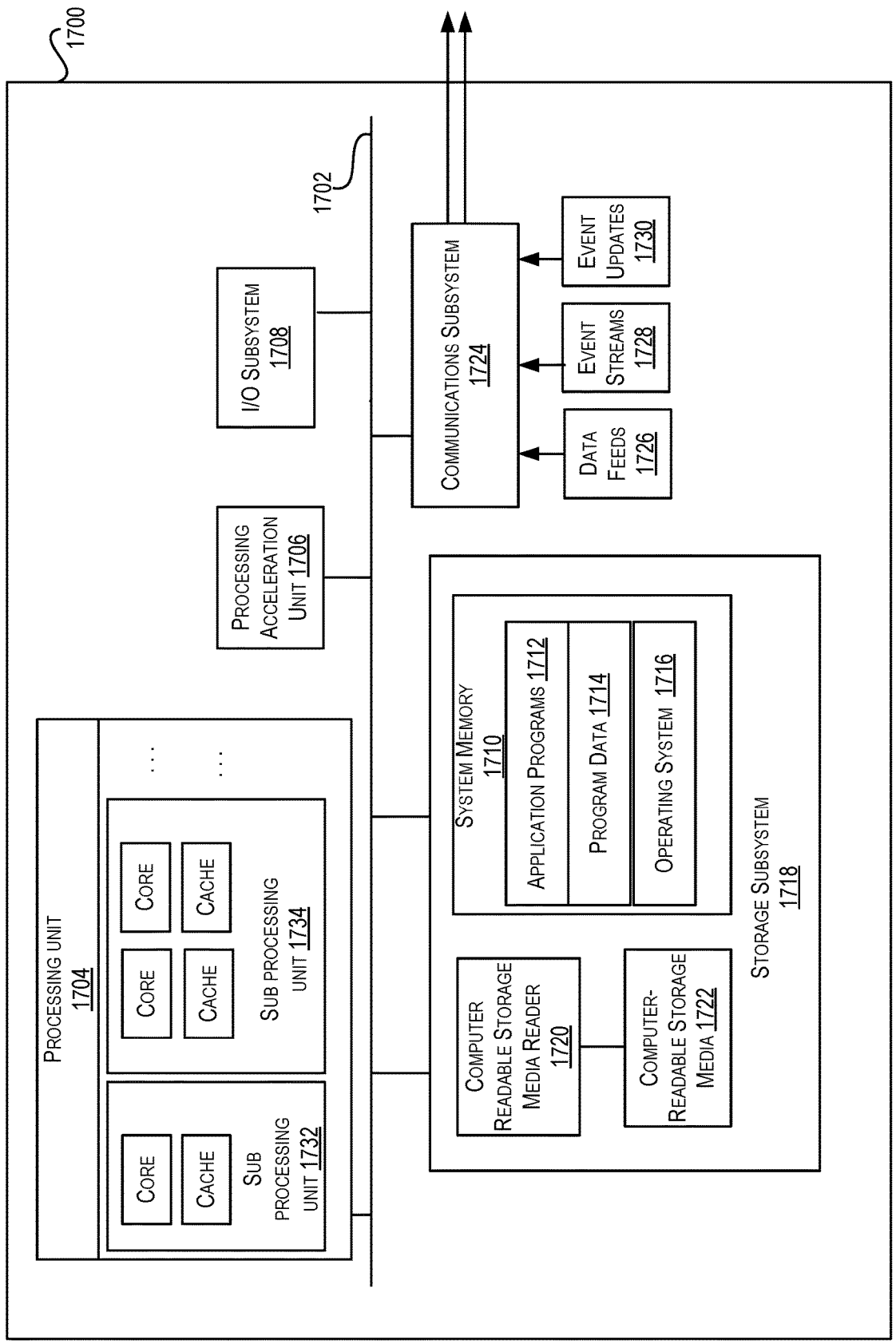
FIG. 16 is a block diagram illustrating an example computer system, in accordance with some example embodiments.

FIG. 16 illustrates an example computer system 1600, in which various embodiments of the present disclosure may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 16 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present disclosure.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Example embodiments of this disclosure are described herein, including the best mode known to the inventors for carrying out the disclosure. Variations of those example embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method performed by a computing system of a cloud computing environment for injecting user pre-authentication and post authentication configurations, the method comprising:
   receiving a request from a user of the cloud computing environment to access a protected resource managed by the computing system, wherein the protected resource comprises an application;
   determining via an identity service authentication process whether the user is a tenant of the cloud computing environment that is authorized to access the protected resource with a plug-in;
   in response to determining that the user is authorized to access the protected resource, identifying one or more pre-authentication or post authentication plug-ins configured by the user for controlling an authentication session for the protected resource,
   wherein a plug-in is configured by the user to control a user session in a browser,
   wherein a type of the plug-in that is configured by the user varies depending on a role of the user configuring the plug-in, and wherein the plug-in is configured to include a public key of the user;
   analyzing the one or more plug-ins generated by the user to determine whether the one or more plug-ins can be implemented for a session, wherein the one or more plug-ins can be implemented for the session based on criteria ensuring correct operation of the one or more plug-ins in the computing system are satisfied, wherein the criteria comprises mandatory criteria that is required for the plug-in to be initiated or optional criteria that is optional before the plug-in initiated, wherein the one or more plug-ins are generated by the user prior to the request to access the protected resource;
   in response to verifying that the criteria for implementing the one or more plug-ins customized by the user are satisfied, creating a session for the user; and
   forwarding control of the protected resource and the session to the user.

2. The method according to claim 1, wherein the application comprises a website application.

3. The method according to claim 1, wherein the analyzing the one or more plug-ins generated by the user to determine that criteria for the one or more plug-ins are satisfied comprises:
   identifying a pre-authorization plug-in from the one or more plug-ins;
   processing the pre-authorization plug-in to determine that criteria for the pre-authorization plug-in is satisfied;
   creating a session cookie; and
   updating the session cookie that was created based on a result of processing the pre-authorization plug-in.

4. The method according to claim 3, wherein the analyzing the one or more plug-ins generated by the user to determine that criteria for the one or more plug-ins are satisfied further comprises:
   identifying a post-authorization plug-in from the one or more plug-ins;
   processing the post-authorization plug-in to determine that criteria for the pre-authorization plug-in is satisfied; and
   updating the session cookie based on a result of processing the post-authorization plug-in.

5. The method according to claim 4, wherein the pre-authorization plug-in comprises a pre-login plugin, and wherein the post-authorization plug-in comprises a post-login plugin, a pre-logout plugin, or a post logout plugin.

6. The method according to claim 1, wherein the analyzing the one or more plug-ins generated by the user to determine that criteria for the one or more plug-ins are satisfied comprises:
identifying one or more plug-ins registered to be configured for the protected resource;
generating an ordered list comprising the one or more plug-ins configured for the protected resource;
determining a first plug-in the ordered list, wherein the first plug-in is a highest ordered plug-in in the ordered list;
invoking the first plug-in from the ordered list; and
determining whether the first plug-in from the ordered list is successfully configured.

7. The method according to claim 6, wherein the analyzing the one or more plug-ins generated by the user to determine that criteria for the one or more plug-ins are satisfied further comprises:
in response to determining that the highest ordered plug-in in the ordered list is successfully configured, determining a second plug-in in the ordered list, wherein the second plug-in is a second highest ordered plug-in in the ordered list;
invoking the second plug-in from the ordered list; and
determining whether the second plug-in from the ordered list is successfully configured.

8. The method according to claim 6, wherein determining whether the first plug-in from the ordered list is successfully configured comprises:
determining whether the first plug-in is a mandatory plug-in or an optional plug-in; and
in response to the first plug-in being the mandatory plug-in, determining whether all of the criteria for the first plug-in are satisfied.

9. The method according to claim 1, wherein the user is a tenant among a plurality of tenants in the cloud computing environment.

10. The method according to claim 1, wherein determining whether the user is authorized to access the protected resource comprises performing an authentication process for authenticating the user with the computing system.

11. The method according to claim 1, wherein a pre-authentication plug-in is a mandatory plug-in and wherein a post-authentication plug-in is an optional plug-in.

12. The method according to claim 11, wherein the mandatory plug-in comprises criteria that must be satisfied before control of the protected resource is forwarded to the user, and wherein the optional plug-in comprises criteria that does not need to be satisfied before control of the protected resource is forwarded to the user.

13. The method according to claim 1, wherein the plug-in configured by the user configures a user interface for the user session in the browser, and wherein the plug-in that is configured includes an application URL.

14. The method according to claim 1, wherein the plug-in is configured by the user to trigger at a predetermined time.

15. A non-transitory computer-readable storage medium storing instructions that, when executed by one or more processors of a computing system of a cloud computing environment for injecting user pre-authentication and post authentication configurations, cause the one or more processors to perform steps comprising:
receiving a request from a user of the cloud computing environment to access a protected resource managed by the computing system, wherein the protected resource comprises an application;
determining via an identity service authentication process whether the user is a tenant of the cloud computing environment that is authorized to access the protected resource with a plug-in;
in response to determining that the user is authorized to access the protected resource, identifying one or more pre-authentication or post authentication plug-ins configured by the user for controlling an authentication session for the protected resource,
wherein a plug-in is configured by the user to control a user session in a browser,
wherein a type of the plug-in that is configured by the user varies depending on a role of the user configuring the plug-in, and wherein the plug-in is configured to include a public key of the user;
analyzing the one or more plug-ins generated by the user to determine whether the one or more plug-ins can be implemented for a session, wherein the one or more plug-ins can be implemented for the session based on criteria ensuring correct operation of the one or more plug-ins in the computing system are satisfied, wherein the criteria comprises mandatory criteria that is required for the plug-in to be initiated or optional criteria that is optional before the plug-in initiated, wherein the one or more plug-ins are generated by the user prior to the request to access the protected resource;
in response to verifying that the criteria for implementing the one or more plug-ins customized by the user are satisfied, creating a session for the user; and
forwarding control of the protected resource and the session to the user.

16. The computer-readable storage medium according to claim 15, wherein the analyzing the one or more plug-ins generated by the user to determine that criteria for the one or more plug-ins are satisfied comprises:
identifying a pre-authorization plug-in from the one or more plug-ins;
processing the pre-authorization plug-in to determine that criteria for the pre-authorization plug-in is satisfied;
creating a session cookie; and
updating the session cookie that was created based on a result of processing the pre-authorization plug-in.

17. The computer-readable storage medium according to claim 16, wherein the analyzing the one or more plug-ins generated by the user to determine that criteria for the one or more plug-ins are satisfied further comprises:
identifying a post-authorization plug-in from the one or more plug-ins;
processing the post-authorization plug-in to determine that criteria for the pre-authorization plug-in is satisfied; and
updating the session cookie based on a result of processing the post-authorization plug-in.

18. The computer-readable storage medium according to claim 15, wherein the analyzing the one or more plug-ins generated by the user to determine that criteria for the one or more plug-ins are satisfied comprises:
identifying one or more plug-ins registered to be configured for the protected resource;
generating an ordered list comprising the one or more plug-ins configured for the protected resource;

determining a first plug-in the ordered list, wherein the first plug-in is a highest ordered plug-in in the ordered list;

invoking the first plug-in from the ordered list; and determining whether the first plug-in from the ordered list is successfully configured.

19. A computing system of a cloud computing environment configured to inject user pre-authentication and post authentication configurations, the system comprising:

one or more processors; and a memory in communication with the one or more processors, the memory storing instructions that, when executed by the one or more processors, cause the one or more processors to:

receive a request from a user of the cloud computing environment to access a protected resource managed by the computing system, wherein the protected resource comprises an application;

determine via an identity service authentication process whether the user is a tenant of the cloud computing environment that is authorized to access the protected resource with a plug-in;

in response to determining that the user is authorized to access the protected resource, identify one or more pre-authentication or post authentication plug-ins configured by the user for controlling an authentication session for the protected resource, wherein a plug-in is configured by the user to control a user session in a browser, wherein a type of the plug-in that is configured by the user varies depending on a role of the user configuring the plug-in, and wherein the plug-in is configured to include a public key of the user;

analyze the one or more plug-ins generated by the user to determine whether the one or more plug-ins can be implemented for a session, wherein the one or more plug-ins can be implemented for the session based on criteria ensuring correct operation of the one or more plug-ins in the computing system are satisfied, wherein the criteria comprises mandatory criteria that is required for the plug-in to be initiated or optional criteria that is optional before the plug-in initiated, wherein the one or more plug-ins are generated by the user prior to the request to access the protected resource;

in response to verifying that the criteria for implementing the one or more plug-ins customized by the user are satisfied, create a session for the user; and forward control of the protected resource and the session to the user.

\* \* \* \* \*

UNITED STATES PATENT AND TRADEMARK OFFICE
CERTIFICATE OF CORRECTION

PATENT NO. : 12,238,101 B2
APPLICATION NO. : 17/196907
DATED : February 25, 2025
INVENTOR(S) : Pattar et al.

Page 1 of 1

It is certified that error appears in the above-identified patent and that said Letters Patent is hereby corrected as shown below:

In the Specification

In Column 4, Line 30, delete "embodiments" and insert -- embodiments. --, therefor.

In Column 15, Line 54, delete "to the to the" and insert -- to the --, therefor.

In Column 16, Line 10, delete "622" and insert -- 622. --, therefor.

In Column 18, Line 3, delete "resource" and insert -- resource. --, therefor.

In Column 19, Line 31, delete "response" and insert -- response. --, therefor.

In Column 19, Line 44, delete "the the" and insert -- the --, therefor.

In Column 19, Line 48, delete "updateding" and insert -- updating --, therefor.

In the Claims

In Column 37, Line 11, in Claim 6, delete "plug-in the" and insert -- plug-in in the --, therefor.

In Column 39, Line 1, in Claim 18, delete "plug-in the" and insert -- plug-in in the --, therefor.

Signed and Sealed this
Third Day of June, 2025

Coke Morgan Stewart
*Acting Director of the United States Patent and Trademark Office*